United States Patent
Ji et al.

(10) Patent No.: US 12,519,590 B2
(45) Date of Patent: Jan. 6, 2026

(54) METHOD AND APPARATUS FOR TRANSMITTING OR RECEIVING REFERENCE SIGNAL IN WIRELESS COMMUNICATION SYSTEM

(71) Applicant: Samsung Electronics Co., Ltd., Gyeonggi-do (KR)

(72) Inventors: Hyoungju Ji, Gyeonggi-do (KR); Hoondong Noh, Gyeonggi-do (KR); Jinhyun Park, Gyeonggi-do (KR); Youngrok Jang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 324 days.

(21) Appl. No.: 17/797,881

(22) PCT Filed: Feb. 10, 2021

(86) PCT No.: PCT/KR2021/001778
§ 371 (c)(1),
(2) Date: Aug. 5, 2022

(87) PCT Pub. No.: WO2021/162445
PCT Pub. Date: Aug. 19, 2021

(65) Prior Publication Data
US 2023/0111063 A1   Apr. 13, 2023

(30) Foreign Application Priority Data
Feb. 13, 2020   (KR) .................. 10-2020-0017864

(51) Int. Cl.
*H04L 5/00*   (2006.01)
(52) U.S. Cl.
CPC .......... *H04L 5/0051* (2013.01); *H04L 5/0012* (2013.01)
(58) Field of Classification Search
CPC ............... H04L 5/0051; H04L 5/0012
See application file for complete search history.

(56) References Cited

U.S. PATENT DOCUMENTS

2014/0112277 A1* 4/2014 Yang ............... H04L 5/0094
370/329
2015/0373721 A1   12/2015 Zhang et al.
(Continued)

FOREIGN PATENT DOCUMENTS

| EP | 3 528 571 | 8/2019 |
| WO | WO 2018/207995 | 11/2018 |
| WO | WO 2019/083260 | 5/2019 |
| WO | WO 2019/132622 | 7/2019 |

OTHER PUBLICATIONS

LG Electronics, "Discussion on Additional SRS Symbols", R1-1912267, 3GPP TSG RAN WG1 Meeting #99, Nov. 18-22, 2019, 4 pages.
Huawei, HiSilicon, "Remaining Issues on SRS for NR Positioning", R1-1911897, 3GPP TSG RAN WG1 Meeting #99, Nov. 18-22, 2019, 14 pages.

(Continued)

*Primary Examiner* — Michael Thier
*Assistant Examiner* — Tracy Lauren Raimondo
(74) *Attorney, Agent, or Firm* — The Farrell Law Firm, P.C.

(57) ABSTRACT

A method, performed by a terminal, of performing channel estimation in a wireless communication system may include: transmitting, to a base station, capability information of the terminal and state information of the terminal regarding sounding reference signal (SRS) transmission; receiving, from the base station, information for configuring a partial band of an uplink band as an SRS frequency band for SRS transmission; and transmitting, to the base station, an SRS in the SRS frequency band.

10 Claims, 22 Drawing Sheets

(56) References Cited

U.S. PATENT DOCUMENTS

| | | | |
|---|---|---|---|
| 2018/0287682 A1 | 10/2018 | Kwak et al. | |
| 2019/0044598 A1 | 2/2019 | Talarico et al. | |
| 2019/0075524 A1* | 3/2019 | Zhou | H04W 72/23 |
| 2019/0372734 A1* | 12/2019 | Choi | H04B 7/0628 |
| 2020/0044805 A1* | 2/2020 | Iwai | H04W 52/365 |
| 2020/0235881 A1* | 7/2020 | Choi | H04B 1/713 |
| 2020/0313827 A1 | 10/2020 | Noh et al. | |
| 2020/0373987 A1 | 11/2020 | Noh et al. | |

OTHER PUBLICATIONS

Samsung, "RAN2 Impacts from Bandwidth Part in NR", R2-1704503, 3GPP TSG-RAN WG2 NR #98 Meeting, May 15-19, 2017, 5 pages.
International Search Report dated May 11, 2021 issued in counterpart application No. PCT/KR2021/001778, 15 pages.
CMCC, "Consideration on Flexible SRS Configuration and Transmission for NR", R1-1612185, 3GPP TSG RAN WG1 #87, Oct. 14-18, 2016, 4 pages.
Nokia, Nokia Shanghai Bell, "SRS Design Considerations in NR", R1-1716511, 3GPP TSG RAN WG1 Meeting NR#3, Sep. 18-21, 2017, 6 pages.
European Search Report dated Mar. 27, 2023 issued in counterpart application No. 21754617.5-1213, 12 pages.
Huawei, HiSilicon, "UL SRS Design for CSI Acquisition and Beam Management", R1-1704241, 3GPP TSG RAN WG1 Meeting #88bis, Apr. 3-7, 2017, 16 pages.
Sony, "Open Issues on SRS Design", R1-1709363, 3GPP TSG RAN WG1 #89, May 15-19, 2017, 24 pages.
Korean Office Action dated Jul. 1, 2025 issued in counterpart application No. 10-2020-0017864, 8 pages.

* cited by examiner

METHOD AND APPARATUS FOR TRANSMITTING OR RECEIVING REFERENCE SIGNAL IN WIRELESS COMMUNICATION SYSTEM

PRIORITY

This application is a National Phase Entry of PCT International Application No. PCT/KR2021/001778, which was filed on Feb. 10, 2021, and claims priority to Korean Patent Application No. 10-2020-0017864, which was filed on Feb. 13, 2020, the entire content of each of which is incorporated herein by reference.

TECHNICAL FIELD

The present disclosure relates to a method and apparatus for transmitting and receiving a reference signal in a wireless communication system. More specifically, the present disclosure relates to a method and apparatus for partial sounding reference signal (SRS) sounding in a wireless communication system.

BACKGROUND ART

To meet the demand for wireless data traffic having increased since deployment of $4^{th}$ Generation (4G) communication systems, efforts have been made to develop an improved $5^{th}$ Generation (5G) or pre-5G communication system. For this reason, 5G or pre-5G communication system is also called 'Beyond 4G Network' or 'Post Long-Term Evolution (LTE) System'. The 5G communication system is considered to be implemented in ultra-high frequency (millimeter (mm) Wave) bands, (e.g., 60 gigahertz (GHz) bands), so as to accomplish higher data rates. In order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems. In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and received-interference cancelation, have been developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet-of-Things (IOT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/ wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technologies and various industries.

Accordingly, various attempts are being made to apply 5G communication systems to IoT networks. For example, technologies such as a sensor network, M2M communication, and MTC are implemented by beamforming, MIMO, or array antenna schemes. The application of cloud RAN as the big data processing technology described above may be an example of convergence of 5G communication technology and IoT technology.

DESCRIPTION OF EMBODIMENTS

Solution to Problem

The present disclosure may provide a method and apparatus for partial sounding reference signal (SRS) sounding for efficient transmission and reception of an uplink or downlink in a wireless communication system.

Advantageous Effects of Disclosure

Embodiments of the present disclosure provide a method and apparatus for transmitting and receiving a sounding reference signal for efficient transmission and reception of an uplink or a downlink in a wireless communication system.

BEST MODE

Figure 1:
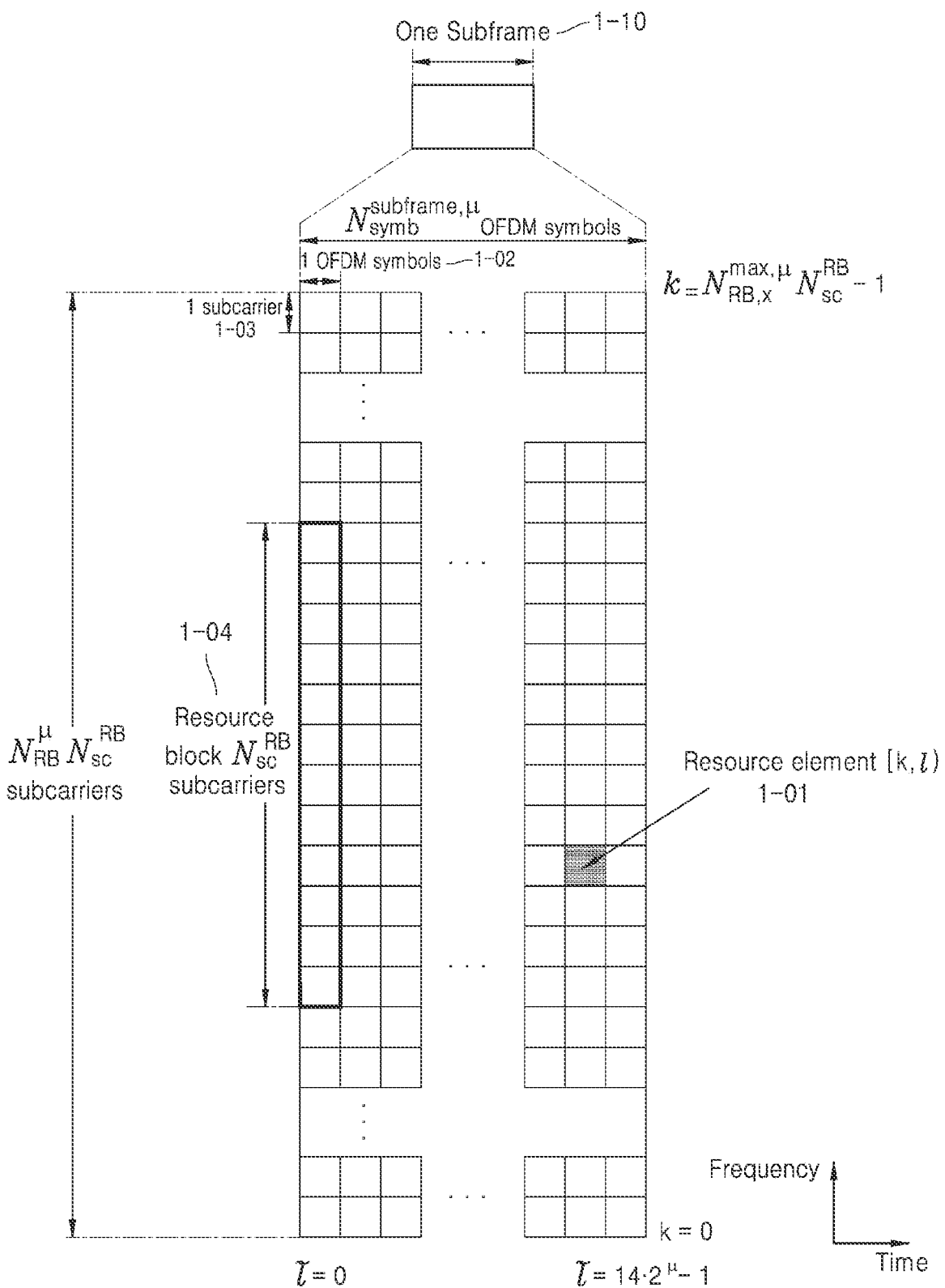
FIG. 1 is a diagram illustrating a time-frequency domain that is a radio resource domain of a $5^{th}$ Generation (5G) system, according to an embodiment of the present disclosure.

According to an aspect of the present disclosure, there is provided a method, performed by a terminal, of performing channel estimation in a wireless communication system including: transmitting, to a base station, capability information of the terminal regarding sounding reference signal (SRS) transmission and state information of the terminal; receiving, from the base station, information for configuring a partial band of an uplink band as an SRS frequency band for SRS transmission; and transmitting, to the base station, an SRS in the SRS frequency band.

In addition, according to an embodiment of the present disclosure, the capability information of the terminal may include information about an SRS transmission mode supported by the terminal for SRS transmission in the partial band of the uplink band.

In addition, according to an embodiment of the present disclosure, the state information of the terminal may include at least one of channel state information (CSI) or a power headroom report.

In addition, according to an embodiment of the present disclosure, the information for configuring as the SRS frequency band may include information for configuring an entire band of the uplink band as the SRS frequency band for SRS transmission, and the transmitting of the SRS to the base station may include transmitting the SRS through some resources of the SRS frequency band, based on a frequency hopping period.

In addition, according to an embodiment of the present disclosure, the information for configuring as the SRS frequency band may include information for configuring a partial band of the SRS frequency band as a band of interest, and the transmitting of the SRS to the base station may include transmitting the SRS to the base station in the band of interest.

In addition, according to an embodiment of the present disclosure, the method may further include: receiving, from the base station, an SRS frequency band hopping indication; moving from the SRS frequency band to a new SRS frequency band based on the SRS frequency band hopping indication; and performing frequency hopping in the new SRS frequency band.

According to another aspect of the present disclosure, there is provided a method, performed by a base station, of performing channel estimation in a wireless communication system including: receiving, from a terminal, capability information of the terminal regarding sounding reference signal (SRS) transmission and state information of the terminal; transmitting information for configuring a partial band of an uplink band as an SRS frequency band for SRS transmission, based on the capability information of the terminal and the state information of the terminal; receiving, from the terminal, an SRS in the SRS frequency band; and determining channel state information of the SRS frequency band based on the received SRS.

According to another aspect of the present disclosure, there is provided a terminal for channel estimation in a wireless communication system including: a transceiver; and at least one processor configured to transmit, to a base station, capability information of the terminal regarding sounding reference signal (SRS) transmission and state information of the terminal, receive, from the base station, information for configuring a partial band of an uplink band as an SRS frequency band for SRS transmission, and transmit, to the base station, an SRS in the SRS frequency band.

In addition, according to an embodiment of the present disclosure, the capability information of the terminal may include information about an SRS transmission mode supported by the terminal for SRS transmission in the partial band of the uplink band.

In addition, according to an embodiment of the present disclosure, the state information of the terminal may include at least one of channel state information (CSI) or a power headroom report.

In addition, according to an embodiment of the present disclosure, the information for configuring as the SRS frequency band may include information for configuring an entire band of the uplink band as the SRS frequency band for SRS transmission, and the transmitting of the SRS to the base station may include transmitting the SRS through some resources of the SRS frequency band, based on a frequency hopping period.

In addition, according to an embodiment of the present disclosure, the information for configuring as the SRS frequency band may include information for configuring a partial band of the SRS frequency band as a band of interest, and the transmitting of the SRS to the base station may include transmitting the SRS to the base station in the band of interest.

In addition, according to an embodiment of the present disclosure, the at least one processor may be further configured to receive, from the base station, an SRS frequency band hopping indication, move from the SRS frequency band to a new SRS frequency band based on the SRS frequency band hopping indication, and perform frequency hopping in the new SRS frequency band.

According to another aspect of the present disclosure, there is provided a base station for channel estimation in a wireless communication system including: a transceiver; and at least one processor configured to receive, from a terminal, capability information of the terminal regarding sounding reference signal (SRS) transmission and state information of the terminal, transmit information for configuring a partial band of an uplink band as an SRS frequency band for SRS transmission, based on the capability information of the terminal and the state information of the terminal, receive, from the terminal, an SRS in the SRS frequency band, and determine channel state information of the SRS frequency band based on the received SRS.

Mode of Disclosure

Hereinafter, embodiments of the present disclosure are described in detail with reference to the accompanying drawings.

In the description of embodiments, technical features that are well known to the technical field to which the present disclosure belongs but are not directly associated with the present disclosure are not described. This is not to obscure but to clearly deliver the gist of the present disclosure by omitting an unnecessary description.

For the same reason, in the accompanying drawings, some elements are exaggerated, omitted, or schematically shown. In addition, sizes of elements do not fully reflect actual sizes thereof. Like reference numbers are used to refer to like elements through at the drawings.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification. In addition, in describing the present disclosure, when the detailed description of a relevant function or configuration is determined to unnecessarily obscure the gist of the present disclosure, the detailed description thereof will be omitted. Also, the terms as used herein are those defined by taking into account functions in the present disclosure, and may vary depending on the intention of users or operators, precedents, or the like. Therefore, their definitions should be made based on the description throughout the specification.

Hereinafter, a base station (BS) is an entity that allocates resources to a terminal, and may be at least one of a gNode B, an eNode B, a Node B, a radio access unit, a BS controller, or a node on a network. A terminal may include a user equipment (UE), a mobile station (MS), a cellular phone, a smart phone, a computer, or a multimedia system capable of performing a communication function. In the present disclosure, a downlink (DL) may refer to a wireless transmission path of a signal for transmission from a BS to a terminal, and an uplink (UL) may refer to a wireless transmission path of a signal for transmission from a terminal to a BS. In addition, while embodiments of the present disclosure are described by using a Long-Term Evolution (LTE) or LTE Advance (LTE-A) system as an example, the embodiments of the present disclosure are also applicable to other communication systems having a similar technical background or channel form. For example, $5^{th}$ Generation (5G) mobile communication technology (5G system, which may be interchangeably used with 'New Radio (NR)') developed after LTE-A may be included therein, and the 5G system described below may be a concept including legacy LTE, LTE-A and other similar services. Also, the present disclosure is also applicable to other communication systems through some modifications within a range that does not largely depart from the scope of the present disclosure based on determination by a skilled person.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-executable or computer-readable memory capable of orienting a computer or other programmable data processing equipment to implement a function in a particular mode, and thus, the instructions stored in the computer-executable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term '. . . unit' used in the embodiments indicates a component including software or hardware, such as a field-programmable gate array (FPGA) or an application-specific integrated circuit (ASIC), and the ' . . . unit' performs certain roles. However, the ' . . . unit' does not always have a meaning limited to software or hardware. The ' . . . unit' may be configured either to be stored in an addressable storage medium or to execute one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. Also, in an embodiment, the ' . . . unit' may include one or more processors.

Hereinafter, embodiments of the present disclosure are described in detail with reference to the accompanying drawings. Hereinafter, a method and apparatus proposed in embodiments of the present disclosure are described with reference to an example of a service for improving coverage, but the embodiments of the present disclosure are not limited thereto, and it is also possible to use the data channel, the control channel, and a combination of all or some of one or more embodiments described herein may be used for methods of transmitting and receiving a data channel, a control channel, and the reference signal. Therefore, the embodiments of the present disclosure may be applied through some modifications within a range that does not largely depart from the scope of the present disclosure based on determination by a skilled person.

In addition, in describing the present disclosure, when the detailed description of a relevant function or configuration is determined to unnecessarily obscure the gist of the present disclosure, the detailed description thereof will be omitted. Also, the terms as used herein are those defined by taking into account functions in the present disclosure, and may vary depending on the intention of users or operators, precedents, or the like. Therefore, their definitions should be made based on the description throughout the specification.

Wireless communication systems have evolved from systems providing voice-oriented services to broadband wireless communication systems providing high-speed, high-quality packet data services of communication standards such as High Speed Packet Access (HSPA) of the 3rd Generation Partnership Project (3GPP), LTE or Evolved Universal Terrestrial Radio Access (E-UTRA), LTE-A, LTE-Pro, High-Rate Packet Data (HRPD) of 3GPP2, Ultra Mobile Broadband (UMB), IEEE 802.16e, etc.

An LTE system, which is a representative example of broadband wireless communication system, employs an orthogonal frequency-division multiplexing (OFDM) scheme for a DL, and employs a single-carrier frequency-division multiple access (SC-FDMA) scheme for a UL. The term 'UL' refers to a wireless link via which a UE or an MS transmits data or a control signal to an eNode B or BS, and the term 'DL' refers to a wireless link via which an eNode B or BS transmits data or a control signal to a UE. In the above-described multiple access scheme, in general, data or control information of each user may be distinguished by assigning and operating time-frequency resources, at which the data or control information of each user is transmitted, so as not to overlap each other, i.e., to establish orthogonality.

Post-LTE communication systems, e.g., 5G communication systems, are required to simultaneously support various requirements to freely reflect various requirements from users and service providers. Services considered for 5G communication systems include enhanced mobile broadband (eMBB), massive machine-type communication (mMTC), ultra-reliability low-latency communication (URLLC), and the like.

eMBB aims at providing a data transmission rate that is more enhanced than that supported by legacy LTE, LTE-A, or LTE-pro. For example, in 5G communication systems, eMBB needs to provide a peak data rate of 20 Gbps in a DL, and a peak data rate of 10 Gbps in a UL, from the perspective of a single eNB. In addition, 5G communication systems also need to provide an increased user-perceived data rate while simultaneously providing such peak data rate. In order to satisfy such requirements, various transmission/reception technologies including a further enhanced multiple-input and multiple-output (MIMO) transmission technology need to be improved. In addition, an LTE system transmits a signal by using a maximum transmission bandwidth of 20 megahertz (MHz) in a frequency band of 2 gigahertz (GHz) whereas a 5G communication system transmits a signal by using a frequency bandwidth wider than 20 MHz in a frequency band of 3 to 6 GHz or greater, and thus may satisfy the data rate requirements necessary for the 5G communication system.

When a BS supports a wide bandwidth frequency, a bandwidth part (BWP) technology, which divides an entire carrier frequency band into multiple frequency bands, each of which the BS may support for each terminal, is becoming more important. That is, when a BS supports a BWP and a certain terminal has a low bandwidth capability, the BS may support a low frequency band for the terminal through the BWP and may reduce energy consumption of the terminal by reducing the frequency band by switching the BWP. In addition, different frame structures may be supported for multiple BWPs, respectively, and various services may be provided to one terminal by switching between the BWPs without latency. The BWP technology may be applied to a control channel or a data channel corresponding one terminal and one BS. Also, for a control channel and a data channel for transmitting a common signal, for example, a synchronization signal, a physical broadcast channel (PBCH), or system information, to a plurality of terminals in a system, a BS may transmit the control channel and the data channel only in a configured BWP such that the BWP is applied for reducing energy consumption of the BS.

In addition, the 5G communication system considers mMTC in order to support application services such as Internet of Thing (IoT). mMTC may require supporting access by a large number of terminals within a cell, improvement of the coverage of a terminal, enhanced battery life expectancy, reduction of costs of a terminal, and the like, in order to effectively provide IoT. IoT provides a communication function via attachment to various sensors and various devices, and thus, a large number of terminals needs to be supported within a cell (e.g., 1,000,000 terminals/km$^2$). In addition, a terminal that supports mMTC is likely to be located in a shadow area that a cell cannot cover, such as the basement of a building, in terms of the feature of the service, and thus may require coverage wider than those of other services provided in the 5G communication system. A terminal supporting mMTC needs to be inexpensive, and because it is difficult to frequently replace a battery of the terminal, the terminal requires a significantly long battery lifetime, for example, 10 to 15 years.

Finally, URLLC is a cellular-based wireless communication service used for mission-critical purposes. For example, URLLC may be used in remote control of robots or machinery, industrial automation, unmanned aerial vehicles, remote health care, emergency alert, etc. Accordingly, communication provided by URLLC needs to provide significantly low latency and significantly high reliability. For example, a service that supports URLLC needs to satisfy an air interface latency of less than 0.5 milliseconds and simultaneously needs to satisfy a requirement of a packet error rate of 10-5 or less. Accordingly, for a service that supports URLLC, the 5G system needs to provide a transmission time interval (TTI) that is shorter than that of other services, and simultaneously allocate broad resources in a frequency band in order to ensure the reliability of a communication link.

The three services of the 5G communication system (hereinafter, may be interchangeably used with '5G system'), i.e., eMBB, URLLC, and mMTC, may be multiplexed and transmitted in one system. In order to satisfy different requirements of the services, different transmission and reception schemes and different transmission and reception parameters may be used between the services.

Hereinafter, a frame structure of a 5G system will be described in more detail with reference to the drawings.

FIG. 1 is a diagram illustrating a time-frequency domain that is a radio resource domain of a 5G system, according to an embodiment of the present disclosure.

In FIG. 1, the horizontal axis represents the time domain, and the vertical axis represents the frequency domain. A basic resource unit in the time-frequency domain is a resource element (RE) 1-01 and may be defined by one OFDM symbol (or discrete Fourier transform spread OFDM (DFT-s-OFDM) symbol) 1-02 in the time axis and one subcarrier 1-03 in the frequency axis. In the frequency domain, $N_{SC}^{RB}$ (e.g., 12) consecutive REs may constitute one resource block (RB) 1-04. In addition, in the time domain, $N_{symbol}^{subframe}$ consecutive OFDM symbols may constitute one subframe 1-10.

Figure 2:
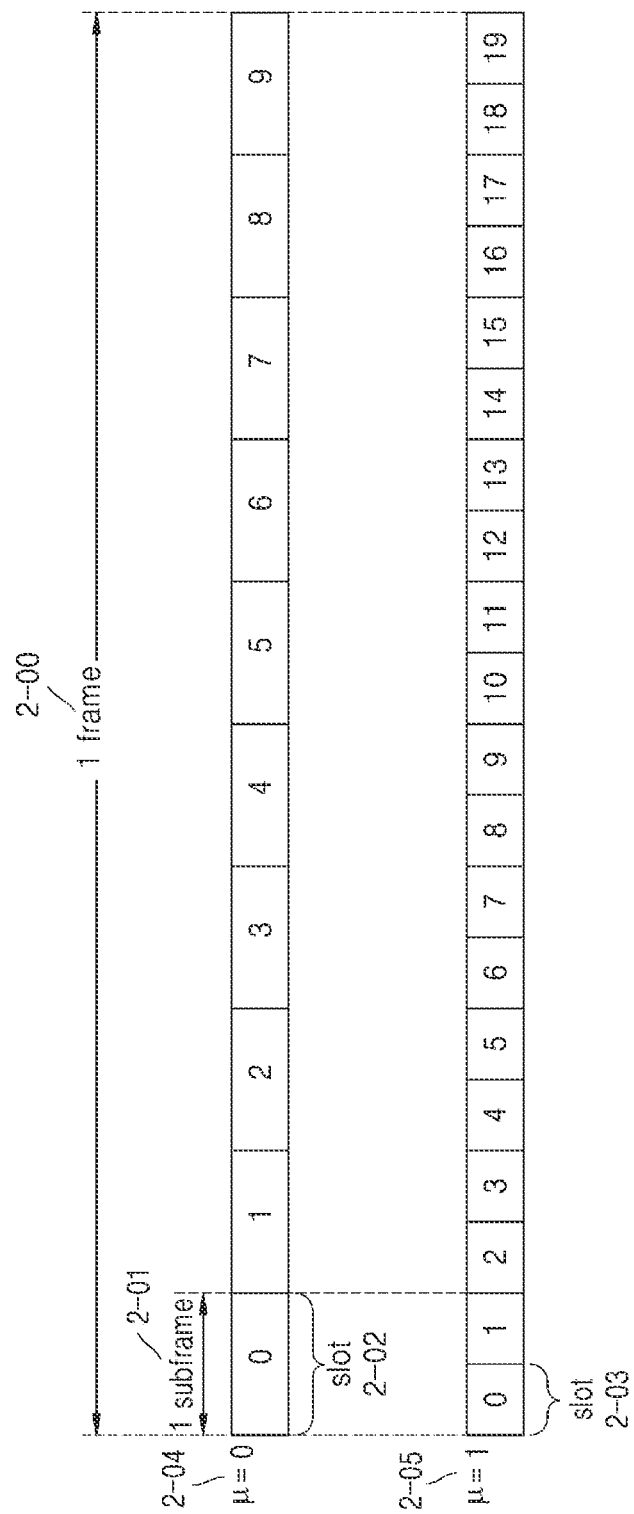
FIG. 2 is a diagram illustrating a slot structure considered in a 5G system, according to an embodiment of the present disclosure.

FIG. 2 is a diagram illustrating a slot structure considered in a 5G system, according to an embodiment of the present disclosure.

FIG. 2 illustrates an example of a structure of a frame 2-00, subframes 2-01, and slots 2-02. One frame 2-00 may be defined as 10 ms. One subframe 2-01 may be defined as 1 ms, and thus one frame 2-00 may include a total of 10 subframes 2-01. In addition, one slot 2-02 or 2-03 may be defined as 14 OFDM symbols (i.e., the number of symbols per slot $N_{symb}^{slot}=14$). One subframe 2-01 may be composed of one or more slots 2-02 or 2-03, and the number of slots 2-02 or 2-03 per subframe 2-01 may vary depending on a configuration value μ 2-04 or 2-05 for a subcarrier spacing.

FIG. 2 illustrates the subcarrier spacing configuration value μ being 0 (2-04) and the subcarrier configuration value μ being 1 (2-05). When μ=0 (2-04), one subframe 2-01 may be composed of one slot 2-02, and when μ=1 (2-05), one subframe 2-01 may be composed of two slots 2-03. That is, the number of slots per subframe ($N_{slot}^{subframe,\mu}$) may vary depending on the subcarrier spacing configuration value μ, and accordingly, the number of slots per frame ($N_{slot}^{frame,\mu}$) may also vary. $N_{slot}^{subframe,\mu}$ and $N_{slot}^{frame,\mu}$ according to each subcarrier spacing configuration μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (SSB) (may be interchangeably used with 'SS block' or 'SS/PBCH block') may be transmitted for initial access, and a SSB may include a primary synchronization signal (PSS), a secondary synchronization signal (SSS), and a PBCH. In an initial access phase in which a terminal initially accesses a system, the terminal may obtain DL time and frequency domain synchronization and a cell identifier (ID) from a synchronization signal through a cell search. The synchronization signal may include a PSS and an SSS.

In addition, the terminal may receive a PBCH for transmitting a master information block (MIB) from a BS and obtain transmission/reception-related system information, such as a system bandwidth or relevant control information, and a basic parameter value. Based on the information, the terminal may perform decoding on a physical DL control channel (PDCCH) and a physical DL shared channel (PDSCH) to obtain a system information block (SIB). Thereafter, the terminal exchanges an identity with the BS through a random access phase and initially accesses the network through a registration phase, an authentication phase, and the like.

The synchronization signal is a reference signal for cell search, and, when the synchronization signal is transmitted, a subcarrier spacing appropriate for a channel environment, such as phase noise, for each frequency band is applied to the synchronization signal. A 5G BS may transmit a plurality of SSBs according to the number of analog beams to be operated. A PSS and an SSS may be mapped and transmitted over 12 RBs, and a PBCH may be mapped and transmitted over 24 RBs.

A BWP configuration in a 5G communication system will now be described in detail with reference to the drawings.

Figure 3:
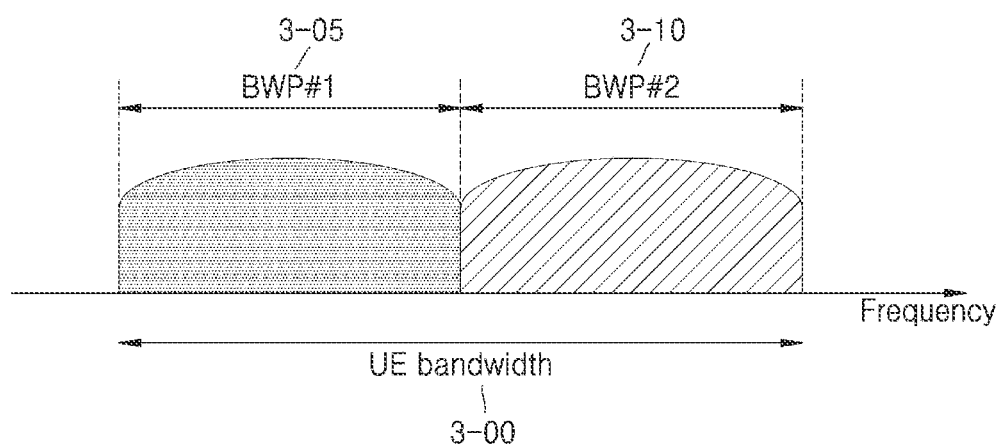
FIG. 3 is a diagram illustrating an example of a bandwidth part (BWP) configuration in a 5G communication system, according to an embodiment of the present disclosure.

FIG. 3 is a diagram illustrating an example of a BWP configuration in a 5G communication system, according to an embodiment of the present disclosure.

FIG. 3 illustrates an example in which a UE bandwidth 3-00 includes two BWPs, that is, BWP #1 3-05 and BWP #2 3-10. A BS may configure one or more BWPs for a terminal, and may configure a plurality of pieces of information below for each BWP.

TABLE 2

| BWP ::= | SEQUENCE { |
|---|---|
| bwp-Id | BWP-Id, |
| (BWP identifier) | |
| locationAndBandwidth | INTEGER (1..65536), |
| (BWP location) | |
| subcarrierSpacing | ENUMERATED |
| | {n0, n1, n2, n3, n4, n5}, |
| (subcarrier spacing) | |
| cyclicPrefix | ENUMERATED { extended } |
| (cyclic prefix) | |
| } | |

Obviously, the present disclosure is not limited to the above example, and in addition to the configuration information in Table 2, various parameters related to a BWP may be configured for the terminal. The BS may transmit the information to the terminal through higher layer signaling, e.g., radio resource control (RRC) signaling. At least one of the configured one or more BWPs may be activated. Whether the configured BWP is activated may be semi-statically transmitted from the BS to the terminal through RRC signaling or may be dynamically transmitted through DL control information (DCI).

According to some embodiments, before RRC connection is established, an initial BWP for initial access may be configured for the terminal by the BS via an MIB. In more detail, the terminal may receive configuration information about a search space and a control region (e.g., a control resource set (CORESET)) where a PDCCH may be transmitted in order to receive system information (e.g., remaining system information (RMSI) or system information block 1 (SIB1)) required for initial access, via the MIB in an initial access phase. Each of the control region and the search space configured by the MIB may be regarded to have an ID of 0. The BS may inform the terminal of configuration information about control region #0, such as frequency allocation information, time allocation information, numerology, and the like, via the MIB. In addition, the BS may inform the terminal of configuration information about a monitoring period and occasion on control region #0, that is, configuration information about search space #0, via the MIB. The terminal may regard a frequency region that is configured to be control region #0 obtained from the MIB, as the initial BWP for initial access. In this case, the ID of the initial BWP may be regarded as 0.

A BWP configuration supported in the 5G system may be used for various purposes.

According to some embodiments, when the bandwidth supported by a terminal is less than a system bandwidth, the BWP configuration may be used to support the bandwidth. For example, when the frequency position of a BWP (Configuration Information 2) is configured for a terminal, the terminal is able to transmit or receive data at a certain frequency position in the system bandwidth.

Also, according to some embodiments, in order to support different numerologies, a BS may configure a plurality of BWPs for a terminal. For example, in order to support data transmission/reception using a subcarrier spacing of 15 kHz and a subcarrier spacing of 30 kHz for a certain terminal, two BWPs may be configured based on the subcarrier spacing of 15 kHz and the subcarrier spacing of 30 kHz, respectively. The different BWPs may be frequency-division multiplexed, and when data transmission/reception based on a certain subcarrier spacing is needed, a BWP configured based on the corresponding subcarrier spacing may be activated.

Also, according to some embodiments, a BS may configure BWPs having different bandwidths for a terminal for the purpose of reducing power consumption of the terminal. For example, when a terminal supports a significantly wide bandwidth, e.g., a bandwidth of 100 MHz, and always transmits or receives data by using the bandwidth, the terminal may consume a significantly large amount of power. Particularly, in a situation in which traffic does not exist, unnecessarily monitoring a DL control channel in a wide bandwidth of 100 MHz may be significantly inefficient from the perspective of power consumption. In order to reduce the power consumption of the terminal, the BS may configure a BWP of a relatively narrower bandwidth, e.g., a BWP of 20 MHz, for the terminal. In a situation in which traffic does not exist, the terminal may perform monitoring in the BWP of 20 MHz, and when data is present, the terminal may transmit or receive the data via the BWP of 100 MHz according to an instruction from the BS.

In the method of configuring a BWP, before RRC connection is established, terminals may receive configuration information about an initial BWP via an MIB at the initial access phase. In more detail, a control region (e.g., a CORESET) for a DL control channel on which DCI, which schedules an SIB, may be transmitted, may be configured for a terminal via an MIB of a PBCH. The bandwidth of the control region configured by using the MIB may be regarded as an initial BWP, and the terminal may receive a PDSCH on which an SIB is transmitted, via the configured initial BWP. The initial BWP may be used for other system information (OSI), paging, and random access, in addition to reception of an SIB.

When one or more BWPs are configured for a terminal, a BS may instruct the terminal to switch between the BWPs, by using a BWP indicator field in the DCI. For example, when a currently activated BWP of the terminal is BWP #1 3-05 in FIG. 3, the BS may indicate BWP #2 3-10 to the terminal through the BWP indicator in the DCI, and the terminal may switch the BWP to BWP #2 3-10 indicated by the BWP indicator in the received DCI.

As described above, because a DCI-based BWP switch may be indicated by DCI for scheduling a PDSCH or a physical UL shared channel (PUSCH), when the terminal receives a BWP switch request, the terminal needs to be able to receive or transmit the PDSCH or the PUSCH scheduled by the DCI in a switched BWP without difficulty. To this end, requirements for a delay $T_{BWP}$ required for a BWP switch are specified in a standard, and, for example, may be defined as follows.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirements for a BWP switch delay support Type 1 or Type 2 depending on the capability of the terminal. The terminal may report a supportable BWP delay type to the BS.

Figure 4:
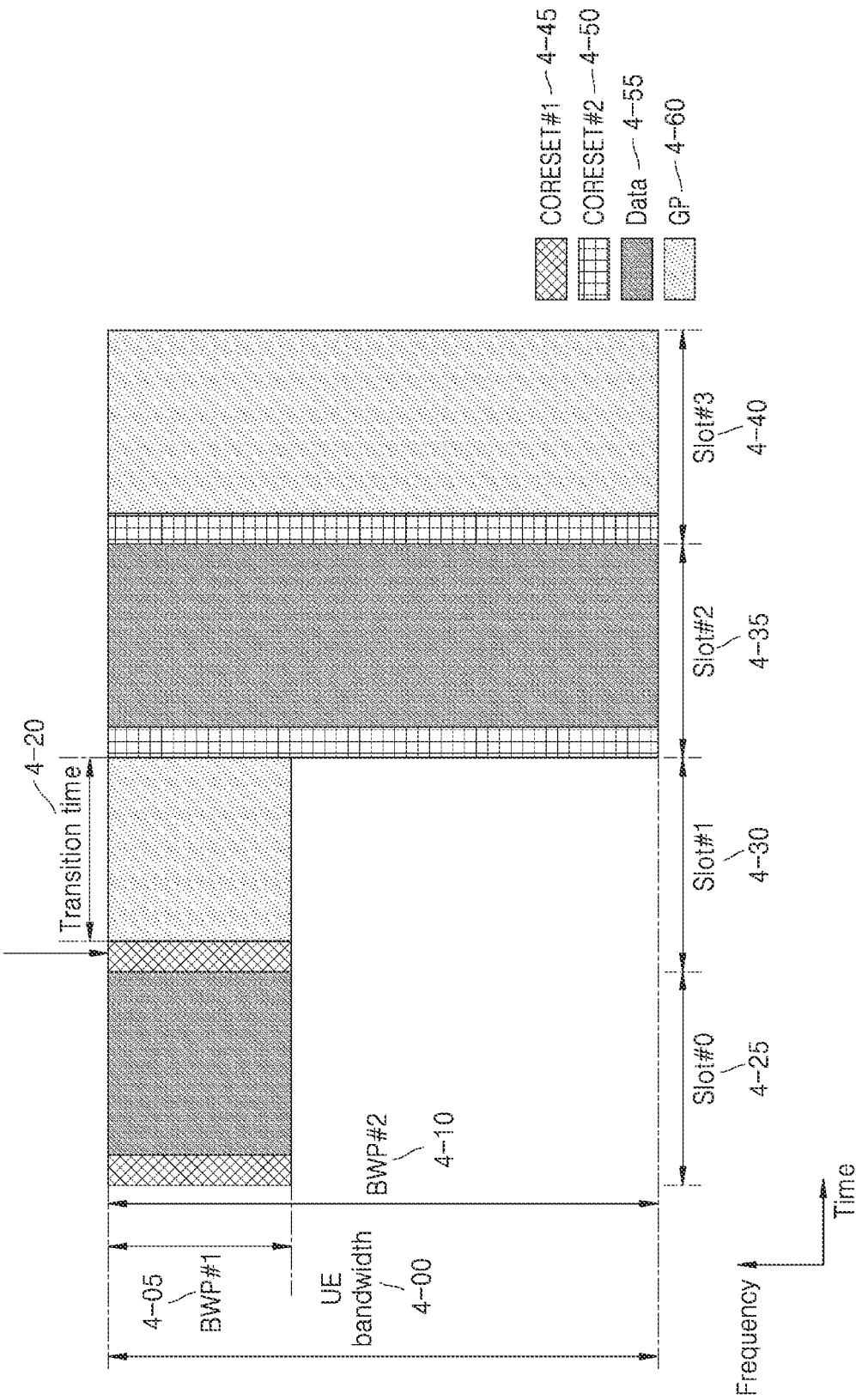
FIG. 4 is a diagram illustrating an example of a method of switching between BWPs in a 5G communication system, according to an embodiment of the present disclosure.

FIG. 4 is a diagram illustrating an example of a method of switching between BWPs, according to an embodiment of the present disclosure.

Referring to FIG. 4, according to the requirements for a BWP switch delay, when the terminal receives DCI including a BWP switch indicator in a slot n (4-15), the terminal may complete switching to a new BWP indicated by the BWP switch indicator no later than a slot n+$T_{BWP}$ and transmit and receive a data channel scheduled by the DCI, in a newly switched BWP 4-10. When the BS is to schedule a data channel with a new BWP, the BS may determine time domain resource allocation for the data channel considering a BWP switch delay $T_{BWP}$ 4-20 of the terminal. That is, when the BS is to schedule the data channel with the new BWP, in a method of determining time domain resource allocation for the data channel, the BS may schedule the data channel in a slot after the BWP switch delay (i.e., 4-35 or 4-40). Accordingly, the terminal may not expect that the DCI indicating the BWP switch indicates a slot offset K0 or K2 less than the BWP switch delay $T_{BWP}$ 4-20.

When the terminal receives DCI (e.g., DCI format 1_1 or 0_1) indicating a BWP switch, the terminal may not perform any transmission or reception during a time interval between a third symbol of a slot in which a PDCCH including the DCI is received, and a starting point of a slot indicated by the slot offset K0 or K2 indicated by a time domain resource allocation indicator field in the DCI. For example, when the terminal receives DCI indicating a BWP switch in a slot n and a slot offset indicated by the DCI is K, the terminal may not perform any transmission or reception during a time interval between a third symbol of the slot n and a symbol before a slot n+K (i.e., the last symbol of a slot n+K−1).

Hereinafter, a method of configuring transmission/reception-related parameters for each BWP in a 5G system will be described.

A terminal may be configured with one or more BWPs from a BS, and may be additionally configured with parameters (e.g., configuration information related to UL and DL data channels and control channels, etc.) to be used for transmission and reception for respective configured BWPs. For example, when the terminal has configured with BWP #1 3-05 and BWP #2 3-10 in FIG. 3, the terminal may be configured with transmission/reception parameter #1 for BWP #1 3-05 and may be configured with transmission/reception parameter #2 for BWP #2 3-10. When BWP #1 3-05 is activated, the terminal may perform transmission and reception with the BS based on transmission/reception parameter #1, and when BWP #2 3-10 is activated, the terminal may perform transmission and reception with the BS based on transmission/reception parameter #2.

In more detail, the following parameters may be configured for the terminal from the BS.

First, a plurality of pieces of information below may be configured for a UL BWP.

TABLE 4

```
BWP-Uplink ::= SEQUENCE {
    bwp-Id                              BWP-Id,
    (BWP identifier)
    bwp-Common                          BWP-UplinkCommon OPTIONAL,      -- Cond
        SetupOtherBWP
    (cell-specific or common parameters)
    bwp-Dedicated                       BWP-UplinkDedicated OPTIONAL,   -- Cond
        SetupOtherBWP
    (UE-specific parameters)
    ...
}
BWP-UplinkCommon ::= SEQUENCE {
    genericParameters                   BWP,
    (generic parameters)
    rach-ConfigCommon                          SetupRelease { RACH-ConfigCommon }
    OPTIONAL, -- Need M
    (random access-related common parameters)
    pusch-ConfigCommon                         SetupRelease { PUSCH-ConfigCommon }
    OPTIONAL, -- Need M
    (PUSCH-related common parameters)
    pucch-ConfigCommon                         SetupRelease { PUCCH-ConfigCommon }
    OPTIONAL, -- Need M
    (PUSCH-related common parameters)
    ...
}
BWP-UplinkDedicated ::= SEQUENCE {
    pucch-Config                               SetupRelease { PUCCH-Config } OPTIONAL, --
        Need M
    (PUCCH-related UE-specific parameters)
    pusch-Config                               SetupRelease { PUSCH-Config } OPTIONAL, --
        Need M
    (PUSCH-related UE-specific parameters)
    configuredGrantConfig
    (Configured grant-related parameters)       SetupRelease { ConfiguredGrantConfig
    } OPTIONAL, -- Need M
    srs-Config
    (SRS-related parameters)
                                                SetupRelease { SRS-Config }
    OPTIONAL, -- Need M
    beamFailureRecoveryConfig
    (beam failure recovery-related parameters) SetupRelease {
        BeamFailureRecoveryConfig } OPTIONAL, -- Cond SpCellOnly
    ...
}
```

According to Table 4 described above, the terminal may be configured with cell-specific (or cell-common or common) transmission-related parameters (e.g., random-access channel (RACH)-, physical UL control channel (PUCCH)-, and PUSCH-related parameters) from the BS (corresponding to BWP-UplinkCommon). In addition, the terminal may be configured with UE-specific (or dedicated) transmission-related parameters (e.g., PUCCH, PUSCH, grant-free-based UL transmission (configured grant PUSCH)-, and sounding reference signal (SRS)-related parameters) from the BS (corresponding to BWP-UplinkDedicated).

Next, a plurality of pieces of information below may be configured for a DL BWP.

TABLE 5

```
BWP-Downlink ::= SEQUENCE {
  bwp-Id                   BWP-Id,
  (BWP identifier)
  bwp-Common               BWP-DownlinkCommon OPTIONAL, -- Cond
    SetupOtherBWP
  (cell-specific or common parameters)
  bwp-Dedicated            BWP-DownlinkDedicated OPTIONAL, -- Cond
    SetupOtherBWP
  (UE-specific parameters)
  . . .
}
BWP-DownCommon ::= SEQUENCE {
  genericParameters        BWP,
  (generic parameters)
  pdcch-ConfigCommon            SetupRelease { PDCCH-ConfigCommon }
  OPTIONAL, -- Need M
  (PDCCH-related common parameters)
  pdsch-ConfigCommon            SetupRelease { PDSCH-ConfigCommon }
  OPTIONAL, -- Need M
  (PDSCH-related common parameters)
  . . .
}
BWP-DownDedicated ::= SEQUENCE {
  pdcch-Config             SetupRelease { PDCCH-Config } OPTIONAL, --
    Need M
  (PDCCH-related UE-specific parameters)
  pdsch-Config             SetupRelease { PDSCH-Config } OPTIONAL, --
    Need M
  (PDSCH-related UE-specific parameters)
  sps-Config
  (SPS-related parameters)    SetupRelease { SPS-Config } OPTIONAL, -- Need M
  radioLinkMonitoringConfig
  (RLM-related parameters)    SetupRelease { radioLinkMonitoringConfig}
    OPTIONAL, -- Cond SpCellOnly
  . . .
}
```

According to Table 5 described above, the terminal may be configured with cell-specific (or cell-common or common) reception-related parameters (e.g., PDCCH- and PDSCH-related parameters) from the BS (corresponding to BWP-DownlinkCommon). In addition, the terminal may be configured with UE-specific (or dedicated) reception-related parameters (e.g., PDCCH-, PDSCH-, grant-free-based DL data transmission (semi-persistent scheduled PDSCH)-, and radio link monitoring (RLM)-related parameters) from the BS (corresponding to BWP-UplinkDedicated).

Figure 5:
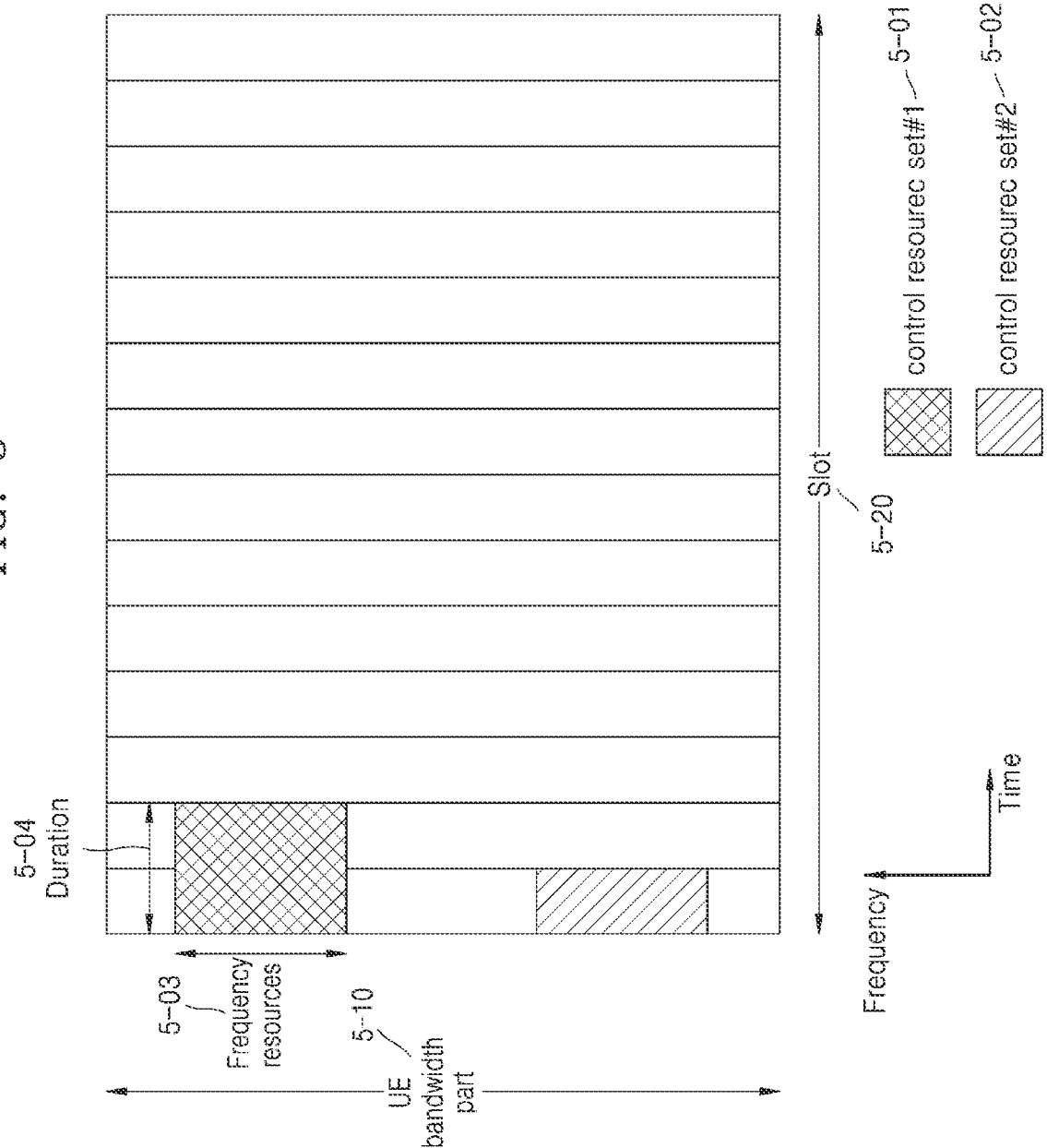
FIG. 5 is a diagram illustrating an example of a control resource set (CORESET) in which a downlink control channel is transmitted in a 5G wireless communication system, according to an embodiment of the present disclosure.

FIG. 5 is a diagram illustrating an example of a CORESET in which a DL control channel is transmitted in a 5G wireless communication system, according to an embodiment of the present disclosure.

FIG. 5 illustrates an example in which a UE BWP 5-10 is configured on a frequency axis and two CORESETs (CORESET #1 5-01 and CORESET #2 5-02) are configured in one slot 5-20 on a time axis. The CORESETs 5-01 and 5-02 may be configured in specific frequency resources 5-03 within the entire UE BWP 5-10 along the frequency axis. One or more OFDM symbols may be configured along the time axis, and may be defined as a CORESET duration 5-04. In the example illustrated in FIG. 5, CORESET #1 5-01 may be configured to have a CORESET duration of two symbols, and CORESET #2 5-02 may be configured to have a CORESET duration of one symbol.

In the above-described 5G system, a BS may configure a CORESET for a terminal through higher layer signaling (e.g., system information, an MIB, or RRC signaling). Configuring a CORESET for a terminal means providing information such as a CORESET identifier (identity), a frequency position of the CORESET, a symbol length of the CORESET, and the like. For example, information provided to configure a CORESET is as follows.

TABLE 6

```
ControlResourceSet ::=                    SEQUENCE{
  -- Corresponds to L1 parameter 'CORESET-ID'
  controlResourceSetId                    ControlResourceSetId,
    (control resource set identifier)
  frequencyDomainResources                BIT STRING (SIZE (45)),
    (frequency axis resource allocation information)
  duration                                INTEGER (1..maxCoReSetDuration),
    (time axis resource allocation information)
  cce-REG-MappingType                     CHOICE {
    (CCE-to-REG mapping type)
    interleaved                           SEQUENCE {
      reg-BundleSize                        ENUMERATED {n2, n3, n6},
        (REG bundle size)
      precoderGranularity                   ENUMERATED {sameAsREG-
    bundle, allContiguousRBs},
      interleaverSize                       ENUMERATED {n2, n3, n6}
```

TABLE 6-continued

```
        (interleaver size)
        shiftIndex
        INTEGER(0..maxNrofPhysicalResourceBlocks-1)
        (interleaver shift)
        },
    nonInterleaved                      NULL
    },
    tci-StatesPDCCH                     SEQUENCE(SIZE (1..maxNrofTCI-
        StatesPDCCH)) OF TCI-StateId        OPTIONAL
        (QCL configuration information)     ENUMERATED {enabled}
    tci-PresentinDCI
}
```

In a 5G system, a CORESET may include $N_{RB}^{CORESET}$ RBs in a frequency domain, and may include $N_{symb}^{CORESET} \in \{1,2,3\}$ symbols in a time axis. One control channel element (CCE) may include 6 resource element groups (REGs), and each REG may be defined as one RB during one OFDM symbol. REGs in one CORESET may be indexed in a time-first order, starting with 0 for the first OFDM symbol and the lowest RB in the CORESET.

In a 5G system, an interleaving method and a non-interleaving method are supported as a method of transmitting a PDCCH. The BS may configure whether to perform interleaving or non-interleaving transmission for each CORESET, for the terminal through higher layer signaling. Interleaving may be performed in units of REG bundles. The term 'REG bundle' may be defined as a set of one or more REGs. The terminal may determine a CCE-to-REG mapping scheme in the corresponding CORESET based on whether to perform interleaving or non-interleaving transmission, which is configured from the BS, by using the following method.

TABLE 7

The CCE-to-REG mapping for a control-resource set can be interleaved or non-interleaved and is described by REG bundles:
    REG bundle i is defined as REGs {iL,iL + 1,...,iL + L 1} where L is the
        REG bundle size, i = 0,1, ... ,$N_{REG}^{CORESET}/L - 1$, and $N_{REG}^{CORESET} =$
        $N_{RB}^{CORESET} N_{symb}^{CORESET}$ is the number of REGs in the CORESET
    CCE j consists of REG bundles {f(6j/L),f(6j/L + 1),...,f(6j/L + 6/L − 1)} where
        f(·) an interleaver
For non-interleaved CCE-to-REG mapping, L = 6 and f (x) = x.
For interleaved CCE-to-REG mapping, L ∈ {2,6}for $N_{symb}^{CORESET} = 1$ and L ∈
{$N_{symb}^{CORESET}$,6} for $N_{symb}^{CORESET} \in \{2,3\}$. The interleaver is defined by
        f(x) = (rC +c+ $n_{shift}$) mod ($N_{REG}^{CORESET}/L$)
           x = CR + r
           r = 0,1, ...,R − 1
           c = 0,1, ...,C − 1
           c = $N_{REG}^{CORESET}/(LR)$
where R ∈ {2,3,6}

A basic unit of a DL control channel, i.e., an REG, may include REs to which DCI is mapped and a region to which a demodulation reference signal (DMRS), which is a reference signal (RS) for decoding the REs, is mapped. One REG may include three DMRS REs. The number of CCEs required to transmit a PDCCH may be 1, 2, 4, 8, or 16 according to an aggregation level (AL), and different numbers of CCEs may be used to implement link adaptation of the DL control channel. For example, when AL=L, one DL control channel may be transmitted through L CCEs.

A terminal needs to detect a signal without knowing information about the DL control channel, and a search space indicating a set of CCEs for blind decoding is defined. The search space may be a set of DL control channel candidates including CCEs that the terminal needs to attempt to decode at a given AL, and because there are various ALs for bundling up 1, 2, 4, 8 or 16 CCEs, the terminal may have a plurality of search spaces. A search space set may be defined as a set of search spaces at all configured ALs.

Search spaces may be classified into common search spaces and UE-specific search spaces. A group of terminals or all terminals may investigate a common search space of a PDCCH in order to receive cell-common control information such as a dynamic scheduling or paging message for system information. For example, the terminal may receive PDSCH scheduling allocation information for SIB transmission including cell service provider information or the like by investigating the common search space of the PDCCH. Because a certain group of terminals or all terminals needs to receive a PDCCH, a common search space may be defined as a set of CCEs that are previously agreed on. Scheduling allocation information for a UE-specific PDSCH or PUSCH may be received by investigating a UE-specific search space of a PDCCH. The UE-specific search space may be UE-specifically defined by using a function of an identity of the terminal and various system parameters.

In a 5G system, parameters for a search space of a PDCCH may be configured by a BS for a terminal through higher layer signaling (e.g., an SIB, an MIB, or RRC signaling). For example, the BS may configure, for the terminal, the number of PDCCH candidates at each AL L, a monitoring period for the search space, a monitoring occasion of a symbol unit within a slot for the search space, a search space type (e.g., a common search space or a UE-specific search space), a combination of a radio network temporary identifier (RNTI) and a DCI format to be monitored in the search space, and an index of a CORESET for monitoring the search space. For example, the parameters for the search space of the PDCCH may include a plurality of pieces of information below.

TABLE 8

```
SearchSpace ::=                         SEQUENCE {
    -- Identity of the search space. SearchSpaceId = 0 identifies the SearchSpace
        configured via PBCH (MIB) or ServingCellConfigCommon.
    searchSpaceId                       SearchSpaceId,
    (search space identifier)
    controlResourceSetId                ControlResourceSetId,
    (control resource set identifier)
    monitoringSlotPeriodicityAndOffset  CHOICE {
(monitoring slot level period)
        sl1                             NULL,
        sl2                             INTEGER (0..1),
        sl4                             INTEGER (0..3),
        sl5                             INTEGER (0..4)
        sl8                             INTEGER (0..7),
        sl10                            INTEGER (0..9),
        sl16                            INTEGER (0..15),
        sl20                            INTEGER (0..19)
    }
    duration(monitoring duration)             INTEGER (2..2559)
    monitoringSymbolsWithinSlot         BIT STRING (SIZE (14))
    (monitoring symbols in slot)
    nrofCandidates                      SEQUENCE {
    (number of PDCCH candidates for each aggregation level)
        aggregationLevel1               ENUMERATED {n0, n1, n2, n3, n4,
    n5, n6, n8},
        aggregationLevel2               ENUMERATED {n0, n1, n2, n3, n4.
    n5, n6, n8},
        aggregationLevel4               ENUMERATED {n0, n1, n2, n3, n4.
    n5, n6, n8},
        aggregationLevel8               ENUMERATED {n0, n1, n2, n3, n4,
    n5, n6, n8},
        aggregationLevel16              ENUMERATED {n0, n1, n2, n3, n4,
    n5, n6, n8}
    },
    searchSpaceType                     CHOICE {
    (search space type)
        -- Configures this search space as common search space (CSS) and DCI
        formats to monitor.
        common                          SEQUENCE {
    (common search space)
        }
        ue-Specific                     SEQUENCE {
    (UE-specific search space)
            -- Indicates whether the UE monitors in this USS for DCI formats 0-0 and
            1-0 or for formats 0-1 and 1-1.
            formats                     ENUMERATED {formats0-0-
        And-1-0, formats0-1-And-1-1},
            ...
    }
}
```

The BS may configure one or more search space sets for the terminal according to configuration information. According to some embodiments, the BS may configure search space set 1 and search space set 2 for the terminal. In search space set 1, DCI format A scrambled by an X-RNTI may be configured to be monitored by the terminal in a common search space, and in search space set 2, DCI format B scrambled by a Y-RNTI may be configured to be monitored by the terminal in a UE-specific search space.

According to the configuration information, one or more search space sets may exist in the common search space or the UE-specific search space. For example, search space set #1 and search space set #2 may be configured in the common search space, and search space set #3 and search space set #4 may be configured in the UE-specific search space.

In the common search space, the following combinations of DCI formats and RNTIs may be monitored. However, the present disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. However, the present disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The above-described RNTIs may comply with the following definitions and uses.

C-RNTI (Cell RNTI): used for scheduling a UE-specific PDSCH

TC-RNTI (Temporary Cell RNTI): used for scheduling a UE-specific PDSCH

CS-RNTI (Configured Scheduling RNTI): used for scheduling a semi-statically configured UE-specific PDSCH RA-RNTI (Random Access RNTI): used for scheduling a PDSCH in a random access phase P-RNTI (Paging RNTI): used for scheduling a PDSCH for transmitting paging SI-RNTI (System Information RNTI): used for scheduling a PDSCH for transmitting system information INT-RNTI (Interruption RNTI): used for notifying whether a PDSCH is punctured TPC-PUSCH-RNTI (Transmit Power Control for PUSCH RNTI): used for indicating a power control command for a PUSCH TPC-PUCCH-RNTI (Transmit Power Control for PUCCH RNTI): used for indicating a power control command for a PUCCH TPC-SRS-RNTI (Transmit Power Control for SRS RNTI): used for indicating a power control command for an SRS The above-described DCI formats may comply with the following definitions.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot form at |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G system, a search space of an AL L in a CORESET p and a search space set s may be expressed as the following Equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: aggregation level
$n_{CI}$: carrier index
$N_{CCE,p}$: total number of CCEs in control resource set p
$n_{s,f}^\mu$: slot index
$M_{p,s,max}^{(L)}$: number of PDCCH candidates of aggregation level L
$M_{snCI}=0, \ldots, M_{p,s,max}^{(L)}-1$: indices of PDCCH candidates of aggregation level L
i=0, ..., L−1
$Y_{p,n_{s,f}^\mu} = (A_p \cdot Y_{p,n_{s,f}^\mu-1}) \bmod D$, $Y_{p,-1}=n_{RNTI} \neq 0$, $A_0=39827$, $A_1=39829$, $A_2=39839$, D=65537
$n_{RNTI}$: terminal identifier
In a common search space, $Y\_(p,n_{s,f}^\mu)$ may be 0.

In a UE-specific search space, $Y\_(p,n_{s,f}^\mu)$ may vary depending on an identity of a terminal (a C-RNTI or an ID configured for the terminal by a BS) and a time index.

Hereinafter, a method of configuring a transmission configuration indication (TCI) state, which is a means for indicating or exchanging quasi co-location (QCL) information between a terminal and a BS in a 5G communication system, will be described in detail.

A BS may configure and indicate a TCI state between two different RSs or channels through appropriate signaling, to notify of a QCL relationship between the different RSs or channels. That different RSs or channels are QCLed means that, when a channel is estimated through a target RS antenna port B (target RS #B) in a QCL relationship with a certain reference RS antenna port A (reference RS #A), the terminal is allowed to apply some or all of large-scale channel parameters estimated from the antenna port A to a channel measurement for the antenna port B. QCL may require different parameters to be associated with one another according to situations including 1) time tracking affected by average delay and delay spread, 2) frequency tracking affected by Doppler shift and Doppler spread, 3) radio resource management (RRM) affected by average gain, and 4) beam management (BM) affected by a spatial parameter. Accordingly, NR supports four types of QCL relationships as shown in Table 10 below.

TABLE 10

| QCL type | Large-scale characteristics |
|---|---|
| A | Doppler shift, Doppler spread, average delay, delay spread |
| B | Doppler shift, Doppler spread |
| | Doppler shift, average delay |
| D | Spatial Rx parameter |

The spatial Rx parameter may be a generic term for all or some of various parameters including angle of arrival (AoA), power angular spectrum (PAS) of AoA, angle of departure (AoD), PAS of AoD, transmit/receive channel correlation, transmit/receive beamforming, spatial channel correlation, etc.

The QCL relationships may be configured for the terminal through an RRC parameter TCI-State and QCL-Info as shown in Table 11 below. Referring to Table 11, the BS may configure at least one TCI state for the terminal to notify of up to two QCL relationships (e.g., qcl-Type1 and qcl-Type2) for an RS referring to an ID of the TCI state, i.e., a target RS. In this case, each QCL information (QCL-Info) included in each TCI state includes a serving cell index and a BWP index of a reference RS indicated by the QCL information, a type and an ID of the reference RS, and a QCL type as shown in Table 10.

TABLE 11

TCI-State ::=            SEQUENCE {
   tci-StateId              TCI-StateId,
   (corresponding TCI state ID)
   qcl-Type1                QCL-Info,
   (QCL information of first reference RS of RS (target RS) referring to corresponding TCI state ID)
   qcl-Type2                QCL-Info          OPTIONAL, -- Need R
   (QCL information of second reference RS of RS (target RS) referring to corresponding TCI state ID)
   . . .

TABLE 11-continued

```
}
QCL-Info ::=         SEQUENCE {
   cell              ServCellIndex      OPTIONAL, -- Need R
   (serving cell index of reference RS indicated by corresponding QCL information)
   bwp-Id            BWP-Id             OPTIONAL, -- Cond
CSI-RS-Indicated
   (BWP index of reference RS indicated by corresponding QCL information)
   referenceSignal   CHOICE {
      csi-rs         NZP-CSI-RS-ResourceId,
      ssb            SSB-Index
      (one of CSI-RS ID or SSB ID indicated by corresponding QCL information)
   qcl-Type          ENUMERATED {typeA, typeB, typeC, typeD}
   ...
}
```

Hereinafter, a method of configuring spatial relation information SpatialRelationInfo, which is a means for indicating UL beam information between a terminal and a BS in a 5G communication system, will be described in detail.

The BS may configure, for a UL channel or signal A (a channel or signal referring to the spatial relation information SpatialRelationInfo), a relationship with another DL channel or signal or UL channel or signal B (referenceSignal included in the SpatialRelationInfo configuration) through appropriate signaling. The terminal uses a beam direction, which is used for reception or transmission of the channel or signal B, for transmission of the channel or signal A based on the relationship.

The configuration of SpatialRelationInfo may vary depending on a type of the UL channel or signal referring to SpatialRelationInfo. For example, SpatialRelationInfo referred to by a PUCCH resource may include additional information (e.g., pucch-PathlossReferenceRS-Id, p0-PUCCH-Id, closedLoopindex, etc.) for determining PUCCH transmission power, in addition to information referenceSignal for determining a PUCCH transmission beam, as shown in an example of Table 11-1. Similarly, Table 11-2 shows an example of configuration of SpatialRelationInfo referred to by an SRS resource.

TABLE 11-1

```
PUCCH-SpatialRelationInfo ::=   SEQUENCE {
   pucch-SpatialRelationInfoId   PUCCH-SpatialRelationInfoId,
   (ID of spatial relation information referred to by PUCCH resource)
   servingCellId                                     SerCellIndex
OPTIONAL, -- Need S
   (serving cell index of reference RS indicated by corresponding Spatial
relation information)
   referencesignal              CHOICE {
      ssb-Index                 SSB-Index,
      csi-RS-Index              NZP-CSI-RS-ResourceId,
      srs                       SEQUENCE {
                                   resource
SRS-ResourceId,                    uplinkBWP
BWP-Id                          }
   }, (one of CSI-RS ID, SSB ID, or SRS resource ID indicated by
corresponding Spatial relation information)
   pucch-PathlossReferenceRS-Id   PUCCH-PathlossReferenceRS-Id,
   p0-PUCCH-Id                    P0-PUCCH-Id,
   closedLoopIndex                ENUMERATED { i0, i1 }
}
```

TABLE 11-2

```
SRS-SpatialRelationInfo ::=   SEQUENCE {
   servingCellId                               ServCellIndex
   OPTIONAL, -- Need S
   (serving cell index of reference RS indicated by corresponding
```

TABLE 11-2-continued

```
Spatial relation information)
   referencesignal              CHOICE {
      ssb-Index                 SSB-Index,
      csi-RS-Index              NZP-CSI-RS-ResourceId
      srs                       SEQUENCE {
         resourceId             SRS-ResourceId,
         uplinkBWP              BWP-Id
      }
   } (one of CSI-RS ID, SSB ID, or SRS resource ID indicated
by corresponding Spatial relation information)
}
```

Although it has been described above that a TCI state is used to indicate a beam of a DL channel (reception spatial filter value/type of the terminal) and SpatialRelationInfo is used to indicate a beam of a UL channel (transmission spatial filter value/type of the terminal), it does not imply a limitation according to UL/DL types and future mutual extension may be possible. For example, a related-art DL TCI state may be extended to a UL TCI state by adding a UL channel or signal to a type of a target RS that may refer to a TCI state or adding a UL channel or signal to a type of referenceSignal (reference RS) included in TCI state or QCL-Info. Although there are various other extension methods, such as DL-UL joint TCI state, not all methods will be described in order not to obscure the gist of the present disclosure.

Hereinafter, methods of allocating time and frequency resources for data transmission in NR will be described.

In NR, in addition to frequency-domain resource candidate allocation through a BWP indication, frequency-domain resource allocation (FD-RA) methods may be provided.

Figure 6:
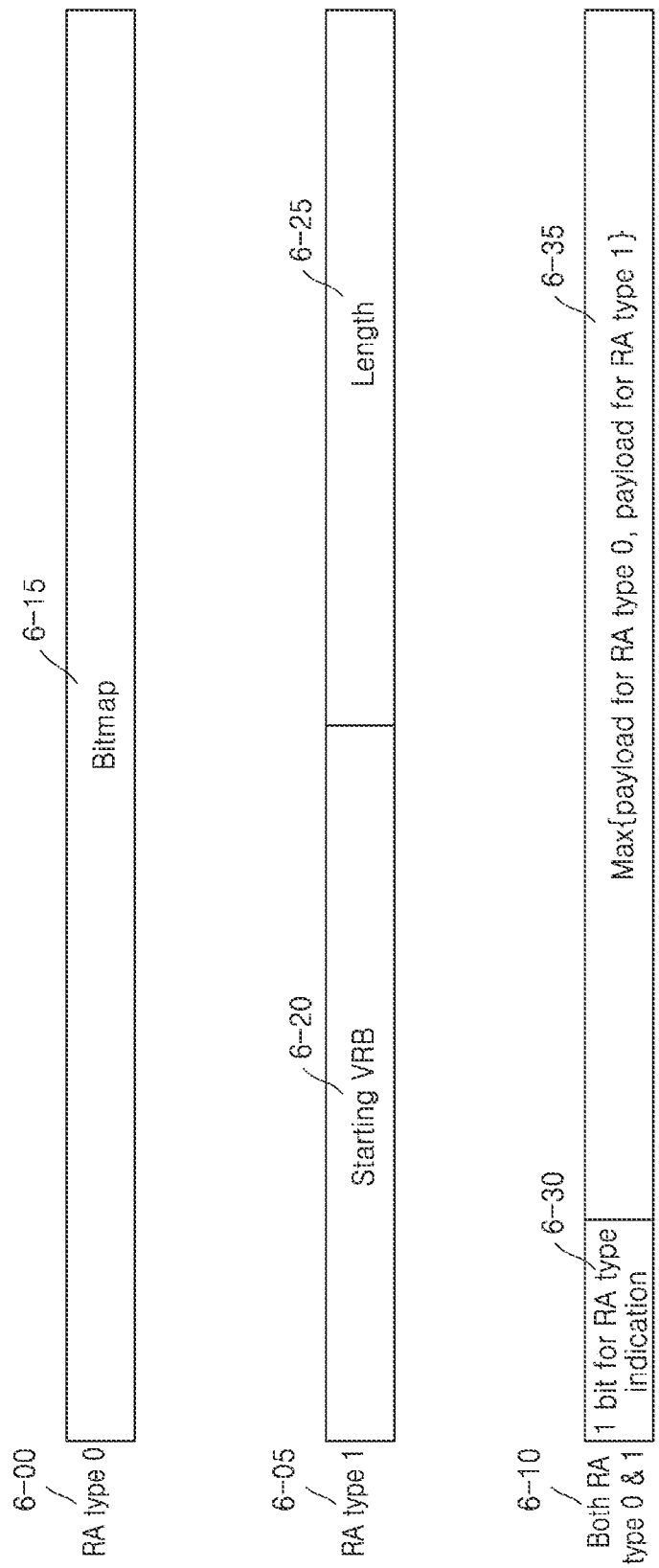
FIG. 6 is a diagram illustrating methods of allocating frequency-domain resources for a physical downlink shared channel (PDSCH) in a wireless communication system, according to an embodiment of the present disclosure.

FIG. 6 is a diagram illustrating an example of frequency-domain resource allocation for a PDSCH in a wireless communication system, according to an embodiment of the present disclosure.

FIG. 6 illustrates three frequency-domain resource allocation methods of type 0 6-00, type 1 6-05 and a dynamic switch 6-10, which are configurable via higher layer signaling in NR.

Referring to FIG. 6, when the terminal is configured, via higher layer signaling, to use only resource type 0 (6-00), a portion of DCI for allocating a PDSCH to the terminal has a bitmap including $N_{RBG}$ bits. The condition for satisfying this will be described again below. In this case, $N_{RBG}$ denotes the number of resource block groups (RBGs) determined according to a BWP size allocated by a BWP indicator and a higher layer parameter rbg-Size as shown in Table 12 below and data is transmitted on an RBG indicated as '1' according to the bitmap.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the terminal is configured, via higher layer signaling, to use only resource type 1 (6-05), partial pieces of DCI for allocating a PDSCH to the terminal has frequency-domain resource allocation information including $\lceil \log_2 (N_{RB}^{DL,\,BWP} (N_{RB}^{DL,\,BWP}+1)/2 \rceil$ bits. The condition for satisfying this will be described again below. The BS may configure a starting virtual RB (VRB) 6-20 and a length 6-25 of frequency-domain resources allocated subsequent thereto.

When the terminal is configured, via higher layer signaling, to use both resource type 0 and resource type 1 (6-10), partial pieces of DCI for allocating a PDSCH to the terminal has frequency-domain resource allocation information including bits of a large value 6-35 among a payload 6-15 for configuring resource type 0 and payloads 6-20 and 6-25 for configuring resource type 1. The condition for satisfying this will be described again below. In this case, one bit may be added to the foremost part (MSB) of the frequency-domain resource allocation information in the DCI, and bit 0 indicates that resource type 0 is used, and bit 1 indicates that resource type 1 is used.

Figure 7:
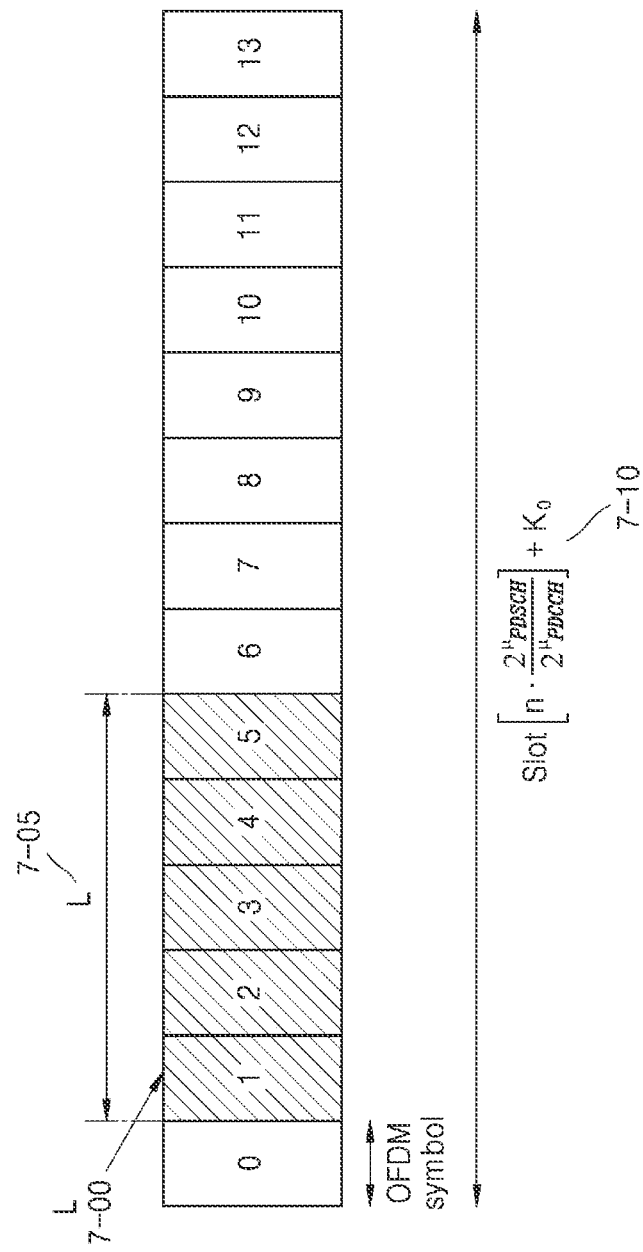
FIG. 7 is a diagram illustrating an example of time-domain resource allocation for a PDSCH in a wireless communication system, according to an embodiment of the present disclosure.

FIG. 7 is a diagram illustrating an example of time-domain resource allocation for a PDSCH in a wireless communication system, according to an embodiment of the present disclosure.

Referring to FIG. 7, a BS may indicate a time-domain location of a PDSCH resource according to subcarrier spacings (SCSs) $\mu_{PDSCH}$ and $\mu_{PDCCH}$ of a data channel and a control channel configured by using a higher layer, a scheduling offset $K_0$, a starting location 7-00 and a length 7-05 of OFDM symbols in one slot 7-10 dynamically indicated through DCI.

Figure 8:
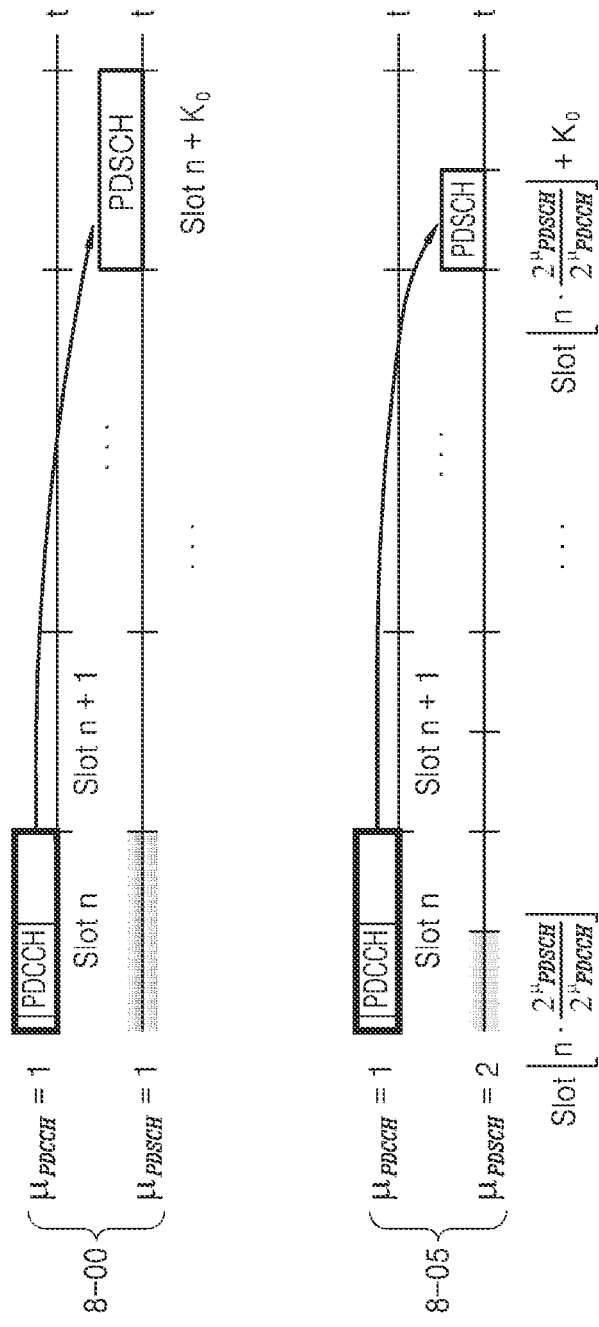
FIG. 8 a diagram illustrating an example of time-domain resource allocation according to subcarrier spacings of a data channel and a control channel in a wireless communication system, according to an embodiment of the present disclosure.

FIG. 8 a diagram illustrating an example of time-domain resource allocation according to subcarrier spacings of a data channel and a control channel in a wireless communication system, according to an embodiment of the present disclosure.

Referring to FIG. 8, when the subcarrier spacing of the data channel is the same as the subcarrier spacing of the control channel (i.e., $\mu_{PDSCH}=\mu_{PDCCH}$) (8-00), the slot numbers for the data and the control are identical to each other, and accordingly, a BS and a terminal may confirm a scheduling offset according to a predetermined slot offset $K_0$. On the other hand, when the subcarrier spacing of the data channel is different from the subcarrier spacing of the control channel (i.e., $\mu_{PDSCH}\neq\mu_{PDCCH}$) (8-05), the slot numbers for the data and the control are different from each other, and accordingly, the BS and the terminal may confirm the scheduling offset according to the predetermined slot offset $K_0$, based on the subcarrier spacing of the PDCCH.

Although a method of analyzing an offset when the subcarrier spacing of the data channel and the control channel are identical to or different from each other has been described with reference to FIG. 8, the method is not limited thereto and may also be applied when the subcarrier spacing of control channels or reference signals are identical to or different from each other, for example, when the subcarrier spacing of a CSI-RS and a control channel or the subcarrier spacing of an SRS and a control channel are identical to or different from each other.

NR provides various types of DCI formats as shown in Table 9 above in order for a terminal to efficiently receive a control channel.

For example, the BS may use DCI format 0_0 or DCI format 0_1 in order to schedule a PDSCH in one cell.

DCI format 0_1 includes at least the following information when DCI format 0_1 is transmitted together with a cyclic redundancy check (CRC) scrambled by a cell radio network temporary identifier (C-RNTI), a configured scheduling RNTI (CS-RNTI), or a new-RNTI.

Identifier for DCI formats (1 bit): DCI format indicator, which is always configured as '1'

Frequency domain resource assignment ($N_{RBG}$ bits or $\lceil \log_2(N_{RB}^{DL,\,BWP}(N_{RB}^{DL,\,BWP}+1)/2) \rceil$ bits): indicates frequency-domain resource allocation, and when DCI format 1_0 is monitored in a UE-specific search space, $N_{RB}^{DL,\,BWP}$ is the size of an active DL BWP, and otherwise, $N_{RB}^{DL,\,BWP}$ is the size of an initial DL BWP. $N_{RBG}$ denotes the number of RBSs. A detailed method is described in the above frequency-domain resource allocation.

Time domain resource assignment (0 to 4 bits): indicates time-domain resource allocation according to the above description.

VRB-to-PRB mapping (1 bit): '0' indicates non-interleaved VRB-to-PRB mapping, and '1' indicates interleaved VRP-to-PRB mapping.

Modulation and coding scheme (5 bits): indicates a modulation order and a coding rate used for PDSCH transmission.

New data indicator (1 bit): indicates whether a PDSCH corresponds to initial transmission or retransmission according to whether toggled or not.

Redundancy version (2 bits): indicates a redundancy version used for PDSCH transmission.

HARQ process number (4 bits): indicates a HARQ process number used for PDSCH transmission.

Downlink assignment index (2 bits): DAI indicator

TPC command for scheduled PUCCH (2 bits): PUCCH power control indicator

PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

DCI format 1_1 includes at least the following information when DCI format 0_1 is transmitted together with a CRC scrambled by a C-RNTI, a CS-RNTI, or a new-RNTI.

Identifier for DCI formats (1 bit): DCI format indicator, which is always configured as '1'

Carrier indicator (0 or 3 bits): indicates a component carrier (CC) (or a cell) on which a PDSCH allocated by DCI is transmitted.

Bandwidth part indicator (0, 1, or 2 bits): indicates a BWP on which a PDSCH allocated by DCI is transmitted.

Frequency domain resource assignment (a payload is determined according to the frequency-domain resource allocation): indicates frequency-domain resource allocation, and $N_{RB}^{DL,\,BWP}$ is the size of an active DL BWP. A detailed method is described in the above frequency-domain resource allocation.

Time domain resource assignment (0 to 4 bits): indicates time-domain resource allocation according to the above description.

VRB-to-PRB mapping (0 or 1 bit): '0' indicates non-interleaved VRB-to-PRB mapping, and '1' indicates interleaved VRP-to-PRB mapping. This is 0 bit when the frequency-domain resource allocation is configured as resource type 0.

PRB bundling size indicator (0 or 1 bit): 0 bit when a higher layer parameter prb-BundlingType is not configured or configured as 'static', and 1 bit when the higher layer parameter is configured as 'dynamic'.

Rate matching indicator (0 or 1 or 2 bits): indicates a rate matching pattern.

ZP CSI-RS trigger (0 or 1 or 2 bits): indicator triggering an AP ZP CSI-RS.

For transport block 1:

Modulation and coding scheme (5 bits): indicates a modulation order and a coding rate used for PDSCH transmission.

New data indicator (1 bit): indicates whether a PDSCH corresponds to initial transmission or retransmission according to whether toggled or not.

Redundancy version (2 bits): indicates a redundancy version used for PDSCH transmission.

For transport block 2:

Modulation and coding scheme (5 bits): indicates a modulation order and a coding rate used for PDSCH transmission.

New data indicator (1 bit): indicates whether a PDSCH corresponds to initial transmission or retransmission according to whether toggled or not.

Redundancy version (2 bits): indicates a redundancy version used for PDSCH transmission.

HARQ process number (4 bits): indicates a HARQ process number used for PDSCH transmission.

Downlink assignment index (0, 2, or 4 bits): DL assignment index (DAI) indicator TPC command for scheduled PUCCH (2 bits): PUCCH power control indicator PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

Antenna port (4, 5, or 6 bits): indicates a DMRS port and a CDM group without data.

Transmission configuration indication (0 or 3 bits): TCI indicator.

SRS request (2 or 3 bits): SRS transmission request indicator

CBG transmission information (0, 2, 4, 6, or 8 bits): indicator indicating whether code block groups in an allocated PDSCH are transmitted. '0' indicates that the CBG is not transmitted, and '1' indicates that the CBG is transmitted.

CBG flushing out information (0 or 1 bit): indicator indicating whether previous CBGs are contaminated, and '0' indicates that the CBGs might be contaminated and '1' indicates that the CBGs are combinable when receiving a retransmission.

DMRS sequence initialization (0 or 1 bit): DMRS scrambling ID selection indicator The number of pieces of DCI having different sizes that the terminal is capable of receiving for each slot in a corresponding cell is up to 4. The number of pieces of DCI having different sizes, which are scrambled by a C-RNTI that may be received by the terminal for each slot in a corresponding cell, is up to 3.

Here, the antenna port indication may be indicated through Tables 13 to 16 below.

TABLE 13

Antenna port(s) (1000 + DMRS port), dmrs-Type = 1, maxLength = 1
One Codeword:
Codeword 0 enabled,
Codeword 1 disabled

| Value | Number of DMRS CDM group(s) withouot data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 14

Antenna port(s) (1000 + DMRS port), dmrs-Type = 1, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |

TABLE 14-continued

Antenna port(s) (1000 + DMRS port), dmrs-Type = 1, maxLength = 2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 15

Antenna port(s) (1000 + DMRS port), dmrs-Type = 2, maxLength = 1

| | One codeword: Codeword 0 enabled, Codeword 1 disabled | | | Two codeword: Codeword 0 enabled, Codeword 1 disabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |

TABLE 15-continued

Antenna port(s) (1000 + DMRS port), dmrs-Type = 2, maxLength = 1

| | One codeword: Codeword 0 enabled, Codeword 1 disabled | | | Two codeword: Codeword 0 enabled, Codeword 1 disabled | |
|---|---|---|---|---|---|
| Value | Number of DMRS CDM group(s) without data | DMRS port(s) | Value | Number of DMRS CDM group(s) without data | DMRS port(s) |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 16-1

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |

TABLE 16-2

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 2 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |

TABLE 16-2-continued

Antenna port(s) (1000 + DMRS port), dmrs-Type = 2, maxLength = 2

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

It is preferable to understand that Table 16-2 is subsequent to Table 16-1.

Table 13 is used when dmrs-type is indicated as '1' and maxLength is indicated as '1', and Table 14 is used when dmrs-type=1 and maxLength=2. The port of the DMRS to be used is indicated based on Table 15 when dmrs-type=2 and maxLength=1, and Tables 16-1 and 16-2 when dmrs-type=2 and maxLength=2.

The numbers 1, 2, and 3 indicated by 'Number of DMRS CDM group(s) without data' in the tables denote CDMR groups {0}, {0, 1}, and {0, 1, 2}, respectively. 'DMRS port(s)' show indices of the used ports arranged in sequence. The antenna port is indicated as DMRS port+1000. The CDM group of the DMRS is associated with a method of generating a DMRS sequence and the antenna ports as shown in Tables 17 and 18. Table 17 shows parameters when dmrs-type=1, and Table 12 shows parameters when dmrs-type=2.

TABLE 17

Parameters for PDSCH DM-RS dmrs-type = 1

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 18

Parameters for PDSCH DM-RS dmrs-type = 2

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The sequence of DMRSs according to respective parameters is determined by using Equation 2 below.

$$a_{k,l}^{(p,\mu)} = \beta_{PDSCH}^{DMRS} w_f(k') w_t(l') r(2n + k') \quad \text{[Equation 2]}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Figure 9:
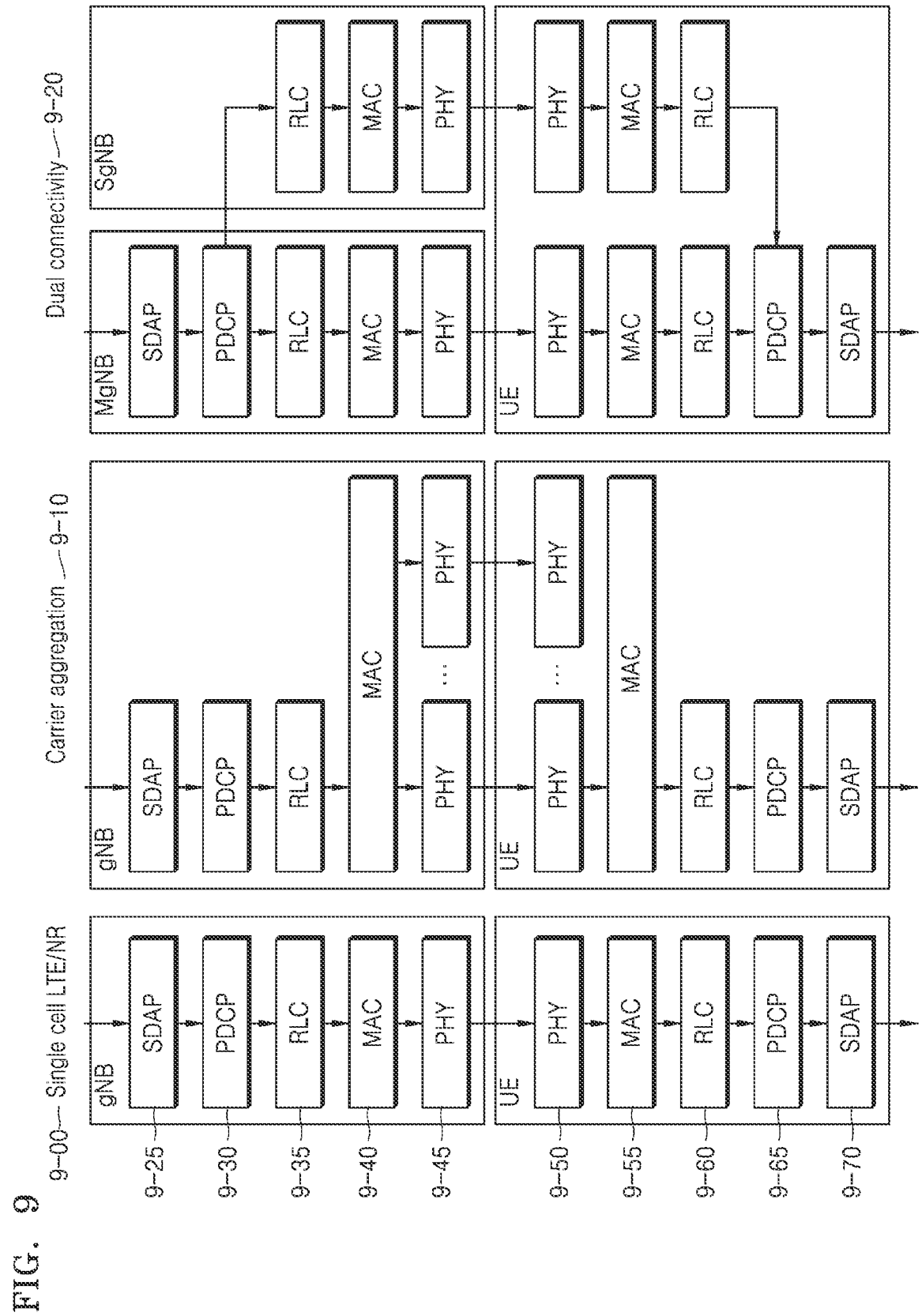
FIG. 9 is a diagram illustrating radio protocol structures of a base station and a user equipment when performing a single cell, carrier aggregation, and dual connectivity, respectively, according to an embodiment of the present disclosure.

FIG. 9 is a diagram illustrating radio protocol structures of a BS and a terminal when performing a single cell, carrier aggregation, and dual connectivity, respectively, according to an embodiment of the present disclosure.

Referring to FIG. 9, in a radio protocol of a next-generation mobile communication system, a terminal and an NR BS include NR service data adaption protocols (SDAPs) 9-25 and 9-70, NR packet data convergence protocols (PDCPs) 9-30 and 9-65, NR radio link control (RLC) 9-35 and 9-60, and NR medium access control (MAC) 9-40 and 9-55, respectively.

The primary functions of the NR SDAPs 9-25 and 9-70 may include some of the following functions.

transfer of user plane data
mapping between QoS flow and a DRB for both DL and UL
marking QoS flow ID in both DL and UL packets
mapping reflective QoS flow to DRB for UL SDAP PDUs.

With regard to the SDAP layer device, the terminal may receive a configuration indicating whether or not to use a header of the SDAP layer device or whether or not to use functions of the SDAP layer device for each PDCP layer device, for each bearer, or for each logical channel through an RRC message. When the SDAP header is configured, a 1-bit NAS reflective QoS configuration indicator and a 1-bit AS reflective QoS configuration indicator of the SDAP header may instruct the terminal to update or reconfigure mapping information between the QoS flow and the data bearers in a UL and a DL. The SDAP header may include QoS flow ID information indicating the QoS. The QoS information may be used as data processing priority, scheduling information, or the like in order to support effective services.

The primary functions of the NR PDCPs 9-30 and 9-65 may include some of the following functions.
- header compression and decompression: ROHC only
- transfer of user data
- in-sequence delivery of upper layer PDUs
- out-of-sequence delivery of upper layer PDUs
- PDCP PDU reordering for reception
- duplicate detection of lower layer SDUs
- retransmission of PDCP SDUs
- ciphering and deciphering
- timer-based SDU discard in uplink The reordering function of an NR PDCP device denotes a function of reordering PDCP PDUs received from a lower layer, based on a PDCP sequence number (SN), may include a function of transmitting data to a higher layer in the rearranged order, may include a function of directly transmitting data without consideration of an order, may include a function of reordering the sequence and recording lost PDCP PDUs, may include a function of transmitting a status report of the lost PDCP PDUs to the transmitting end, and may include a function of requesting retransmission of the lost PDCP PDUs.

The primary functions of the NR RLC 9-35 and 9-60 may include some of the following functions.
- transfer of upper layer PDUs
- in-sequence delivery of upper layer PDUs
- out-of-sequence delivery of upper layer PDUs
- error correction through ARQ
- concatenation, segmentation and reassembly of RLC SDUs
- re-segmentation of RLC data PDUs
- reordering of RLC data PDUs
- duplicate detection
- protocol error detection
- RLC SDU discard
- RLC re-establishment The in-sequence delivery function of an NR RLC device denotes a function of transferring RLC SDUs received from a lower layer to a higher layer in sequence, may include a function of, when one original RLC SDU is divided into a plurality of RLC SDUs and received, reassembling and transmitting the plurality of RLC SDUs, may include a function of reordering the received RLC PDUs, based on an RLC SN or a PDCP SN, may include a function of reordering the sequence and recording lost RLC PDUs, may include a function of transmitting a status report of the lost RLC PDUs to the transmitting end, may include a function of requesting retransmission of the lost RLC PDUs, may include a function of, when there is a lost RLC SDU, transmitting only the RLC SDUs prior to the lost RLC SDU to a higher layer in sequence, may include a function of, when a certain timer expires even though there is a lost RLC SDU, transmitting all RLC SDUs received before the timer starts, to a higher layer in sequence, or may include a function of, when a certain timer expires even though there is a lost RLC SDU, transmitting all RLC SDUs received until the present, to a higher layer in sequence. In addition, the RLC PDUs may be processed in the order of reception (in the order of arrival regardless of a serial number or an SN thereof), and may be transmitted to the PDCP device in an out-of-sequence delivery manner, and when an RLC PDU is received as segments, the segments, which are stored in a buffer or are to be received later, may be received and reconfigured into one complete RLC PDU, and then the RLC PDU may be processed and transmitted to the PDCP device. The NR RLC layer may not include a concatenation function, which may be performed in an NR MAC layer or may be replaced with a multiplexing function of the NR MAC layer.

The out-of-sequence delivery of an NR RLC device denotes a function of directly transmitting RLC SDUs received from a lower layer, to a higher layer regardless of sequence, may include a function of, when one original RLC SDU is divided into a plurality of RLC SDUs and is then received, reassembling and transmitting the plurality of RLC SDUs, and may include a function of storing and ordering RLC SNs or PDCP SNs of the received RLC PDUs, so as to record the lost RLC PDUs.

The NR MAC 9-40 and 9-55 may be connected to a plurality of NR RLC layer devices configured for a single terminal, and the primary functions of the NR MAC may include some of the following functions.
- mapping between logical channels and transport channels
- multiplexing/demultiplexing of MAC SDUs
- scheduling information reporting
- error correction through HARQ
- priority handling between logical channels of one UE
- priority handling between UEs by means of dynamic scheduling
- MBMS service identification
- transport format selection
- padding The NR PHY layers 9-45 and 9-50 may perform an operation of channel-coding and modulating a higher layer data into OFDM symbols and transmitting the OFDM symbols through a radio channel, or an operation of demodulating and channel-decoding OFDM symbols received through a radio channel and transmitting the OFDM symbols to a higher layer.

The detailed structures of the radio protocols may be changed in various ways according to a carrier (or cell) operating scheme. For example, when a BS transmits data to a terminal based on a single carrier (or cell), the BS and the terminal use a single protocol structure for the respective layers as illustrated in 9-00. On the other hand, when a BS transmits data to a terminal based on carrier aggregation (CA) using multiple carriers in a single transmission reception point (TRP), the BS and the terminal use a protocol structure in which a single structure is provided until RLC but a PHY layer is multiplexed through a MAC layer as illustrated in 9-10. As another example, when a BS transmits data to a terminal based on dual connectivity (DC) using multiple carriers in multiple TRPs, the BS and the terminal use a protocol structure in which a single structure is provided until RLC and a PHY layer is multiplexed through a MAC layer as illustrated in 9-20.

In LTE and NR, a terminal has a procedure of, in a state in which the terminal is connected to a serving BS, reporting capability supported by the terminal to the BS. This procedure will be referred to as 'UE capability (reporting)' in the following description. The BS may transmit, to the terminal connected thereto, a UE capability enquiry message requesting capability reporting. The message may include a request from the BS for UE capability for each radio access technology (RAT) type. The request for each RAT type may include frequency band information for requesting the capability of the terminal. In addition, the UE capability enquiry message may request a plurality of RAT types in a single RRC message container, or the BS may transmit, to the UE, a plurality of UE capability enquiry messages including requests for respective RAT types. That is, the UE capability enquiry may be repeated multiple times, and the terminal may configure a UE capability information message corresponding thereto, and report the message multiple times. In a next-generation mobile communication system, a request for UE capability may be performed for multi-RAT dual connectivity (MR-DC), as well as NR, LTE, and E-UTRAN New Radio Dual Connectivity (EN-DC). For reference, the UE capability enquiry message is generally transmitted in the initial phase after the terminal establishes a connection, however, the BS may request the UE capability under any condition as necessary.

In the above operation, the terminal having received the request for reporting the UE capability from the BS configures UE capability according to a RAT type requested by the BS and band information. A method, performed by a terminal, of configuring UE capability in an NR system is be summarized as follows.

1. When the terminal receives a list of LTE and/or NR bands through a UE capability request from a BS, the terminal configures a band combination (BC) for EN-DC and NR stand-alone (SA). That is, the terminal configures a candidate list of BCs for EN-DC and NR SA, based on the bands requested to the BS by using FreqBandList. In addition, the bands have priority in the order as described in FreqBandList.

2. When the BS requests UE capability reporting by setting "eutra-nr-only" flag or "eutra" flag, the terminal completely removes the NR SA BCs from the configured candidate list of BCs. This operation may be performed only when an LTE BS (eNB) requests "eutra" capability.

3. Thereafter, the terminal removes fallback BCs from the candidate list of BCs configured in the above operation. The fallback BC corresponds to the case in which the band corresponding to at least one SCell is removed from certain super set BCs, and the fallback BC may be omitted because the super configure BCs may cover the fallback BC. This operation is also applied to the MR-DC, that is, applied to LTE bands. The remaining BCs after this operation constitute a final "candidate BC list".

4. The terminal selects BCs to be reported, which conform to the requested RAT type, from among the final "candidate BC list". In this operation, the terminal configures supportedBandCombinationList in a determined order. That is, the terminal configures the BCs and UE capability to be reported in the order of a preconfigured RAT types. (nr->eutra-nr->eutra). In addition, the terminal configures featureSetCombination for the configured supportedBandCombinationList and configures a list of "candidate feature set combinations" from the candidate BC list from which the list of the fallback BCs (including capabilities in the same or a lower level) is removed. The "candidate feature set combinations" may include feature set combinations for NR and EUTRA-NR BCs, and may be obtained from feature set combinations of containers "UE-NR-Capabilities" and "UE-MRDC-Capabilities".

5. In addition, when the requested RAT type is eutra-nr and has affects, featureSetCombinations is included in both containers "UE-MRDC-Capabilities" and "UE-NR-Capabilities". However, the feature set of NR is included only in "UE-NR-Capabilities".

After the UE capability is configured, the terminal transmits a UE capability information message including the UE capability to the BS. The BS performs an appropriate scheduling and transmission/reception management for the terminal, based on the UE capability received from the terminal.

In NR, a channel state information RS (CSI-RS) may be supported as an RS for a channel state report of a terminal, and each CSI-RS resource configuration configured by a higher layer may include at least the following detailed configuration information. However, the present disclosure is not limited to the following examples.

NZP-CSI-RS-Resource ConfigID: IDs of the corresponding CSI-RS resource configurations NrofPorts: the number of CSI-RS ports included in the corresponding CSI-RS resource CSI-RS-timeConfig: a transmission period and a slot offset of the corresponding CSI-RS resource CSI-RS-ResourceMapping: a position of an OFDM symbol within a slot and a position of a subcarrier within a PRB of the corresponding CSI-RS resource CSI-RS-Density: frequency density of the corresponding CSI-RS CDMType: a CDM length and a CDM RE pattern of the corresponding CSI-RS CSI-RS-FreqBand: a transmission bandwidth and a starting location of the corresponding CSI-RS Pc: the ratio of PDSCH energy per RE (EPRE) to NZP CSI-RS EPRE Pc-SS: the ratio of SS/PBCH block EPRE to NZP CSI-RS EPRE CSI-RS-ResourceRep: NZP CSI-RS resources included in one resource set are connected to each other. When CSI-RS-ResourceRep is 'ON', the terminal may recognize that the same spatial domain transmission filter is applied to all NZP CSI-RS resources belonging to the resource set (i.e., the terminal may assume that the BS has used the same transmission beam). Hereinafter, the term 'transmission beam' may refer to a transmission signal having directivity, which may be interchangeably used with application of a spatial domain transmission filter) and that the respective NZP CSI-RS resources have the same number of CSI-RS ports and the same periodicity. When CSI-RS-ResourceRep is 'OFF', the terminal is unable to assume that the same spatial domain transmission filter is applied to all NZP CSI-RS resources belonging to the resource set (i.e., the terminal is unable to assume that the BS has used the same transmission beam), and is unable to recognize that the respective NZP CSI-RS resources have the same number of CSI-RS ports and the same periodicity.

According to some embodiments, in NR, one CSI-RS resource may be configured with one of {1, 2, 4, 8, 12, 16, 24, 32} as the number of CSI-RS ports, and different degrees of configuration freedom may be supported according to the number of CSI-RS ports configured for the CSI-RS resource. Table 19 shows CSI-RS densities, CDM lengths and types, starting locations $\overline{K}$ and $\overline{I}$ of a frequency domain and a time domain of a CSI-RS component RE pattern, and the number k' of frequency-domain REs and the number l' of time-domain REs of the CSI-RS component RE pattern, which are configurable according to the number X of NR CSI-RS ports.

According to some embodiments, the CSI-RS component RE pattern, which is a basic unit of CSI-RS resource, may include a total of YZ REs including (Y=1+max (k')) REs adjacent to each other on the frequency domain and (Z=1+max (l')) REs adjacent to each other on the time domain. Referring to Table 19, in NR, different degrees of configuration freedom of the frequency domain are supported according to the number of CSI-RS ports configured for the CSI-RS resource.

CSI-RS-ResourceMapping configured by a higher layer may indicate, to the terminal, a CSI-RS RE location. When the number of CSI-RS ports is 1, the CSI-RS may be configured without any subcarrier limitation in a PRB, and the terminal may be assigned a CSI-RS RE location by a 12-bit bitmap. When the number of CSI-RS ports is {2, 4, 8, 12, 16, 24, 32} and Y=2, the CSI-RS may be configured for every two subcarriers in a PRB, and the terminal may be assigned a CSI-RS RE location by a 6-bit bitmap. When the number of CSI-RS ports is 4, the CSI-RS may be configured for every four subcarriers in a PRB, and the terminal may be assigned a CSI-RS RE location by a 3-bit bitmap. Similarly, in the case of a time-domain RE location, the terminal may be assigned a CSI-RS by a bitmap of a total of 14 bits. In this case, the length of the bitmap may vary depending on the value Z associated with Table 19 (CSI-RS locations within a slot) as in the above-described frequency position assignment, but the principle is similar to the above description, and thus a detailed description thereof will be omitted.

As described above, in NR, a BS may configure a CSI-RS for a terminal in order to provide other functions, such as rate matching, time/frequency tracking, and the like, in addition to CSI measurement. Meanwhile, when configuring report settings for CSI-RSs configured for functions other than the CSI-RS measurement, there may be side effects of consuming terminal power for generating unnecessary CSI or wasting UL resources for unnecessary CSI reports.

Hereinafter, a method of measuring a channel state and reporting the channel state in a 5G communication system will be described in detail.

CSI may include channel quality indicator (CQI), a precoding matrix indicator (PMI), a CSI-RS resource indicator (CRI), a SS/PBCH block resource indicator (SSBRI), a layer indicator (LI), a rank indicator (RI), and/or RS received power (L1-RSRP). A BS may control time and frequency resources for the aforementioned CSI measurement and reporting by a terminal.

For the above-described CSI measurement and reporting, the terminal may be configured with setting information CSI-ReportConfig for N (≥1) CSI reports, setting information CSI-ResourceConfig on M (≥1) RS transmission resources, and one or two pieces of trigger state list information CSI-AperiodicTriggerStateList and CSI-SemiPersistentOnPUSCH-TriggerStateList, through higher layer signaling.

Configuration information for the CSI measurement and reporting described above may be as follows in Tables 20 to 26.

TABLE 19

| Row | Ports $\chi$ | Density $\rho$ | Ccdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0)$, $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1)$, $(k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0)$, $(k_0, l_0 + 1), (k_1, l_0 + 1), (k_2, l_0 + 1), (k_3, l_0 + 1)$, $(k_0, l_1), (k_1, l_1), (k_2, l_1), (k_3, l_1)$, $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1),$ $(k_3, l_1)$ | 0, 1, 2, 3, 4, 5, 6, 7 | 0, 1 | 0, 1 |
| 18 | 32 | 1, 0.5 | CDM8 (FQ2, TD4) | $(k_0, l_0), (k_1, l_0), (k_2, l_0), (k_3, l_0)$ | 0, 1, 2, 3 | 0, 1 | 0, 1, 2, 3 |

TABLE 20

| CSI-ReportConfig |
|---|

The IE CSI-ReportConfig is used to configure a periodic or semi-persistent report sent
on PUCCH on the cell in which the CSI-ReportConfig is included, or to configure a
semi-persistent or aperiodic report sent on PUSCH triggered by DCI received on the cell
in which the CSI-ReportConfig is included (in this case, the cell on which the report is
sent is determined by the received DCI). See TS 38.214 [19], clause 5.2.1.

```
      CSI-ReportConfig information element
-- ASN1START
-- TAG-CSI-REPORTCONFIG-START
CSI-ReportConfig :=                  SEQUENCE {
    reportConfigId                       CSI-ReportConfigId,
    carrier                              ServCellIndex
OPTIONAL, -- Need S
    resourcesForChannelMeasurement       CSI-ResourceConfigId,
    csi-IM-ResourcesForInterference      CSI-ResourceConfigId
OPTIONAL, -- Need R
    nzp-CSI-RS-ResourcesForInterference  CSI-ResourceConfigId
OPTIONAL, -- Need R
    reportConfigType                     CHOICE {
        periodic                             SEQUENCE {
            reportSlotConfig                     CSI-
ReportPeriodicityAndOffset,
            pucch-CSI-ResourceList               SEQUENCE (SIZE
(1..maxNrofBWPs)) OF PUCCH-CSI-Resource
        },
        semiPersistentOnPUCCH                SEQUENCE {
            reportSlotConfig                     CSI-
ReportPerodicityAndOffset,
            pucch-CSI-ResourceList               SEQUENCE (SIZE
(1..maxNrofBWPs)) OF PUCCH-CSI-Resource
        },
        semiPersistentOnPUSCH                SEQUENCE {
            reportSlotConfig                     ENUMERATED {sl5, sl10, sl20,
sl40, sl80, sl160, sl320},
            reportSlotOffsetList                 SEQUENCE (SIZE (1..maxNrofUL-
Allocations)) OF INTEGER(0..32),
            p0alpha                              P0-PUSCH-AlphaSetId
        },
        aperiodic                            SEQUENCE {
            reportSlotOffsetList                 SEQUENCE (SIZE (1..maxNrofUL-
Allocations)) OF INTEGER(0..32)
        }
    },
    reportQuantity                       CHOICE {
        none                                 NULL,
        cri-RI-PMI-CQI                       NULL,
        cri-RI-i1                            NULL,
        cri-RI-i1-CQI                        SEQUENCE {
            pdsch-BundleSizeForCSI               ENUMERATED {n2, n4}
OPTIONAL -- Need S
        },
        cri-RI-CQL                           NULL,
        cri-RSRP                             NULL,
        ssb-Index-RSRP                       NULL,
        cri-RI-LI-PMI-CQI                    NULL
    },
    reportFreqConfiguration              SEQUENCE {
        cqi-FormatIndicator                  ENUMERATED { widebandCQI,
subbandCQI }                         OPTIONAL, -- Need R
        pmi-FormatIndicator                  ENUMERATED {widebandPMI,
subbandPMI }                         OPTIONAL, -- Need R
        csi-ReportingBand                    CHOICE {
            subbands3                            BIT STRING(SIZE(3)),
            subbands4                            BIT STRING(SIZE(4)),
            subbands5                            BIT STRING(SIZE(5)),
            subbands6                            BIT STRING(SIZE(6)),
            subbands7                            BIT STRING(SIZE(7)),
            subbands8                            BIT STRING(SIZE(8)),
            subbands9                            BIT STRING(SIZE(9)),
            subbands10                           BIT STRING(SIZE(10)).
            subbands11                           BIT STRING(SIZE(11)),
            subbands12                           BIT STRING(SIZE(12)),
            subbands13                           BIT STRING(SIZE(13)),
            subbands14                           BIT STRING(SIZE(14)),
            subbands15                           BIT STRING(SIZE(15)),
            subbands16                           BIT STRING(SIZE(16)),
            subbands17                           BIT STRING(SIZE(17)),
            subbands18                           BIT STRING(SIZE(18)),
            ...,
```

TABLE 20-continued

| CSI-ReportConfig |
|---|

```
      subbands19-v1530                         BIT STRING(SIZE(19))
    } OPTIONAL -- Need S
  }
OPTIONAL, -- Need R
  timeRestrictionForChannelMeasurements        ENUMERATED {configured,
notConfigured}
  timeRestrictionForInterferenceMeasurements   ENUMERATED {configured,
notConfigured},
  codebookConfig                               CodebookConfig
OPTIONAL, -- Need R
  dummy                                        ENUMERATED {n1, n2}
OPTIONAL, -- Need R
  groupBasedBeamReporting                      CHOICE {
    enabled                                      NULL,
    disabled                                     SEQUENCE {
      nrofReportedRS                               ENUMERATED {n1, n2, n3,
n4}                                              OPTIONAL -- Need S
    }
  },
  cqi-Table                         ENUMERATED (table1, table2, table3,
spare1}                             OPTIONAL, -- Need R
  subbandSize                       ENUMERATED {value1, value2},
  non-PMI-PortIndication            SEQUENCE (SIZE (1..maxNrofNZP-CSI-
RS-ResourcesPerConfig)) OF PortIndexFor8Ranks OPTIONAL, -- Need R
  ...,
  [[
SemiPersistentOnPUSCH-v1530        SEQUENCE {
  reportSlotConfig-v1530              ENUMERATED {sl4, sl8, sl16}
  }
OPTIONAL   -- Need R
  ]]
}
CSI-ReportPeriodicityAndOffset ::=  CHOICE {
  slots4                              INTEGER(0..3),
  slots5                              INTEGER(0..4),
  slots6                              INTEGER(0..7),
  slots10                             INTEGER(0..9),
  slots16                             INTEGER(0..15),
  slots20                             INTEGER(0..19),
  slots40                             INTEGER(0..39),
  slots80                             INTEGER(0..79),
  slots160                            INTEGER(0..159),
  slots320                            INTEGER(0..319)
}
PUCCH-CSI-Resource ::=              SEQUENCE {
  uplinkBandwidthPartId               BWP-Id,
  pucch-Resource                      PUCCH-ResourceId
}
PortIndexFor8Ranks ::=              CHOICE {
  portIndex8                          SEQUENCE{
    rank1-8                             PortIndex8
OPTIONAL, -- Need R
    rank2-8                             SEQUENCE(SIZE(2)) OF PortIndex8
OPTIONAL, -- Need R
    rank3-8                             SEQUENCE(SIZE(3)) OF PortIndex8
OPTIONAL, -- Need R
    rank4-8                             SEQUENCE(SIZE(4)) OF PortIndex8
OPTIONAL, -- Need R
    rank5-8
OPTIONAL, -- Need R                     SEQUENCE(SIZE(5)) OF PortIndex8
    rank6-8
OPTIONAL, -- Need R                     SEQUENCE(SIZE(6)) OF PortIndex8
    rank7-8
OPTIONAL, -- Need R                     SEQUENCE(SIZE(7)) OF PortIndex8
    rank8-8
OPTIONAL -- Need R                      SEQUENCE(SIZE(8)) OF PortIndex8
  },
  portIndex4                          SEQUENCE{
    rank1-4                             PortIndex4
OPTIONAL, -- Need R
    rank2-4                             SEQUENCE(SIZE(2)) OF PortIndex4
OPTIONAL, --• Need R
    rank3-4                             SEQUENCE(SIZE(3)) OF PortIndex4
OPTIONAL, -- Need R
    rank4-4                             SEQUENCE(SIZE(4)) OF PortIndex4
OPTIONAL -- Need R
  },
  portIndex2                          SEQUENCE{
```

TABLE 20-continued

| CSI-ReportConfig | |
|---|---|
| rank1-2 | PortIndex2 |
| OPTIONAL, -- Need R | |
| rank2-2 | SEQUENCE(SIZE(2)) OF PortIndex2 |
| OPTIONAL -- Need R | |
| }, | |
| portIndex1 | NULL |
| } | |
| PortIndex8::= | INTEGER (0..7) |
| PortIndex4::= | INTEGER (0..3) |
| PortIndex2::= | INTEGER (0..1) |
| -- TAG-CSI-REPORTCONFIG-STOP | |
| -- ASN1STOP | |

| CSI-ReportConfig field descriptions |
|---| carrier
indicates in which serving cell the CSI-ResourceConfig indicated below are to be found. if the field is absent, the resources are on the same serving cell as this report configuration.
codebookConfig
Codebook configuration for Type-1 orType-Il including codebook subset, restriction.
cqi-Formatindicator
indicates whether the UE shall report a single (wideband) or multiple (subband) CQI. (see TS 38.214 [19], clause 5.2.1,4).
cqi-Table
Which CQI table to use for CQI calculation (see TS 38.214 [19], clause 5.2.2.1).
csi-IM-ResourcesForinterference
CSI IM resources for interference measurement. csi-ResourceConfigld of a CSI-ResourceConfig included in the configuration of the serving cell indicated with the field "'carrier" above. The CSI-ResourceConfig indicated here contains only CSI-IM resources. The bwp-Id in that CSI-ResourceConfig is the same value as the bwp-Id in the CSI-ResourceConfig indicated by
resourcesForChannelMeasurement
csi-ReportingBand
Indicates a contiguous or noncontiguous subset of subbands in the bandwidth part which CSI shall be reported for. Each bit in the bit-string represents one subband. The .right-most bit in the bit string represents the lowest subband in the BWP. The choice determines the number of subbands (subbands3 for 3 subbands, subbands4 for 4 subbands, and so on.) (see TS 38.214 [19], clause 5,2.1.4). This field is absent if there are less than 24 PRBs (no sub band) and present otherwise, the number of sub bands can be from 3 (24 PRBs, sub band size 8) to 18 (72 PRBs, sub band size 4).
dummy
This field is not used in the specification, if received it shall be ignored by the UE.
groupBasedBeamReporting
Turning on/off group beam based reporting (see TS 38.214 [19], clause 5.2.1.4)
non-PMI-Portindication
Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).
The first entry in non-PMI-Portindication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigld is indicated in a CSI-Measid together with the above CSI-ReportConfigld; the second entry in non-PMI-Portindication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RSResourceSetList of the same CSI-ResourceConfig and so on.
nrofReportedRS
The number (N) of measured RS resources to be reported per report setting in a non-group-based report. N <= N_max, where N_max is either 2 or 4 depending on UE capability.
(see TS 38.214 [19], clause 5.2,1 4) When the field is absent the UE applies the value 1
nzp-CS/-RS-ResourcesForinterference

| CSI-ReportConfig field descriptions |
| --- |
| NZP CSI RS resources for interference measurement. csi-ResourceConfigId of a CSI-ResourceConfig included in the configuration of the serving cell -indicated with the field "carrier" above. The CSI-ResourceConfig indicated here contains only NZP-CSI-RS resources. The bwp-ld in that CSI-ResourceConfig is the same value as the bwp-ld in the CSI-ResourceConfig indicated by resou me sForChannelMeasu rem ent. p0alpha Index of the p0-alpha set determining the power control for this CSI report transmission (see TS 38.214 [19], clause 6.2.1.2). pdsch-BundleSizeForCSI PRB bundling size to assume for CQ! calculation when reportQuantity is CRI/RI/i1/CQI. If the field is absent, the UE assumes that no PRB bundling is applied (see TS 38.214 [19], clause 5.2.1 .4.2). pmi-Formatindicator Indicates whether the UE shall report a single (wideband) or multiple (subband) PMI (see TS 38.214 (19] clause 5.2.1.4),' pucch-CSi-ResoureeList Indicates which PUCCH resource to use for reporting on PUCCH. reportConfigType Time domain behavior of reporting configuration reportFreqConfiguration Reporting configuration in the frequency domain, (see TS 38.214 [19], clause 5.2,1.4). reportQuantity The CSI related quantities to report. Corresponds to Li parameter 'ReportQuantity' (see TS 38.214 [19] clause 5.2.1) reportSlotConfig Periodicity and slot offset (see TS 38.214 [19], clause 5.2.14) . reportSlotConfig-v1530 Extended value range for reportSiotConfig for semi-persistent CSI on PUSCH. If the field is present, the UE shall ignore the value provided in the legacy field (semiPersistentOnPUSCH reportSiotConfig). reportSlotOffsetList Timing offset Y for semi persistent reporting using PUSCH. This field lists the allowed offset values This list must have the same number of entries as the pusch-TimeDomainAllocationList in PUSCH-Config. A particular value is indicated in DCI The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n + Y + P, where P is the configured periodicity. Timing offset Y for aperiodic reporting using PUSCH This field lists the allowed offset values. This list must have the same number of entries as the pusch-TimeDomainAllocationListin PUSCH-Config A particular value is indicated in DCI. The network indicates in the DCI field of the UL grant, which of the configured report slot offsets the UE shall apply. The DCI value 0 corresponds to the first report slot offset in this list, the DCI value I corresponds to the second report slot offset in this list, and so on (see TS 38.214 [19], clause 5.2.3). resourcesForChannelMeasurement Resources for channel measurement. csi-ResourceConfigid of a CSI-Resource Config included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-ld in that CSI-ResourceConfig, subbandSize indicates one out of two possible BWP-dependent values for the subband size as indicated in TS 38.214 [19] table 5, 2, 1.4-2. . if csi-ReportingBand is absent, the UE shall ignore this field. timeRestrictionForChannelMeasurements Time domain measurement restriction for the channel (signal) measurements (see TS 38.214 [19], clause 5.2,1.1) timeRestrictionForinterferenceMeasurements Time domain measurement restriction for interference measurements (see TS 38 214 [19], clause 5, 2.1 1) |

TABLE 21

| CSI-ResourceConfig |
| --- |
| The IE CSI-ResourceConfig defines a group of one or more NZP-CSI-RS-ResourceSet, CSI-IM-ResourceSet and/or CSI-SSB-ResourceSet. CSI-ResourceConfig information element -- ASN1START -- TAG-CSI-RESOURCECONFIG-START |

TABLE 21-continued

| CSI-ResourceConfig |
| --- |
| CSI-ResourceConfig ::=    SEQUENCE {   csi-ResourceConfigId      CSI-ResourceConfigId,   csi-RS-ResourceSetList    CHOICE {     nzp-CSI-RS-SSB           SEQUENCE {       nzp-CSI-RS-ResourceSetList SEQUENCE (SIZE (1..maxNrofNZP-CSI-RS-ResourceSetsPerConfig)) OF NZP-CSI-RS-ResourceSetId |

TABLE 21-continued

CSI-ResourceConfig

```
OPTIONAL, -- Need R
    csi-SSB-ResourceSetList      SEQUENCE (SIZE (1..maxNrofCSI-
SSB-ResourceSetsPerConfig)) OF CSI-SSB-ResourceSetId
OPTIONAL --• Need R
    },
    csi-IM-ResourceSetList      SEQUENCE (SIZE (1..maxNrofCSI-
IM-ResourceSetsPerConfig)) OF CSI-IM-ResourceSetId
    },
    bwp-Id                   BWP-Id,
    resourceType             ENUMERATED { aperiodic, semiPersistent,
periodic },
    ...
}
-- TAG-CSI-RESOURCECONFIG-STOP
-- ASN1STOP
```

CS/-ResourceConfig field descriptions bwp-Id
The DL BWP which the CSI-RS associated with this CSI-ResourceConfig are
located in (see TS 38.214 [19], clause 5.2.1.2
csi-ResourceConfigId
Used in CSI-ReportConfig to refer to an instance of CSI-ResourceConfig
csi-RS-ResourceSetList
Contains up to maxNrofNZP-CSI-RS-ResourceSetsPerConfig resource sets if
ResourceConfigType is 'aperiodic' and 1 otherwise (see TS 38.214 [191 clause
5.2, 1.2)
csiSSB-ResourceSetList
List of SSB resources used for beam measurement and reporting in a resource
set (see TS 38.214 [19], section FFS Section)
resourceType
Time domain behavior of resource configuration (see TS 38.214 [19], clause[
5.2.1.2). It does not apply to resources provided in the csi-SSB-ResourceSstList.

TABLE 22

NZP-CSI-RS-ResourceSet

The IE NZP-CSI-RS-ResourceSet is a set of Non-Zero-Power (NZP) CSI-
RS resources (their IDs) and set-specific parameters.
    NZP-CSI-RS-ResourceSet information element
```
-- ASN1START
-- TAG-NZP-CSI-RS-RESOURCESET-START
NZP-CSI-RS-ResourceSet ::=    SEQUENCE {
    nzp-CSI-ResourceSetId       NZP-CSI-RS-ResourceSetId,
    nzp-CSI-RS-Resources        SEQUENCE (SIZE (1..
maxNrofNZP-CSI-RS-ResourcesPerSet)) OF NZP-CSI-RS-ResourceId,
    repetition                  ENUMERATED { on, off }
```

TABLE 22-continued

NZP-CSI-RS-ResourceSet

```
OPTIONAL, -- Need S
    aperiodicTriggeringOffset   INTEGER(0..6)
OPTIONAL, -- Need S
    trs-Info                    ENUMERATED {true}
OPTIONAL, -- Need R
    ...
}
-- TAG-NZP-CSI-RS-RESOURCESET-STOP
-- ASN1STOP
```

NZP-CSIRS-ResourceSet field descriptions aperiodicTriggeringOffset
Offset X between the slot containing the DCI that triggers a set of aperiodic NZP
CSI-RS resources and the slot in which the CSI-RS resource, set is transmitted.
The value 0 corresponds to 0 slots, value 1 corresponds to 1 slot, value 2
corresponds to 2 slots, value 3 corresponds to 3 slots, value 4 corresponds to 4
slots, value 5 corresponds to 16 slots, value 6 corresponds to 24 slots. When the
field is absent the UE applies the value 0.
nzp-CSI-RS-Resources
NZP-CSI-RS-Resources associated with this NZP-OSI-RS resource set (see TS
38.214 [19] clause 5.2). For CSI, there are at most 8 NZP CSI RS resources per
resource set
repetition
Indicates whether repetition is on/off. If the field is set to 'OFF' or if the field is
absent, the UE may not assume that the NZP-CSI-RS resources within the
resource set are transmitted with the same downlink spatial domain transmission
filter and with same NrofPorts in every symbol (see TS 38.214 [19], clauses

| NZP-CSIRS-ResourceSet field descriptions |
|---|
| 5.2.2.3.1 and 5.1.6.1.2). Can only be configured for CSI-RS resource sets which are associated with CSI-ReportConfig with report of LI RSRP or "no report"<br>trs-info<br>Indicates that the antenna port for all NZP-CSI-RS resources in the CSI-RS resource set is same. If the field is absent or released the UE applies the value "false" (see TS 38.214 119]. clause 5.2.2.3.1). |

TABLE 23

| CSI-SSB-ResourceSet |
|---|
| The IE CSI-IM-ResourceSet is used to configure a set of one or more CSI Interference Management (IM) resources (their IDs) and set-specific parameters.<br>    CSI-IM-ResourceSet information element<br>-- ASN1START<br>-- TAG-CSI-IM-RESOURCESET-START<br>CSI-IM-ResourceSet ::=    SEQUENCE {<br>  csi-IM-ResourceSetId    CSI-IM-ResourceSetId,<br>  csi-IM-Resources    SEQUENCE (SIZE(1..maxNrofCSI-IM-ResourcesPerSet)) OF CSI-IM-ResourceId,<br>  ...<br>}<br>-- TAG-CSI-IM-RESOURCESET-STOP<br>-- ASN1STOP |

| CSI-IM-ResourceSet field descriptions |
|---|
| csi-IM-Resources<br>CSI-IM-Resources associated with this<br>CSI-IM-ResourceSet (see TS 38 214 [19], clause 5.2) |

TABLE 25

| CSI-AperiodicTriggerStateList |
|---|
| The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state. |

TABLE 25-continued

| CSI-AperiodicTriggerStateList |
|---|
| CSI-AperiodicTriggerStateList information element<br>-- ASN1START<br>-- TAG-CSI-APERIODICTRIGGERSTATELIST-START<br>CSI-AperiodicTriggerStateList ::= SEQUENCE (SIZE (1..maxNrOfCSI-AperiodicTriggers)) OF CSI-AperiodicTriggerState<br>CSI-AperiodicTriggerState ::=    SEQUENCE {<br>  associatedReportConfigInfoList    SEQUENCE (SIZE(1..maxNrofReportConfigPerAperiodicTrigger)) OF CSI-AssociatedReportConfigInfo,<br>  ...<br>}<br>CSI-AssociatedReportConfigInfo ::=    SEQUENCE {<br>  reportConfigId    CSI-ReportConfigId,<br>  resourcesForChannel    CHOICE {<br>    nzp-CSI-RS    SEQUENCE {<br>      resourceSet    INTEGER (1..maxNrofNZP-CSI-RS-ResourceSetsPerConfig),<br>      qcl-info    SEQUENCE (SIZE(1..maxNrofAP-CSI-RS-ResourcesPerSet)) OF TCI-StateId OPTIONAL -- Cond Aperiodic<br>    },<br>    csi-SSB-ResourceSet    INTEGER (1.. maxNrotCSI-SSB-ResourceSetsPerConfig)<br>  },<br>  csi-IM-ResourcesForInterference    INTEGER(1..maxNrofCSI-IM-ResourceSetsPerConfig)    OPTIONAL, -- Cond CSI-IM-ForInterference<br>  nzp-CSI-RS-ResourcesForInterference INTEGER (1..maxNrofNZP-CSI-RS-ResourceSetsPerConfig)    OPTIONAL, -- Cond NZP-CSI-RS-ForInterference<br>  ...<br>}<br>-- TAG-CSI-APERIODICTRIGGERSTATELIST-STOP<br>-- ASN1STOP |

| CSI-AssociatedReportConfigInfo field descriptions |
|---|
| csi-IM-ResourcesForiaterference<br>CSI-IM-ResourceSet for interference measurement Entry number in csi-IM-ResourceSetList in the CSI-ResourceConfig indicated by csi-IM-ResourcesForinterference in the CSI-ReportConfig indicated by reportConfigId above (1 corresponds to the first entry, 2 to the second entry, and so on) The indicated GSI-IM-ResourceSet should have exactly the same number of resources like the NZP.CSI-RS-ResourceSet indicated in nzp-CSI-RS-ResourcesiorChannel<br>csi-SSB-ResourceSet<br>CSI-SSB-ResoutceSet for channel measurements. Entry number in csi-SSB-ResourceSetiist in the CSI-ResourceConfig indicated by resourcesForChannelMeasurement in the CSI-ReportConfig indicated by reportConfigid above (1 corresponds to the first entry, 2 to the second entry, and so on).<br>nzp-CSiRS-ResourcesForinterference<br>NZP-CSI-RS-Resourceset for interference measurement. Entry number in nzp-CS/RS-ResourceSetList in the OSI-ResopreConfig indicated by nzp-CSI-RS-ResourcesForinterference in the CSI-ReportConfig indicated by reportConfigid above (1 corresponds to the first entry, 2 to the second, entry, and so on).<br>qcl-info<br>Lisi of references to TCI-Siates for providing the QCL source and QCL type for each NZP.CSI RS Resource listed in nzp-CSLRS-Resources of the NZP-GSI-RS-ResourceSet indealed by nzp-CSI-RS-ResourcesforChannel Each TC/-Stateid refers to the TCI-Stste which has this value for tci-Staleld and is defined in toi-SlatesToAcidModList in the PDSCH-Config included in the BWP-Downlink corresponding to the serving cell and to the DL BWP to which the resourcesForChangelMeasurement (in the CSI-ReportConfig indicated by reporConfigId above) |

CSI-AssociatedReportConfigInfo field descriptions belong to. First entry in qcl-info-forChannel corresponds to first entry in nzp-CSI-RSResources of that NZP-CSI-RS-ResourceSel, second entry in qcl-info-forChannel corresponds to second entry in nzp-CSI-RS-Resources, and so on (see TS 33.214 [19]. clause 5.2.1 5.1)
reportConfigid
The reportConfigid of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChanneiMessurement in the CSI-ReportConfig indicated by reportConfigid above (1 corresponds to the first eniry, 2 to thesecond entry, and so on).

| Conditional Presence | Explanation |
|---|---|
| Aperiodic | The field is mandatory present if the NZP-CSIRS-Resources in the associated resourceSet have the resourceType aperiodic. The field is absent otherwise. |
| CSI-IM-ForInterference | This field is optional need M if the CSI-ReportConfig identified by reportConfigid is configured with csi-IM-ResourcesForinterference, otherwise it is absent. |
| NZP-CSI-RS-ForInterference | This field is optional need M if the CSI-ReportConfig identified by reportConfigid is configured with nzp-CS/-RS-ResourcesForinterference; otherwise it is absent. |

TABLE 26

CSI-SemiPersistentOnPUSCH-TriggerStateList

The CSI-SemiPersistentOnPUSCH-TriggerStateList IE is used to configure the UE with list of trigger states for semi-persistent reporting of channel state information on L1. See also TS 38.214 [19], clause 5.2.
    CSI-SemiPersistentOnPUSCH-TriggerStateList information element
-- ASN1START
-- TAG-CSI-SEMIPERSISTENTONPUSCHTRIGGERSTATELIST-START
CSI-SemiPersistentOnPUSCH-TriggerStateList ::= SEQUENCE(SIZE
(1..maxNrOfSemiPersistentPUSCH-Triggers)) OF CSI-SemiPersistentOnPUSCH-TriggerState
CSI-SemiPersistentOnPUSCH-TriggerState ::=    SEQUENCE {
  associatedReportConfigInfo    CSI-ReportConfigId,
  ...
}
-- TAG-CSI-SEMIPERSISTENTONPUSCHTRIGGERSTATELIST-STOP
-- ASN1STOP With respect to the above-described CSI report setting CSI-ReportConfig, each report setting CSI-ReportConfig may be associated with one DL BWP indicated by a CSI resource setting associated with the corresponding report setting and a higher layer parameter BWP identifier bwp-id in CSI-ResourceConfig.

As a time domain reporting operation for each reporting setting CSI-ReportConfig, 'aperiodic', 'semi-persistent', and 'periodic' schemes are supported, and may be configured from a BS for a terminal by a parameter reportConfigType configured from a higher layer. The semi-persistent CSI reporting method supports 'PUCCH-based semi-persistent (semi-PersistentOnPUCCH)' and 'PUSCH-based semi-persistent (semi-PersistentOnPUSCH)'. In the periodic or semi-persistent CSI reporting method, a terminal may be configured with PUCCH or PUSCH resources for transmitting CSI from a BS, through higher layer signaling. A period and a slot offset of PUCCH or PUSCH resources for transmitting CSI may be given based on the numerology of a UL BWP configured for transmitting a CSI report. In the aperiodic CSI reporting method, the terminal may be scheduled with PUSCH resources for transmitting CSI from the BS through L1 signaling (DCI, e.g., the above-described DCI format 0_1).

With respect to the above-described CSI resource setting CSI-ResourceConfig, each CSI resource setting CSI-ReportConfig may include S (≥1) CSI resource sets (configured by a higher layer parameter csi-RS-ResourceSetList). The CSI resource set list may include a non-zero power (NZP) CSI-RS resource set and a SS/PBCH block set, or a CSI-interference measurement (CSI-IM) resource set. Each CSI resource setting may be located in a DL BWP indicated by a higher layer parameter bwp-id, and may be connected to a CSI report setting of the same DL BWP. A time domain operation of a CSI-RS resource in a CSI resource setting may be configured as one of 'aperiodic', 'periodic', or 'semi-persistent' by a higher layer parameter resourceType. For a periodic or semi-persistent CSI resource setting, the number of CSI-RS resource sets may be limited to be S=1, and the configured period and slot offset may be given based on the numerology of the DL BWP indicated by bwp-id. The terminal may be configured with one or more CSI resource settings for channel or interference measurement, through higher layer signaling from the BS, and for example, the following CSI resources may be included.

CSI-IM resources for interference measurement
    NZP CSI-RS resources for interference measurement
    NZP CSI-RS resources for channel measurement With respect to CSI-RS resource sets associated with resource settings having a higher layer parameter resourceType configured as 'aperiodic', 'periodic', or 'semi-persistent', a trigger state of a CSI reporting setting having reportType configured as 'aperiodic', and a resource setting for channel or interference measurement on one or more component cells (CCs) may be configured by a higher layer parameter CSI-AperiodicTriggerStateList.

A terminal may use a PUSCH for aperiodic CSI reporting, may use a PUCCH for periodic CSI reporting, and may perform semi-persistent CSI reporting by using a PUSCH when the reporting is triggered or activated by DCI, and by using a PUCCH after the reporting is activated by a MAC control element (MAC CE). As described above, a CSI resource setting may also be configured as 'aperiodic', 'periodic', and 'semi-persistent'. A combination of a CSI reporting setting and a CSI resource setting may be supported based on Table 27 below.

TABLE 27

Triggering/Activation of CSI Reporting for the possible CSI-RS Configurations

| CSI-RS Configuration | Periodic CSI Reporting | Sems-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5,1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38,321] possible as defined in Subclause 5.2.1.5.1. |
| Aperiodic OSI-RS | Not Supported | Not Supported | Triggered by DCI; additionally, activation command [10, TS 38,321; possible as defined in Subclause 5.2.1,5.1. |

Aperiodic CSI reporting may be triggered by a "CSI request" field in DCI format 0_1 described above, corresponding to scheduling DCI for a PUSCH. A terminal may monitor a PDCCH, obtain DCI format 0_1, and obtain scheduling information for a PUSCH and a CSI request indicator. The CSI request indicator may be configured to have NTs (=0, 1, 2, 3, 4, 5, or 6) bits, and the number of bits of the CSI request indicator may be determined by higher layer signaling (reportTriggerSize). One trigger state among one or more aperiodic CSI reporting trigger states, which may be configured by higher layer signaling (CSI-AperiodicTriggerStateList), may be triggered by a CSI request indicator.
- When all of the bits in a CSI request field are 0s, this may indicate that CSI reporting is not requested.
- When the number M of configured CSI trigger states in CSI-AperiodicTriggerStateLite is greater than $2^{N_{Ts}}-1$, M CSI trigger states may be mapped to $2^{N_{Ts}}-1$ according to a predefined mapping relationship, and one trigger state of the 2NTs−1 trigger states may be indicated by a CSI request field.
- When the number M of configured CSI trigger states in a CSI-AperiodicTriggerStateLite is less than or equal to $2^{N_{Ts}}-1$, one of M CSI trigger states may be indicated by a CSI request field.

Table 28 below shows examples of relationships between CSI request indicators and CSI trigger states that may be indicated by the corresponding indicators.

TABLE 28

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI reporl#2 | CSI resource#1, CSI resource#2 |
| 10 | CSI trigger state#2 | CSI report#3 | CSI resource#3 |

TABLE 28-continued

| CSI request field | CSI trigger state | CSI-ReportConfigId | CSI-ResourceConfigId |
|---|---|---|---|
| 11 | CSI trigger state#3 | CSI report#4 | CSI resource#4 |

The terminal may measure a CSI resource in a CSI trigger state triggered by a CSI request field, and then generate CSI (including at least one of CQI, PMI, CRI, SSBRI, LI, RI, or L1-RSRP described above). The terminal may transmit obtained CSI by using a PUSCH scheduled by corresponding DCI format 0_1. When one bit corresponding to a UL data indicator (UL-SCH indicator) in the DCI format 0_1 indicates "1", the terminal may multiplex the obtained CSI with UL data (UL-SCH) by using a PUSCH resource scheduled by the DCI format 0_1, to transmit the multiplexed CSI and data. When one bit corresponding to the UL data indicator (UL-SCH indicator) in the DCI format 0_1 indicates "0", the terminal may map only the CSI to the PUSCH resource scheduled by the DCI format 0_1, without UL data (UL-SCH), to transmit the CSI.

When performing aperiodic CSI reporting, the terminal may monitor a PDCCH to obtain DCI format 0_1, and obtain scheduling information for a PUSCH and CSI request information, from the DCI format 0_1. The terminal may obtain resource information about a CSI-RS to be measured, from a received CSI request indicator. The terminal may determine at which time point the terminal needs to perform measurement of a transmitted NZP CSI-RS resource, based on a time point at which the DCI format 0_1 is received and a parameter (aperiodicTriggeringOffset described above) associated with an offset in a CSI resource set configuration (e.g., a NZP CSI-RS resource set configuration NZP-CSI-RS-ResourceSet). In more detail, the terminal may be configured with an offset X of a parameter aperiodicTriggeringOffset in an NZP-CSI-RS resource set configuration from the BS through higher layer signaling, and the configured offset X may denote an offset between a slot in which DCI triggering aperiodic CSI reporting and a slot in which a CSI-RS resource is transmitted. For example, the value of the parameter aperiodicTriggeringOffset and the offset X may be in a mapping relationship listed in Table 29 below.

TABLE 29

| aperiodic TriggeringOffset | Offset X |
| --- | --- |
| 0 | 0 slot |
| 1 | 1 slot |
| 2 | 2 slots |
| 3 | 3 slots |
| 4 | 4 slots |
| 5 | 16 slots |
| 6 | 24 slots |

Figure 10:
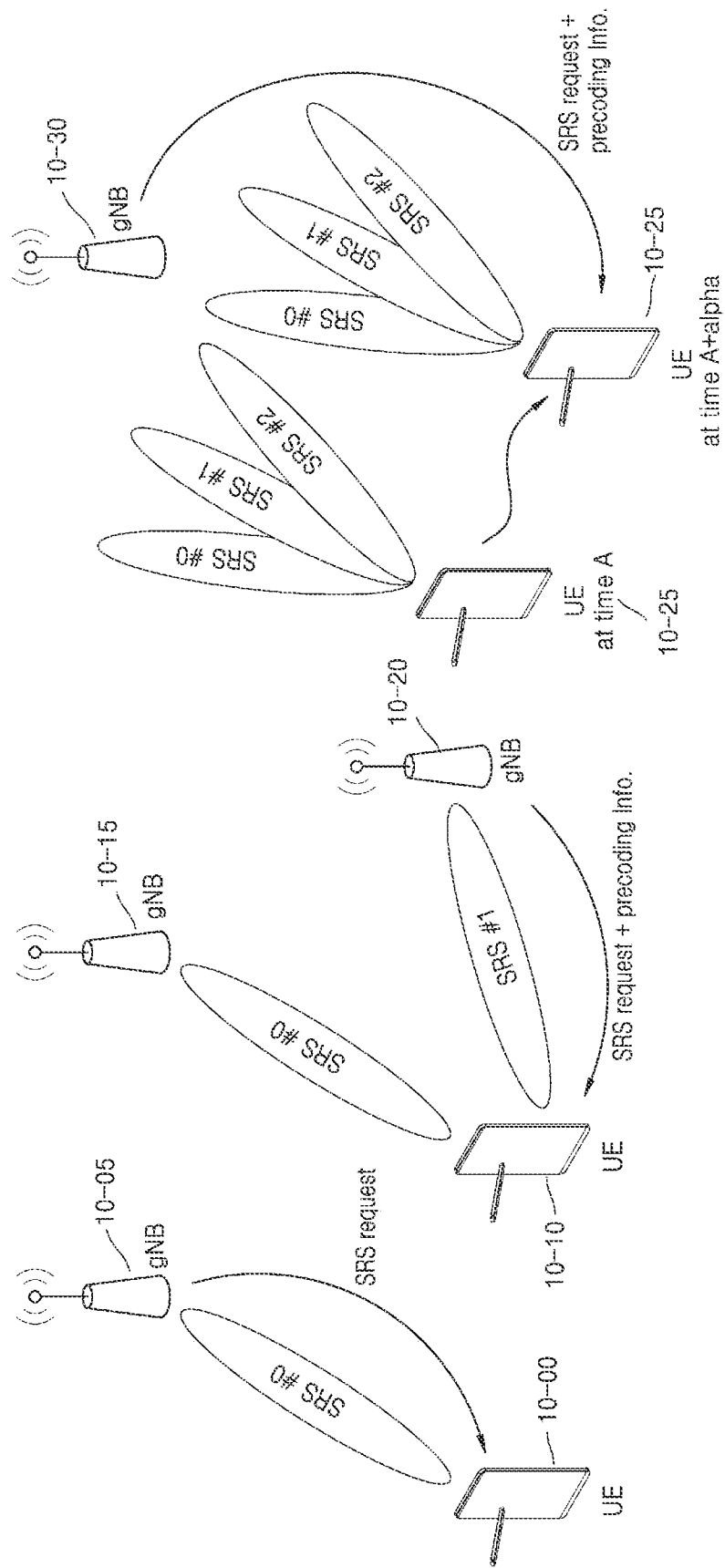
FIG. 10 is a diagram illustrating examples for various operating scenarios of a sounding reference signal (SRS), according to an embodiment of the present disclosure.

FIG. 10 is a diagram illustrating examples of various operating scenarios of an SRS, according to an embodiment of the present disclosure. Referring to FIG. 10, at least the following three SRS operation scenarios may be considered in an NR system.

1) A BS 10-05 configures a beam in one direction for a terminal 10-00 (in the present disclosure, configuring a beam/precoding in one direction includes not applying a beam/precoding or applying a wide beam (cell coverage or sector coverage)), and the terminal 10-00 transmits an SRS according to an SRS transmission period and offset of the SRS in the case of a periodic SRS or a semi-persistent SRS, or according to an SRS request of the BS (at a determined time point after the SRS request) in the case of an aperiodic SRS. In this case, additional information for a beam/precoding is not required for the SRSs.

2) BSs 10-15 and 10-20 may configure beams in one or more directions for a terminal 10-10, and the terminal 10-10 may transmit a plurality of SRSs beamformed in the one or more directions. For example, as in the example illustrated in FIG. 10, SRS resource (or port) #0 may be configured to be beamformed to the BS 10-15, and SRS resource (or port) #1 may be configured to be beamformed to the BS 10-20. In this case, the BSs 10-15 and 10-20 need to inform of not only the SRS request but also SRS beam/precoding information, unlike the method 1).

3) A BS 10-30 may configure beams in one or more directions for a terminal 10-25, and the terminal 10-25 may transmit a plurality of SRSs beamformed in the one or more directions. For example, as in the example illustrated in FIG. 10, the BS may configure the terminal to apply different beams/precodings to SRS resource (or port) #0, SRS resource (or port) #1, and SRS resource (or port) #2, respectively, to transmit an SRS. Through this configuration, even when the mobility of a terminal is high, stable communication may be performed through beam/precoding diversity. For example, the terminal 10-25 may provide channel state information to the BS 10-30 with SRS #2 at time A, and may provide channel state information to the BS 10-30 with SRS #0 at time A+alpha. In this case, the BS 10-30 needs to inform of not only an SRS request but also SRS beam/precoding information, unlike the method 1).

The above descriptions are based on SRS transmission, but are also applicable to other UL channel and/or RS transmission, such as a physical random access channel (PRACH), a PUSCH, or a PUCCH, and in order not to obscure the gist of the present disclosure, detailed descriptions of all cases will be omitted.

Figure 11:
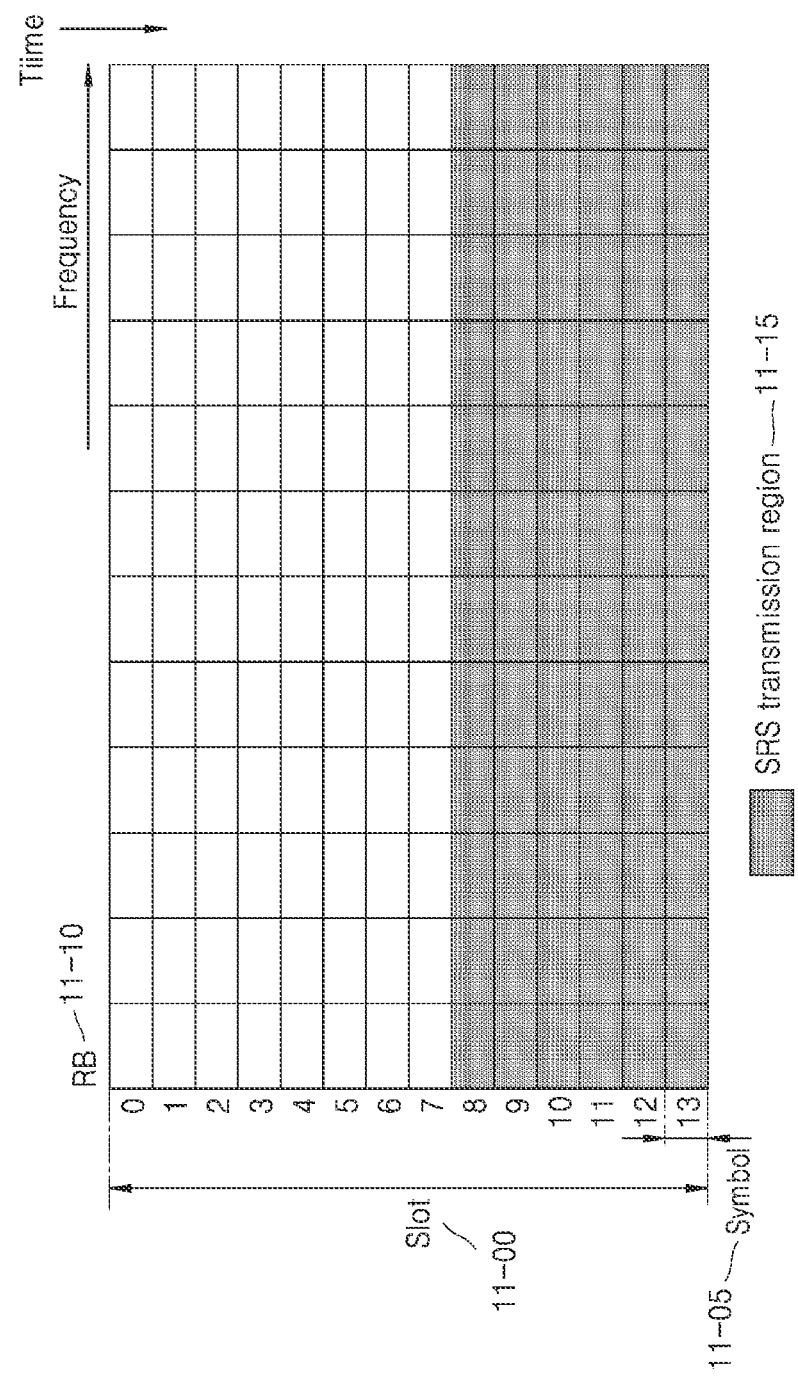
FIG. 11 is a diagram illustrating an uplink transmission structure of a 5G or New Radio (NR) system according to an embodiment of the present disclosure.

FIG. 11 is a diagram illustrating a UL transmission structure of a 5G or NR system according to an embodiment of the present disclosure.

Referring to FIG. 11, a basic transmission unit of the 5G or NR system is a slot 11-00, and assuming a general cyclic prefix (CP) length, each slot includes 14 symbols 11-05, and one symbol may correspond to one UL waveform (CP-OFDM or DFT-S-OFDM) symbol.

An RB 11-10 is a resource allocation unit corresponding to one slot based on a time domain, and may include 12 subcarriers based on a frequency domain.

A UL structure may be mainly divided into a data region and a control region. Unlike an LTE system, in a 5G or NR system, a control region may be configured in an arbitrary position of a UL and then transmitted. Here, a data region includes a series of communication resources including data, such as a voice and a packet, transmitted to each terminal, and corresponds to resources other than a control region in a subframe. A control region includes a series of communication resources for a report on DL channel quality from each terminal, a reception ACK/NACK for a DL signal, a request for UL scheduling, and the like.

The terminal may simultaneously transmit its own data and control information in a data region and a control region. Symbols in one slot in which the terminal may periodically transmit an SRS may be last six symbols in SRS transmission region 11-15, and the SRS may be transmitted through a preconfigured SRS transmission band in a UL BWP based on the frequency domain. However, this is merely an example, and symbols on which an SRS may be transmitted may be extended to another time interval in the slot (e.g., such that some of all OFDM symbols in the slot are configured as SRS resources). When being transmitted through the frequency region, RBs that may transmit SRSs are transmitted in multiples of 4 RB, and a maximum of 272 RB may be transmitted.

In addition, in a 5G or NR system, N, which is the number of symbols of an SRS, may be configured to be 1, 2, or 4, and the SRS may be transmitted on consecutive symbols. In addition, in a 5G or NR system, repetitive transmission of SRS symbols is allowed. In detail, a repetitive transmission factor (a repetition factor) r of an SRS symbol may be configured to satisfy r∈{1,2,4}, wherein r≤N. For example, when one SRS antenna is transmitted after being mapped to one symbol, a maximum of four symbols may be repetitively transmitted. On the contrary, four different antenna ports may be transmitted in different four symbols. In this case, each antenna port is mapped to one symbol, and thus repetitive transmission of SRS symbols is not allowed.

In LTE and NR, an SRS may be configured based on the following higher layer signaling information (or subsets thereof):

BandwidthConfig: configures SRS bandwidth information. An accurate value indicated by each code point may vary depending on a UL system BW value.

SubframeConfig (or ConfigIndex): configures an SRS transmission period and transmission offsets. An accurate value indicated by each code point may vary depending on whether FDD or TDD is used.

ackNackSRS-SimultaneousTransmission: notifies of whether ACK/NACK-SRS simultaneous transmission is performed.

MaxUpPts: notifies of whether a frequency position of SRS transmission is initialized in a UpPTS.

Hopping: notifies, with 2-bit information, of whether SRS frequency hopping is performed, a hopping position, and a hopping method.

Frequency domain position: notifies of a frequency domain location of SRS transmission.

Duration: notifies of whether a periodic SRS is transmitted.

Transmission comb: notifies of a comb offset when performing SRS transmission.

Cyclic shift: notifies of a cyclic shift value when performing SRS transmission.

Antenna port: notifies of the number of SRS antenna ports used when performing SRS transmission. In LTE, one, two, or four ports may be supported.

An LTE-A system may support periodic and aperiodic SRS transmission based on the above-described configuration information. In an NR system, in addition to the above-described configuration information, additional information such as activation/deactivation signaling with respect to SRS resources may be used, and periodic, semi-persistent, and aperiodic SRS transmission may be supported. Depending on the type of transmission of an SRS, some of the configuration information may be omitted depending on, for example, whether periodic, semi-persistent, or aperiodic SRS transmission is performed.

An SRS may include a constant amplitude zero autocorrelation (CAZAC) sequence. CAZAC sequences constituting respective SRSs transmitted from several terminals have different cyclic shift values. In addition, each of CAZAC sequences generated through a cyclic shift in one CAZAC sequence may have a correlation value of 0 with sequences having cyclic shift values different from its cyclic shift value. SRSs simultaneously allocated to the same frequency region by using the above characteristics may be classified according to a CAZAC sequence cyclic shift value configured for each SRS by the BS.

SRSs of several terminals may be classified according to a frequency position as well as a cyclic shift value. Frequency positions may be classified into allocated SRS sub-band units or Combs. A 5G or NR system may support Comb2 and Comb4. In the case of Comb2, one SRS may be allocated only to an even-numbered or odd-numbered subcarrier within an SRS sub-band. In this case, each of the even-numbered subcarriers and the odd-numbered subcarriers may constitute one Comb.

Each terminal may be allocated an SRS sub-band based on a tree structure. In addition, the terminal may perform hopping on the SRS allocated to each sub-band at each SRS transmission time point. Accordingly, all transmission antennas of the terminal may transmit an SRS by using the entire UL data transmission bandwidth.

Figure 12:
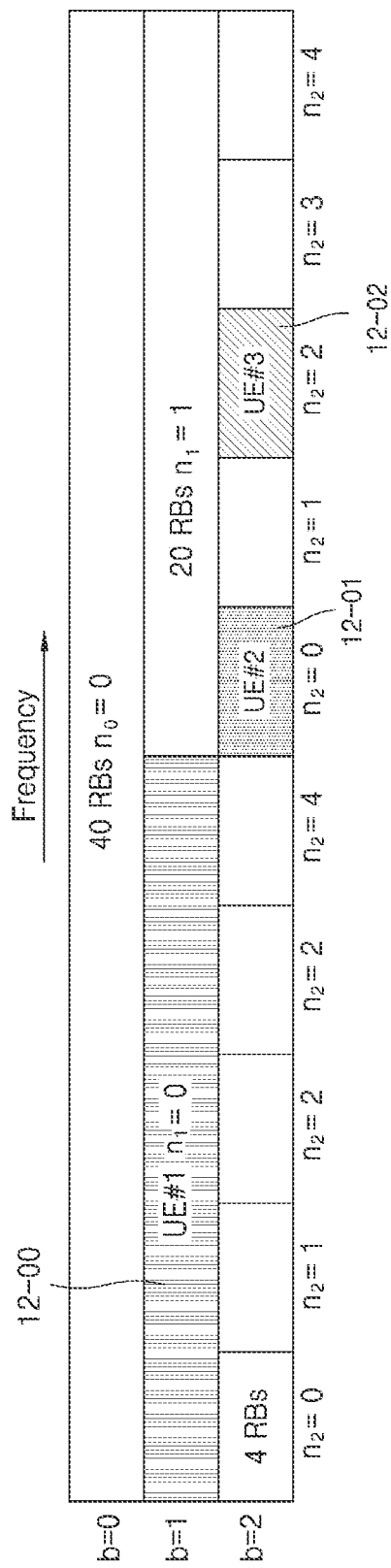
FIG. 12 is a diagram illustrating a structure in which an SRS is allocated for each sub-band, according to an embodiment of the present disclosure.

FIG. 12 is a diagram illustrating a structure in which an SRS is allocated for each sub-band, according to an embodiment of the present disclosure.

FIG. 12 illustrates an example in which an SRS is allocated to each terminal according to a tree structure configured by a BS when a data transmission band corresponding to 40 RBs is present on a frequency.

In FIG. 12, when a level index of the tree structure is b, the highest level (b=0) of the tree structure may include one SRS sub-band of a 40-RB bandwidth. In a second level (b=1), two SRS sub-bands of 20-RB bandwidths may be generated from the SRS sub-band of the level b=0. Accordingly, two SRS sub-bands may be present in the entire data transmission band of the second level (b=1). In a third level (b=2), five 4-RB SRS sub-bands are generated from one 20-RB SRS sub-band of the immediately higher level (b=1), and ten 4-RB SRS sub-bands are present in one level.

In such a tree structure, the number of levels, an SRS sub-band size, and the number of SRS sub-bands per level may vary depending on the configuration of a BS. Here, the number of SRS sub-bands in level b, which are generated from one SRS sub-band of a higher level, may be defined as $N_b$, and indices of the $N_b$ SRS sub-bands may be defined as $n_b=\{0, \ldots, N_b-1\}$. As the number of sub-bands varies depending on the level, a terminal may be allocated to each sub-band in each level as illustrated in FIG. 12. For example, terminal #1 12-00 may be allocated to a first SRS sub-band ($n_1=0$) of two SRS sub-bands each having a 20-RB bandwidth in a level of b=1, and terminal #2 12-01 and terminal #3 12-02 may be allocated to a first SRS sub-band ($n_2=0$) and a third SRS sub-band ($n_2=2$) below a second 20-RB SRS sub-band, respectively. Through these processes, a terminal may simultaneously transmit SRSs through a plurality of CCs, and may simultaneously transmit SRSs through a plurality of SRS sub-bands in one CC.

In detail, for the above-described SRS sub-band configuration, NR supports SRS bandwidth configurations as shown in Table 30 below.

TABLE 30

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 26 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |

TABLE 30-continued

| $C_{SRS}$ | $B_{SRS}=0$ | | $B_{SRS}=1$ | | $B_{SRS}=2$ | | $B_{SRS}=3$ | |
| --- | --- | --- | --- | --- | --- | --- | --- | --- |
| | $m_{SRS,0}$ | $N_0$ | $m_{SRS,1}$ | $N_1$ | $m_{SRS,2}$ | $N_2$ | $m_{SRS,3}$ | $N_3$ |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 32 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

In addition, NR supports SRS frequency hopping based on the values listed in Table 30, and the detailed procedure is described in Table 31 below.

TABLE 31

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource, elements (k, l) in a slot for each of the antenna ports $p_i$ according to $$a^{(p_i)}_{K_{TC}k'+k_0^{(p_i)},l'+l_0} = \begin{cases} \frac{1}{\sqrt{N_{ap}}}\beta_{SRS}r^{(p_i)}(k',l') & k'=0,1,\ldots,M^{SRS}_{sc,b}-1 \\ & l'=0,1,\ldots,N^{SRS}_{symb}-1 \\ 0 & \text{otherwise} \end{cases}$$

The length of the sounding reference signal sequence is given by
$M^{SRS}_{sc,b} = m_{SRS,b} N^{RB}_{sc}/K_{TC}$
where $m_{SRS,b}$ is given by a selected row of Table 6.4.1.4.3-1 with b = $\beta_{SRS}$ where $B_{SRS} \in \{0, 1, 2, 3,\}$ is given by the field b-SRS contained in the higher-layer parameter fregHopping. The row of the table is selected according to the index $C_{SRS} \in \{0,1, \ldots, 63\}$ given by the field c-SRS contained in the higher-layer parameter fregHopping. The frequency-domain starting position $k_0^{(p_i)}$ is defined by $$k_0^{(p_i)} = \bar{k}_0^{(p_i)} + \sum_{b=0}^{B_{SRS}} K_{TC}M^{SRS}_{sc,b}n_b$$

where $$\bar{k}_0^{(p_i)} = n_{shift}N^{RB}_{sc} + k^{(p_i)}_{TC}$$

$$k^{(p_i)}_{TC} = \begin{cases} (\bar{k}_{TC} + K_{TC}/2)\text{mod } K_{TC} & \text{if } n^{cs}_{SRS} \in \{n^{cs,max}_{SRS}/2, \ldots, n^{cs,max}_{SRS}-1\} \\ & \text{and } N^{SRS}_{ap} = 4 \text{ and } p_i \in \{1001, 1003\} \\ \bar{k}_{TC} & \text{otherwise} \end{cases}$$

If $N_{BWP}^{start} \leq n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC}-1\}$ is contained in the higher-layer parameter transmissionComb in the SRS-Config IE and $n_b$ is a frequency position index.
Frequency hopping of the sounding reference signal is configured by the parameter $b_{hop} \in \{0, 1, 2, 3\}$, given by the field b-hop contained in the higher-layer parameter freqHopping
If $b_{hop} \geq B_{SRS}$, frequency hopping is disabled and the frequency position index $n_b$ remains constant (unless re-configured) and is defined by
$n_b = \lfloor 4n_{RRC}/m_{SRS,b} \rfloor \text{mod } N_b$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for b = $B_{SRS}$ are given by the selected row of Table 6.4.1.4.3-1 corresponding to the configured value of $C_{SRS}$.
If $b_{hop} < B_{SRS}$, frequency hopping is enabled and the frequency position indices $n_b$ are defined by $$n_b = \begin{cases} \lfloor 4n_{RRC}/m_{SRS,b} \rfloor \text{mod} N_b & b \leq b_{hop} \\ \{F_b(n_{SRS}) + \lfloor 4n_{RRC}/m_{SRSb} \rfloor\}\text{mod} N_b & \text{otherwise} \end{cases}$$

where $N_b$ is given by Table 6.4.1 4.3-1, $$F_b(n_{SRS}) = \begin{cases} (N_b/2)\left\lfloor \frac{n_{SRS}\text{mod}\Pi^b_{b'=b_{hop}}N_{b'}}{\Pi^{b-1}_{b'=b_{hop}}N_{b'}}\right\rfloor + \\ \quad \left\lfloor\frac{n_{SRS}\text{mod}\Pi^b_{b'=b_{hop}}N_{b'}}{2\Pi^{b-1}_{b'=b_{hop}}N_{b'}}\right\rfloor & \text{if } N_b \text{ even} \\ \lfloor N_b/2 \rfloor\lfloor n_{SRS}/\Pi^{b-1}_{b'=b_{hop}}N_{b'}\rfloor & \text{if } N_b \text{ odd} \end{cases}$$

and where $N_{b_{hop}} = 1$ regardless of the value of $N_b$. The quantity $n_{SRS}$ counts the number of SRS transmissions. For the case of an SRS resource configured as aperiodic by the higher-layer parameter resourceType, it is given by $n_{SRS} = \lfloor l'/R \rfloor$ within the slot in which the $N_{syndy}^{SRS}$ symbol SRS resource is transmitted. The quantity $R \leq N_{sym}^{SRS}$ is the repetition factor given by the field repetitionFactor contained in the higher-layer parameter resourceMapping.

As described above, a 5G or NR terminal supports a single-user multiple-input and multiple-output (SU-MIMO) scheme and has a maximum of four transmit antennas. In addition, an NR terminal may simultaneously transmit SRSs in a plurality of CCs or a plurality of SRS sub-bands in a CC. In a 5G or NR system, unlike an LTE system, various numerologies are supported, SRS transmission symbols may be variously configured, and repetitive SRS transmission through repetitive transmission factors (repetition factors) may be allowed.

Therefore, it is necessary to count SRS transmission considering this. Counting SRS transmission may be variously utilized. For example, counting SRS transmission may be utilized to support antenna switching according to SRS transmission. In detail, at which SRS transmission time point an SRS is transmitted, to which antenna the SRS corresponds, and in which band the SRS is transmitted may be determined by counting SRS transmission.

Hereinafter, a rate matching operation and a puncturing operation will be described in detail.

When time and frequency resources A for transmitting arbitrary symbol sequence A overlaps arbitrary time and frequency resources B, a rate matching or puncturing operation may be considered as a transmission/reception operation on channel A in consideration of resource C on which resources A and resources B overlap each other. The detailed operation may correspond to the following description.

Rate Matching Operation

A BS may map channel A to resource regions other than resource C corresponding to a region, among resources A on which symbol sequence A is to be transmitted to a terminal, that overlap resources B, and then perform transmission. For example, when symbol sequence A includes {symbol #1, symbol #2, symbol #3, symbol #4}, resources A include {resource #1, resource #2, resource #3, resource #4}, and resources B include {resource #3, resource #5}, the BS may sequentially map symbol sequence A to {resource #1, resource #2, resource #4}, which are the remaining resources other than {resource #3} corresponding to resource C, among resources A, and then perform transmission. As a result, the BS may map the symbol sequence {symbol #1, symbol #2, symbol #3} to {resource #1, resource #2, resource #4}, respectively, and then perform transmission.

The terminal may determine resources A and resources B from scheduling information for symbol sequence A from the BS, and accordingly, determine resource C, which is the region in which resources A and resources B overlap each other. The terminal may receive symbol sequence A on the assumption that symbol sequence A is mapped and transmitted in the remaining region other than resource C in resources A. For example, when symbol sequence A includes {symbol #1, symbol #2, symbol #3, symbol #4}, resources A include {resource #1, resource #2, resource #3, resource #4}, and resources B include {resource #3, resource #5}, the terminal may perform reception on the assumption that symbol sequence A is sequentially mapped to the remaining resources {resource #1, resource #2, resource #4} other than {resource #3} corresponding to resource C, among resources A. As a result, the terminal may perform a series of subsequent reception operations on the assumption that a symbol sequence {symbol #1, symbol #2, symbol #3} is mapped to {resource #1, resource #2, resource #4}, respectively.

Puncturing Operation

When resource C where resources A on which symbol sequence A is to be transmitted and resources B are overlapped each other exists, the BS may map symbol sequence A to resources A, but may not perform transmission on resource C, and may perform transmission only in the remaining resource region in resources A, other than resource C. For example, when symbol sequence A includes {symbol #1, symbol #2, symbol #3, symbol #4}, resources A include {resource #1, resource #2, resource #3, resource #4}, and resources B includes {resource #3, resource #5}, the BS may map symbol sequence A {symbol #1, symbol #2, symbol #3, symbol #4} to resources A {resource #1, resource #2, resource #3, resource #4}, may transmit only a symbol sequence {symbol #1, symbol #2, symbol #4} corresponding to the remaining resources {resource #1, resource #2, resource #4} other than {resource #3} corresponding to resource C among resources A, and may not transmit {symbol #3} mapped to {resource #3} corresponding to resource C. As a result, the BS may map the symbol sequence {symbol #1, symbol #2, symbol #4} to {resource #1, resource #2, resource #4}, respectively, and then perform transmission.

The terminal may determine resources A and resources B from scheduling information for symbol sequence A from the BS, and accordingly, determine resource C, which is the region in which resources A and resources B overlap each other. The terminal may receive symbol sequence A on the assumption that symbol sequence A is mapped to resources A and transmitted only in the remaining region other resource C among resource region A. For example, when symbol sequence A includes {symbol #1, symbol #2, symbol #3, symbol #4}, resources A include {resource #1, resource #2, resource #3, resource #4}, and resources B include {resource #3, resource #5}, the terminal may assume that symbol sequence A {symbol #1, symbol #2, symbol #3, symbol #4} is mapped to resources A {resource #1, resource #2, resource #3, resource #4}, respectively, but {symbol #3} mapped to {resource #3} corresponding to resource C is not to be transmitted, and may perform reception on the assumption that a symbol sequence {symbol #1, symbol #2, symbol #4} corresponding to the remaining resources {resource #1, resource #2, resource #4} other than {resource #3} corresponding to resource C are mapped and then transmitted. As a result, the terminal may perform a series of subsequent reception operations on the assumption that the symbol sequence {symbol #1, symbol #2, symbol #4} is mapped to {resource #1, resource #2, resource #4}, respectively.

[Rate Matching Resource]

A BS may configure one or more rate matching resources for a terminal through higher layer signaling (e.g., RRC signaling). Rate matching resource configuration information may include time-domain resource allocation information, frequency-domain resource allocation information, and period information. Hereinafter, a bitmap corresponding to frequency-domain resource allocation information is referred to as a "first bitmap", a bitmap corresponding to time-domain resource allocation information is referred to as a "second bitmap," and a bitmap corresponding to period information is referred to as a "third bitmap". When all or some of time and frequency resources of a scheduled data channel (e.g., a DL data channel, a PDSCH) overlap configured rate matching resources, the BS may rate-match the data channel in a rate matching resource portion and transmit the result, and the terminal may perform reception and decoding on the assumption that the data channel is rate-matched in the rate matching resource portion.

The BS may dynamically notify the terminal of whether to rate-match the data channel in the configured rate matching resource portion, by using DCI through an additional configuration (corresponding to "rate matching indicator" in the above-described DCI format). In detail, the BS may select some of the configured rate matching resources, group the selected resources into rate matching resource groups, and indicate, to the terminal, whether the data channel is rate-matched with each rate matching resource group through DCI using a bitmap method. For example, when four rate matching resources RMR #1, RMR #2, RMR #3 and RMR #4 have been configured, the BS may configure RMG #1={RMR #1, RMR #2} and RMG #2={RMR #3, RMR #4} as rate matching groups, and indicate, to the terminal, whether rate matching in each of RMG #1 and RMG #2 has been performed, by using 2 bits in a DCI field, in the form of a bitmap. For example, the BS may configure each bit as "1" when rate matching needs to be performed, and may configure each bit as "0" when rate matching do not need to be performed.

In the 5G system, granularity of an "RB symbol level" and an "RE level" is supported as the above-described method of configuring rate matching resources for a terminal. In more detail, the following configuration method may be provided.

RB Symbol Level

The terminal may be configured with up to four RateMatchPattern for each BWP through higher layer signaling, and one RateMatchPattern may include the following information.

Reserved resources in the BWP. Resources on which time and frequency resource regions of the reserved resources are configured by a combination of a bitmap of an RB level and a bitmap of a symbol level on a frequency axis may be included. The reserved resources may span across one or two slots. A time-domain pattern periodicityAndPattern in which time and frequency regions configured with each pair of RB level and symbol level bitmaps are repeated may be additionally configured.

Time and frequency domain resource regions configured as a control resource set in the BWP and a resource region corresponding to a time-domain pattern configured as a search space configuration in which the corresponding resource region is repeated may be included.

RE Level

The terminal may be configured with the following information through higher layer signaling.

Configuration information lte-CRS-ToMatchAround regarding an RE corresponding to LTE cell-specific reference Signal or common Reference signal (CRS) pattern, which may include the number of ports of the LTE CRS (nrofCRS-Ports), an LTE-CRS-vshift(s) value (v-shift), center subcarrier location information carrierFreqDL of an LTE carrier from a reference frequency point (e.g., reference point A), bandwidth size information carrierBandwidthDL of the LTE carrier, subframe configuration information mbsfn-SubramConfigList corresponding to a multicast-broadcast single-frequency network (MBSFN), and the like. The terminal may determine the location of a CRS in an NR slot corresponding to an LTE subframe, based on the above-described information.

Configuration information regarding a resource set corresponding to one or more Zero Power (ZP) CSI-RSs in the BWP may be included.

In 5G and subsequent communication systems, as a communication frequency band increases compared to that in 4G and antenna integration technology is matured, there is a growing possibility that four or more transmitting or receiving antennas are mounted on a terminal. This means that the number of OFDM symbols for SRS sounding may greatly increase, in consideration of various SRS transmission methods such as SRS antenna switching, frequency hopping, repetition, and the like, which consider securing of terminal complexity and an SRS coverage. For example, considering simultaneous operation of SRS antenna switching on 8 ports and frequency hopping with 4 sub-bands, a total of 32=4×8 OFDM symbols may be required for sounding on the entire channel.

Hereinafter, various methods of reducing an SRS sounding burden will be described with reference to detailed embodiments.

First Embodiment

The first embodiment of the present disclosure provides a method of reducing an SRS sounding burden through partial antenna sounding on a subset of terminal antenna ports. The partial sounding may be referred to as various terms such as 'partial SRS antenna port sounding' or 'partial antenna port sounding' when actually applied, but is herein commonly referred to as 'partial antenna sounding' for convenience of description.

Figure 13:
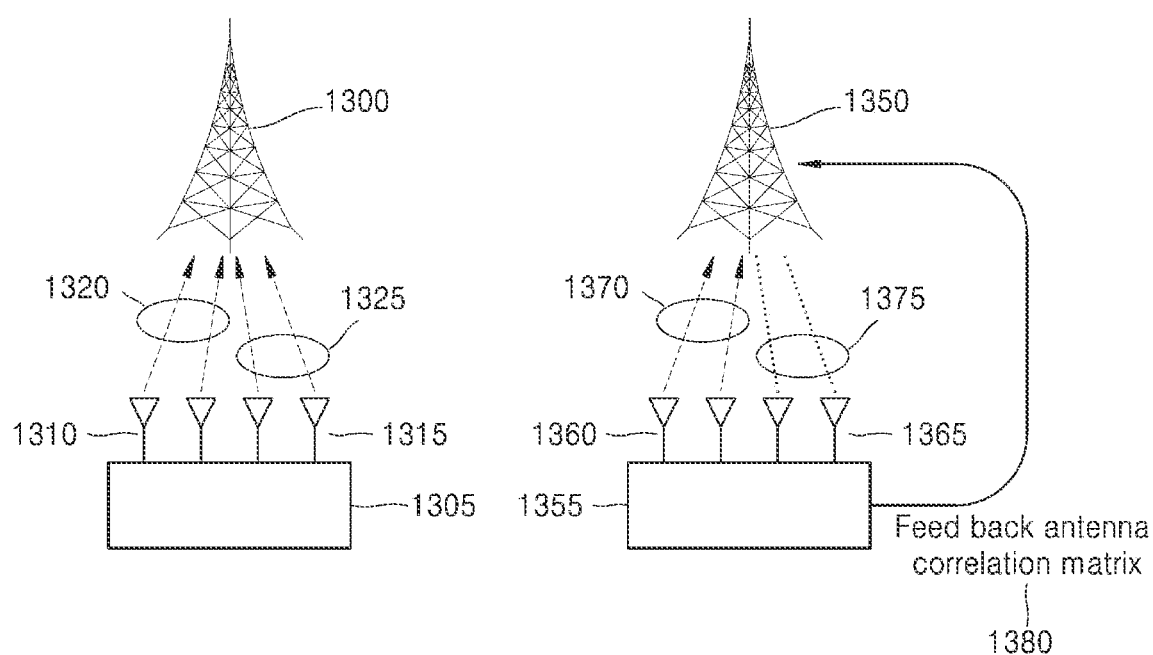
FIG. 13 is a diagram illustrating an example of SRS partial antenna sounding according to an embodiment of the present disclosure.

FIG. 13 is a diagram illustrating an example of SRS partial antenna sounding according to an embodiment of the present disclosure.

Referring to FIG. 13, a BS 1300 may configure a plurality of SRS antenna port 1310 to 1315 for a terminal 1305 having one or more transmitting and receiving antennas. In this case, the SRS antenna ports 1310 to 1315 of the terminal may be classified into one or more groups 1320 and 1325 according to an SRS resource or SRS resource set configuration or the like. In the related-art system, SRS antenna ports belonging to different groups may be transmitted in different time/space/frequency/sequence domains. For example, SRS antenna ports belonging to group A 1320 may be configured to be transmitted in a first slot, and SRS antenna ports belonging to group B 1325 may be configured to be transmitted in a second slot. Meanwhile, a super set of the configured groups includes all of the SRS antenna ports 1310 to 1315 of the terminal, and thus the BS may sound all of the SRS antenna ports within a sufficiently long time interval. Such an operation method may ensure excellent performance when the number of UL resources is sufficiently large and the time variation of the channel is sufficiently small, but there is an issue in that the SRS transmission burden increases as the number of SRS antenna ports of the terminal increases.

In order to solve this issue, partial antenna sounding that performs sounding for only some of SRS antenna ports of the terminal may be considered. Referring to FIG. 13, a BS 1350 may configure a plurality of SRS antenna port 1360 to 1365 for a terminal 1355 having one or more transmitting and receiving antennas. In this case, the SRS antenna ports of the terminal may be classified into one or more groups 1370 and 1375 according to an SRS resource or SRS resource set configuration or the like. In this case, SRS antenna ports belonging to a certain group 1370 of the groups may transmit an actual SRS through an SRS resource associated thereto, and SRS antenna ports belonging to another group 1375 may not transmit the SRS. In this case, the BS is unable to obtain channel state information about the group 1375 that does not transmit the SRS, but may infer (or reconstruct) the channel state information about the group 1375 that does not transmit the SRS, based on terminal antenna-related information 1380, such as a correlation value between antennas or a set of such values, which is reported by the terminal to the BS.

Hereinafter, a specific type of terminal antenna-related information reported by the terminal to the BS for partial antenna sounding, a method of reporting such information, and DL reception and UL transmission operations of a terminal according to application of partial antenna sounding will be described in detail.

[Element 1—terminal antenna type information reporting]: In a 5G communication system, a terminal needs to mount various types of antennas together, such as dipole antennas and patch antennas, in order to secure various transmission and reception characteristics. Hereinafter, for convenience of description, the term 'dipole antenna' will be referred to as 'first-type antenna' and the term 'patch antenna' will be referred to as 'second-type antenna'. The first-type and second-type antennas may be classified in more detail, for example, into J-pole antennas and the like, according to a detailed antenna design, but not all possible antenna implementations are listed in order not to obscure the gist of the description. (i.e., there may be additional antenna types including a third type, etc.)

A sounding result in a BS is determined according to a combination of an antenna pattern of the BS, a radio channel, and a terminal antenna pattern, and thus is affected by an antenna type used when performing partial antenna sounding. In consideration of this, the terminal may report information related to the antenna type, such as the type (or a combination of types) of an antenna used for the terminal implementation, the number of antenna types used for the terminal implementation, or the antenna type for each terminal antenna port, to the BS through a terminal capability report or other higher layer signaling. In this case, a report related to the antenna type may be agreed to have different values for LTE and NR bands (per band), different values for frequency ranges, such as frequency range 1 (FR1) of 6 GHz or less, frequency range 2 (FR2) of 6 GHz or greater, and the like (per FR), different values for cell groups, such as a master cell group (MCG) and a secondary cell group (SCG), for dual connectivity (per cell group), or different values for CCs. This is to consider that the terminal arranges antennas in consideration of different frequency characteristics of respective frequency bands.

[Element 2—Reporting terminal antenna spatial information (or correlation)] For partial antenna sounding, spatial information between terminal antennas may be considered as another example of terminal antenna-related information that the terminal may report to the BS. For example, when the terminal has a plurality of antennas, a spatial correlation between the antennas may be determined according to a distance between the terminal antennas, a component arrangement between the terminal antennas, physical properties, and the like.

Hereinafter, examples of determining spatial correlations according to an antenna arrangement of a terminal are provided.

Figure 14:
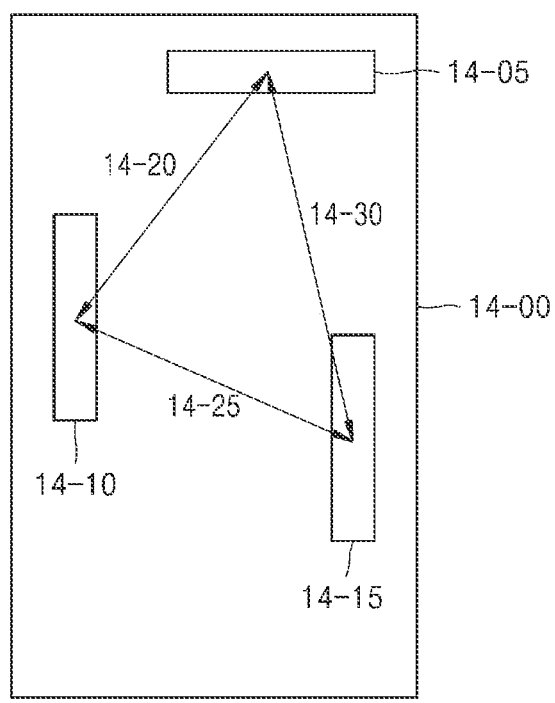
FIG. 14 is a diagram illustrating an example of SRS partial antenna sounding based on three user equipment antenna panels or six antenna ports, according to an embodiment of the present disclosure.

FIG. 14 is a diagram illustrating an example of SRS partial antenna sounding based on three terminal antenna panels or six antenna ports, according to an embodiment of the present disclosure.

Referring to FIG. 14, when a terminal 14-00 has three panels 14-05, 14-10, and 14-15 each including a cross polarized (X-pol) antenna, a total of six terminal antenna ports (antenna ports 0 to 5) may be present. In this case, it is assumed that antenna ports 0 to 5 constitute polarization groups A (e.g., including antenna ports 0, 1, and 2) and B (e.g., including antenna ports 3, 4, and 5), which are orthogonal to each other. For convenience, it is also assumed that ports 0 and 3 are mapped to the first panel 14-05, ports 1 and 4 are mapped to the second panel 14-10, and ports 2 and 5 are mapped to the third panel 14-15. Assuming that a cross-polarization discrimination (XPD) value between polarization groups A and B is X, a correlation between different polarization antenna ports in the same panel (e.g., a correlation between port 0 and port 3) may be calculated as follows.

$$R_{Xpol} = \begin{bmatrix} 1 & \frac{2}{\sqrt{X}} \\ \frac{2}{\sqrt{X}} & 1 \end{bmatrix}$$

Here, X may be defined according to $X = G_{co}/G_{cross}$, $G_{co}$ denotes a gain from the same poles (co-polarization gain), and $G_{cross}$ denotes a gain from different poles (cross-polarization gain).

Meanwhile, the correlation between antenna ports mapped to different panels in the same polarization may be represented as a function of the distance between the panels (in inverse proportion to the distance). For example, when a one-dimensional linear antenna array (1D-linear) in which four co-pol antenna ports are arranged at equal intervals on a straight line is present, and the spatial correlation between the closest antenna ports is σ, a spatial correlation matrix with respect to the four co-pol antenna ports may be represented as follows.

$$R_{1D-Linear} = \begin{bmatrix} 1 & \sigma & \sigma^2 & \sigma^3 \\ \sigma & 1 & \sigma & \sigma^2 \\ \sigma^2 & \sigma & 1 & \sigma \\ \sigma^3 & \sigma^2 & \sigma & 1 \end{bmatrix}, \sigma \in [0 \sim 1]$$

Here, an (x, y)-th element of the matrix $R_{1D-Linear}$ denotes a spatial correlation value between an x-th port and a y-th port.

As another example, when a two-dimensional linear antenna array (2D-linear) in which four co-pol antenna ports are arranged at equal intervals on a plane is present, and the spatial correlation between the closest antenna ports is σ, a spatial correlation matrix with respect to the four co-pol antenna ports may be represented as follows.

$$R_{2D-Linear} = \begin{bmatrix} 1 & \sigma & \sigma & \sqrt{2}\sigma \\ \sigma & 1 & \sqrt{2}\sigma & \sigma \\ \sigma & \sqrt{2}\sigma & 1 & \sigma \\ \sqrt{2}\sigma & \sigma & \sigma & 1 \end{bmatrix}, \sigma \in [0 \sim 1]$$

When three antenna panels are arranged at the same distance as illustrated in FIG. 14, and the average of spatial correlations 14-20, 14-25, and 14-30 between the antenna ports is σ, a spatial correlation matrix with respect to the three co-pol antenna ports 14-05, 14-10, and 14-15 of FIG. 14 may be represented as follows.

$$R_{3-panel} = \begin{bmatrix} 1 & \sigma & \sigma \\ \sigma & 1 & \sigma \\ \sigma & \sigma & 1 \end{bmatrix}, \sigma \in [0 \sim 1]$$

The spatial correlation matrix is not limited to the above examples, and its configuration may be variously changed according to the actual arrangement of terminal antennas, but all possible modifications are not listed herein in order not to obscure the gist of the description, and the spatial correlation matrix will be referred to as $R_{spatial}$ hereinafter.

A Kronecker product of a correlation matrix $R_{Xpol}$ and the spatial correlation matrix $R_{Spatial}$ between the X-pol antennas may represent a correlation matrix $R_{UE}$ with respect to all of the terminal antennas. In this case, the order of operands for the Kronecker product of the X-pol correlation matrix and the spatial correlation matrix may be appropriately changed according to the indexing order of the terminal antennas.

$R_{UE\_type1} = R_{Xpol} \otimes R_{Spatial}$ $R_{UE\_type2} = R_{Spatial} \otimes R_{Xpol}$ In relation to the various parameters discussed above, the terminal may report at least one of parameter values in the following list, values representing a certain matrix form, or values representing a combination thereof, to the BS through UE capability reporting or other higher layer signaling.

- Whether a Co-pol or X-pol antenna is used.
- Cross-polarization discrimination (XPD) value when using an X-pol antenna
- Correlation value or matrix between different polarization antenna ports when using an X-pol antenna
- Spatial antenna form of a terminal antenna or a modeling value most similar thereto (1D-linear, 2D-linear, etc.)
- Correlation value between the nearest antennas
- Correlation value between the farthest antennas.

Spatial correlation matrix with respect to co-pol antenna ports.

Correlation matrix with respect to all terminal antennas

In this case, a report related to the antenna correlation may be agreed to have different values for LTE and NR bands (per band), different values for frequency ranges, such as frequency range 1 (FR1) of 6 GHz or less, frequency range 2 (FR2) of 6 GHz or greater, and the like (per FR), different values for cell groups, such as an MCG and an SCG, for dual connectivity (per cell group), or different values for CCs. This is to consider that the terminal may differently arrange antennas in consideration of different frequency characteristics for each frequency band.

Figure 15:
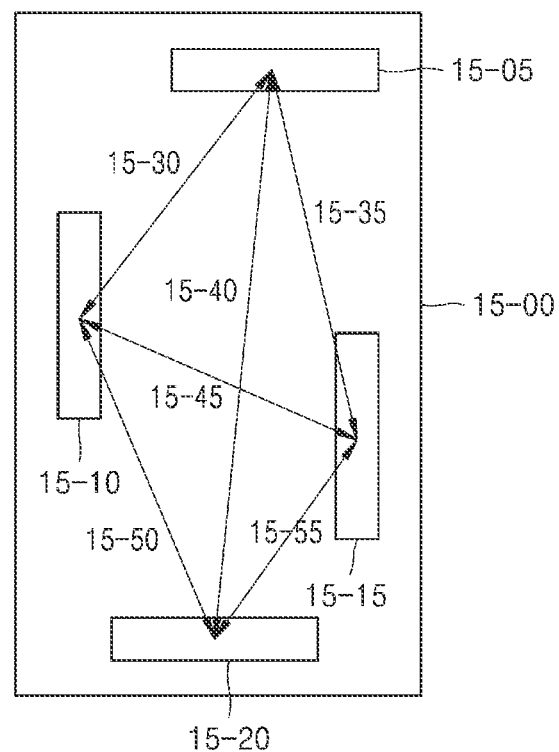
FIG. 15 is a diagram illustrating an example of SRS partial antenna sounding based on four user equipment antenna panels or eight antenna ports, according to an embodiment of the present disclosure.

FIG. 15 is a diagram illustrating an example of SRS partial antenna sounding based on four terminal antenna panels or eight antenna ports, according to an embodiment of the present disclosure.

Referring to FIG. 15, when a terminal 15-00 has four panels 15-05, 15-10, 15-15, and 15-20 each including an X-pol antenna, a total of eight terminal antenna ports (antenna ports 0 to 7) may be present. In this case, it is assumed that antenna ports 0 to 7 constitute polarization groups A (e.g., including antenna ports 0, 1, 2, and 3) and B (e.g., including antenna ports 4, 5, 6, and 7), which are orthogonal to each other. For convenience, it is also assumed that ports 0 and 4 are mapped to the first panel 15-05, ports 1 and 5 are mapped to the second panel 15-10, ports 2 and 6 are mapped to the third panel 15-15, and ports 3 and 7 are mapped to the fourth panel 15-20. Assuming that an XPD value between polarization groups A and B is X, a correlation between different polarization antenna ports in the same panel (e.g., a correlation between port 0 and port 4) may be calculated as follows.

$$R_{Xpol} = \begin{bmatrix} 1 & \frac{2}{\sqrt{X}} \\ \frac{2}{\sqrt{X}} & 1 \end{bmatrix}$$

Here, X may be defined according to $X = G_{co}/G_{cross}$, $G_{co}$ denotes a gain from the same poles (co-polarization gain), and $G_{cross}$ denotes a gain from different poles (cross-polarization gain).

Meanwhile, the correlation between antenna ports mapped to different panels in the same polarization may be represented as a function of the distance between the panels (in inverse proportion to the distance). For example, when a one-dimensional linear antenna array (1D-linear) in which four co-pol antenna ports are arranged at equal intervals on a straight line is present, and the spatial correlation between the closest antenna ports is σ, a spatial correlation matrix for the four co-pol antenna ports may be represented as follows.

$$R_{1D-Linear} = \begin{bmatrix} 1 & \sigma & \sigma^2 & \sigma^3 \\ \sigma & 1 & \sigma & \sigma^2 \\ \sigma^2 & \sigma & 1 & \sigma \\ \sigma^3 & \sigma^2 & \sigma & 1 \end{bmatrix}, \sigma \in [0 \sim 1]$$

Here, an (x, y)-th element of the matrix $R_{1D-Linear}$ denotes a spatial correlation value between an x-th port and a y-th port.

As another example, when a two-dimensional linear antenna array (2D-linear) in which four co-pol antenna ports are arranged at equal intervals on a plane is present, and the spatial correlation between the closest antenna ports is σ, a spatial correlation matrix for the four co-pol antenna ports may be represented as follows.

$$R_{2D-Linear} = \begin{bmatrix} 1 & \sigma & \sigma & \sqrt{2}\sigma \\ \sigma & 1 & \sqrt{2}\sigma & \sigma \\ \sigma & \sqrt{2}\sigma & 1 & \sigma \\ \sqrt{2}\sigma & \sigma & \sigma & 1 \end{bmatrix}, \sigma \in [0 \sim 1]$$

When four antenna panels are arranged at the same distance as illustrated in FIG. 15, and the average of spatial correlations 15-30, 15-35, 15-40, 15-50, and 15-55 between the antenna ports is σ, a spatial correlation matrix with respect to the four co-pol antenna ports 15-05, 15-10, 15-15, and 15-20 of FIG. 15 may be represented as follows.

$$R_{3-panel} = \begin{bmatrix} 1 & \sigma & \sigma \\ \sigma & 1 & \sigma \\ \sigma & \sigma & 1 \end{bmatrix}, \sigma \in [0 \sim 1]$$

The spatial correlation matrix is not limited to the above examples, and its configuration may be variously changed according to the actual arrangement of terminal antennas, but all possible modifications are not listed herein in order not to obscure the gist of the description, and the spatial correlation matrix will be referred to as $R_{Spatial}$ hereinafter.

A Kronecker product of a correlation matrix $R_{Xpol}$ and the spatial correlation matrix $R_{Spatial}$ between the X-pol antennas may represent a correlation matrix $R_{UE}$ with respect to all of the terminal antennas. In this case, the order of operands for the Kronecker product of the X-pol correlation matrix and the spatial correlation matrix may be appropriately changed according to the indexing order of the terminal antennas.

$R_{UE\_type1} = R_{Xpol} \otimes R_{Spatial}$
$R_{UE\_type2} = R_{Spatial} \otimes R_{Xpol}$ In relation to the various parameters discussed above, the terminal may report at least one of parameter values in the following list, values representing a certain matrix form, or values representing a combination thereof, to the BS through UE capability reporting or other higher layer signaling.

Whether a Co-pol or X-pol antenna is used.

Cross-polarization discrimination (XPD) value when using an X-pol antenna

Correlation value or matrix between different polarization antenna ports when using an X-pol antenna Spatial antenna form of a terminal antenna or a modeling value most similar thereto (1D-linear, 2D-linear, etc.)

Correlation value between the nearest antennas.

Correlation value between the farthest antennas.

Spatial correlation matrix with respect to co-pol antenna ports

Correlation matrix with respect to all terminal antennas

In this case, a report related to the antenna correlation may be agreed to have different values for LTE and NR bands (per band), different values for frequency ranges, such as frequency range 1 (FR1) of 6 GHz or less, frequency range 2 (FR2) of 6 GHz or greater, and the like (per FR), different values for cell groups, such as an MCG and an SCG, for dual connectivity (per cell group), or different values for CCs. This is to consider that the terminal may differently arrange antennas in consideration of different frequency characteristics for each frequency band. In addition, different spatial correlation values may be reported with respect to different antenna pairs for partial antenna sounding.

Figure 16:
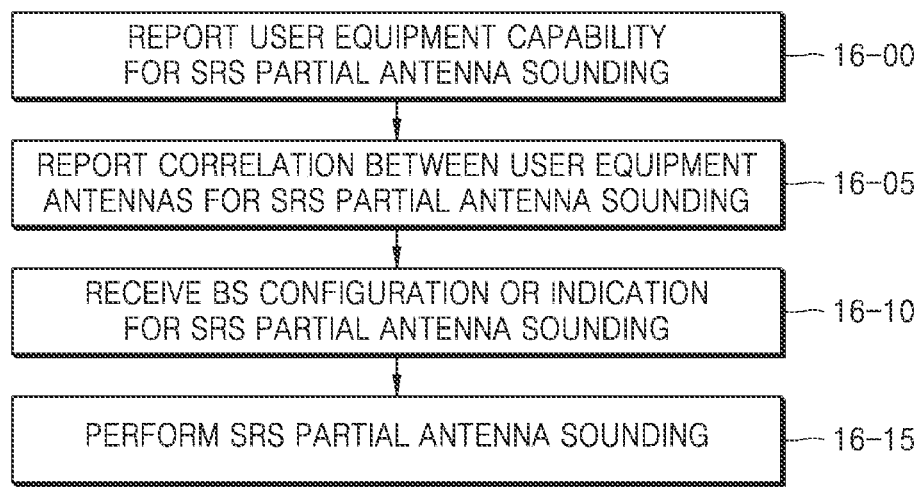
FIG. 16 is a diagram illustrating an operation, performed by a user equipment, of performing SRS partial antenna sounding, according to an embodiment of the present disclosure.

FIG. 16 is a diagram illustrating an operation, performed by a terminal, of performing SRS partial antenna sounding, according to an embodiment of the present disclosure.

Referring to FIG. 16, the terminal may report, to a BS, UE capability for informing whether the terminal is able to perform SRS partial antenna sounding (16-00). When the terminal is able to perform SRS partial antenna sounding, the terminal may report, to the BS, terminal antenna-related information described in Elements 1 to 2 above, for example, terminal antenna type information, terminal antenna spatial information (or a spatial correlation between terminal antennas), and the like (16-05). The terminal may receive, from the BS, a configuration or indication of the BS for SRS partial antenna sounding (16-10). The terminal may perform SRS partial antenna sounding based on the configuration or indication of the BS for SRS partial antenna sounding (16-15). <Second embodiment>

The second embodiment of the present disclosure provides a method of reducing an SRS sounding burden through partial sounding (partial frequency sounding) on a subset of a band of interest.

Figure 17:
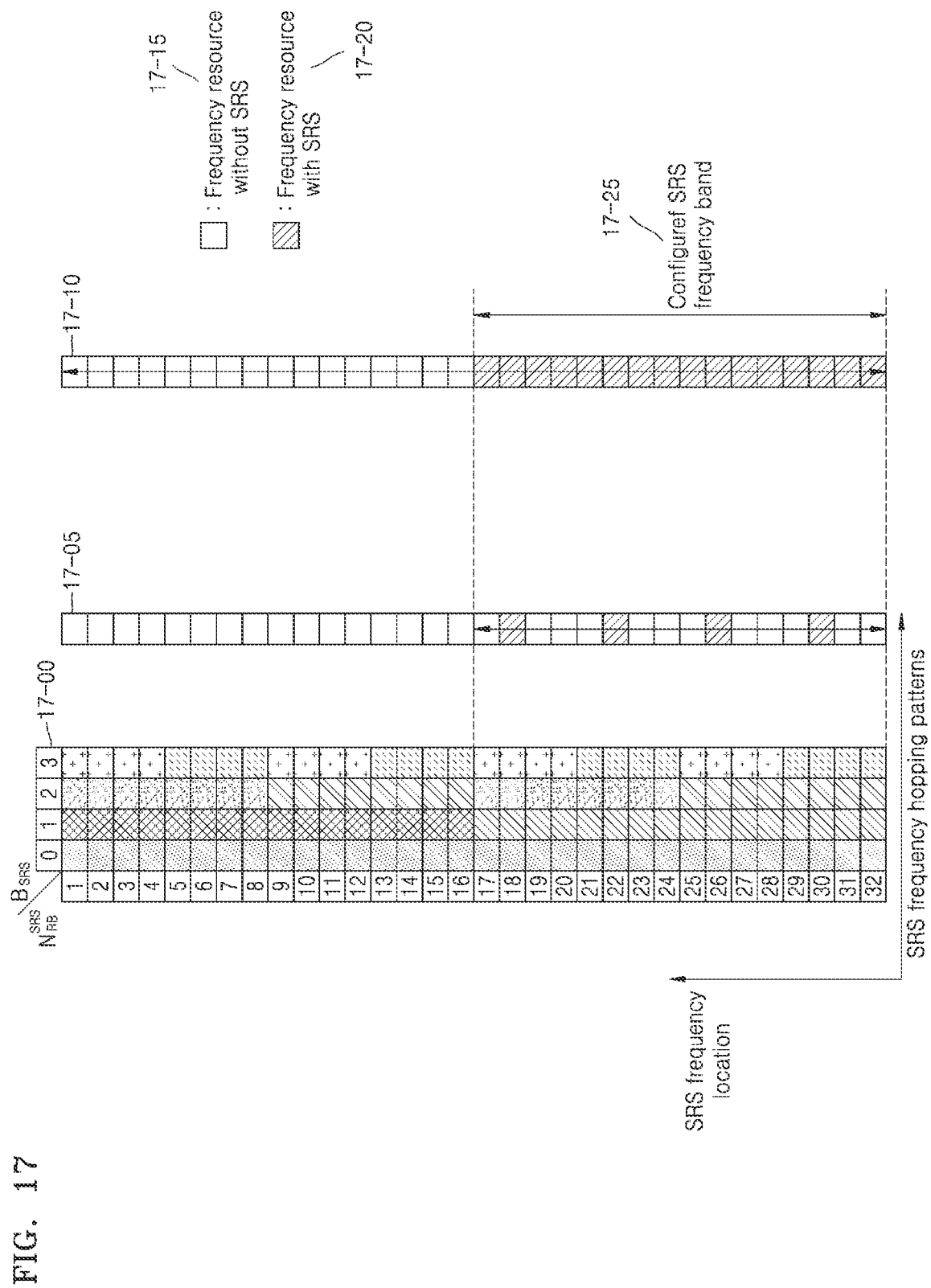
FIG. 17 is a diagram illustrating examples of SRS partial frequency sounding according to an embodiment of the present disclosure.

FIG. 17 is a diagram illustrating examples of SRS partial frequency sounding according to an embodiment of the present disclosure. Referring to FIG. 17, a BS and a terminal may determine an SRS transmission band 17-25, a frequency hopping pattern, and a frequency hopping unit (granularity) BsRs, according to an SRS configuration 17-00.

Meanwhile, the related-art minimum unit of SRS frequency hopping is 4 RBs, and because 4 RBs may still be too wide for a terminal having insufficient coverage and thus insufficient transmission power per PRB, it is necessary to support SRS frequency hopping for a band less than 4 RBs. When frequency hopping is performed with granularity less than 4 RBs, and hopping is performed on an entire configured SRS frequency band, a large amount of time and frequency resources may be required to perform hopping on the entire band. In order to appropriately adjust this, a method may be considered by which an SRS is transmitted only on some PRBs 17-20 in an SRS frequency band configured within an SRS frequency band period, and channel information about the remaining band 17-15 is estimated through interpolation in the BS (17-05). For convenience of descriptions, hereinafter, an interpolation-based partial frequency sounding method will be referred to as mode 1 SRS partial frequency sounding.

As another example, when a configured UL band is too wide or a DL band to be sounded through an SRS is too wide to be burdened with SRS transmission, the BS may consider a method of configuring an SRS frequency band for only a portion of a band of interest and estimating a channel through extrapolation in other bands (17-10). For convenience of descriptions, hereinafter, an extrapolation-based partial frequency sounding method will be referred to as mode 2 SRS partial frequency sounding.

Hereinafter, detailed operation methods of the mode 1 and mode 2 SRS partial frequency sounding will be described.

Figure 18:
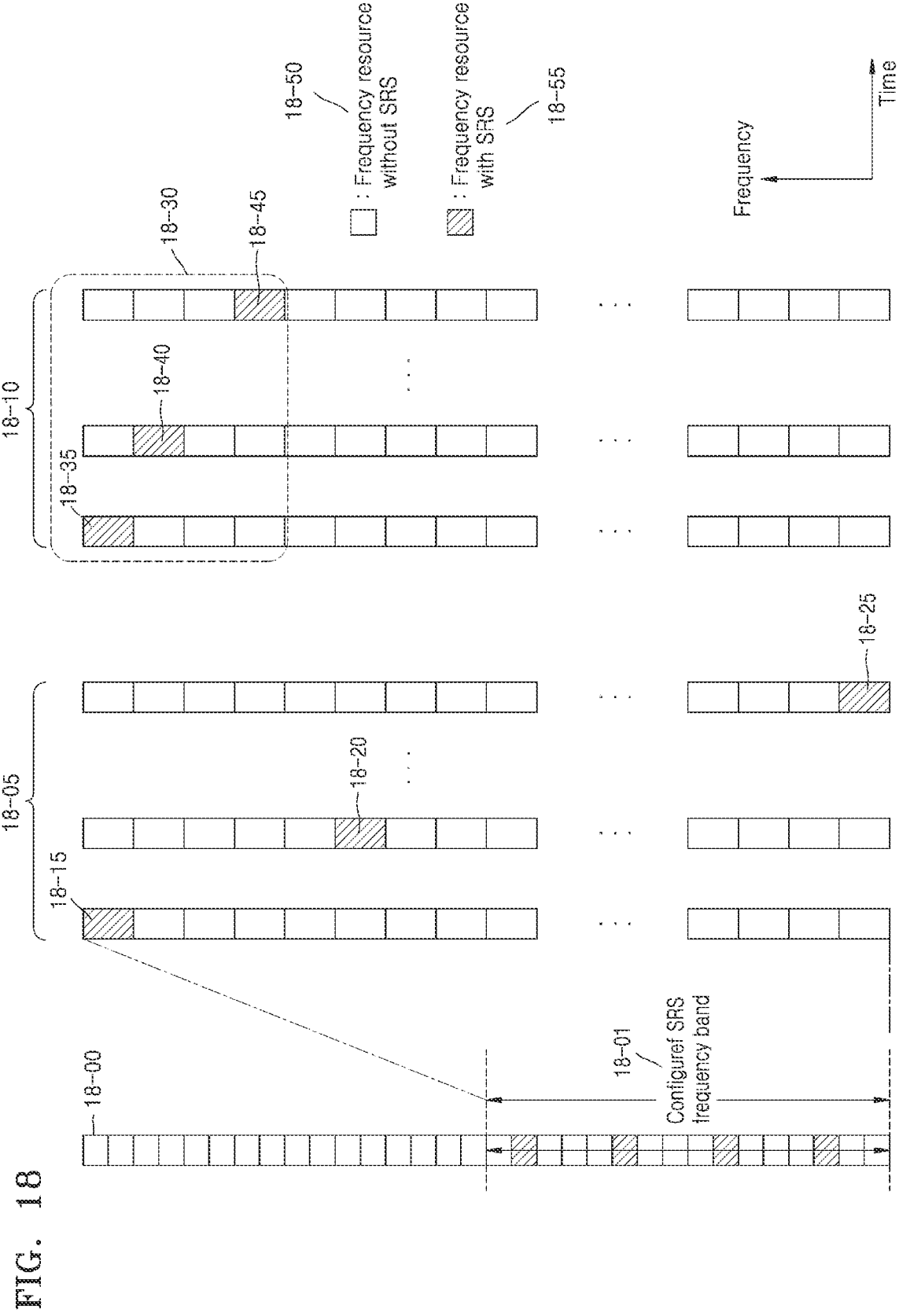
FIG. 18 is a diagram illustrating a mode 1 SRS partial frequency sounding method according to an embodiment of the present disclosure.

[Method 1]: FIG. 18 is a diagram illustrating a mode 1 SRS partial frequency sounding method according to an embodiment of the present disclosure. Referring to FIG. 18, a BS may configure an SRS frequency band 18-01 for a portion of or an entire UL band (18-00), and in this case, SRS transmission including frequency hopping patterns may be performed in some resources in the SRS frequency band (18-55) but may not be performed in some resources (18-50).

For example, the BS and a terminal may perform SRS transmission in a unit of 1 RB to 2 RBs (frequency granularity) at one time point (1 OFDM symbol, 1 SRS resource occasion, 1 slot, etc.), and may have a gap corresponding to an integer multiple of the SRS transmission unit between adjacent SRS frequency hopping patterns (e.g., between 18-15 and 18-20) on the frequency axis (18-05). In this case, in consideration of the convenience and performance of BS interpolation implementation, a PRB 18-25 having the lowest index and a PRB 18-15 having the highest index in the SRS frequency band 18-01 configured within one period of the frequency hopping patterns may be guaranteed to be always included in actual SRS transmission. In detail, the second pattern of the frequency hopping patterns is agreed to include the PRB 18-25 having the lowest index and the PRB 18-15 having the highest index in the configured SRS frequency band 18-01, and thus it is possible to guarantee that the BS may quickly perform initial interpolation.

In the present example (18-05), the frequency hopping patterns are not necessarily sequential, but intervals between adjacent SRS frequency hopping patterns on the frequency axis may be equally distributed in consideration of the convenience and performance of BS interpolation implementation. For example, when the starting PRB of the SRS frequency band is Nstart=1, the end PRB is $N_{end}$=12, the SRS transmission unit is 1 PRB, and the SRS hopping period is $P_{hopping}$=4 SRS transmission occasions, the interval between adjacent SRS frequency hopping patterns on the frequency axis may be defined according to $$\left\lceil \frac{(N_{end} - N_{start})}{(P_{hopping} - 1)} \right\rceil - 1.$$

As another example, the BS may configure, through higher layer signaling, or indicate, by using L1 signaling, a partial band 18-30 included in the configured SRS frequency band 18-01, as a band of interest for mode 1 SRS partial frequency sounding (18-10). Thereafter, the BS and the terminal may perform frequency hopping in accordance with the SRS transmission unit (frequency granularity) for each SRS transmission occasion in the determined band of interest (18-35, 18-40, and 18-45). In the present example (18-10), the frequency hopping patterns are not necessarily sequential, but the SRS frequency hopping patterns may include all frequency resources in the band of interest.

Figure 19:
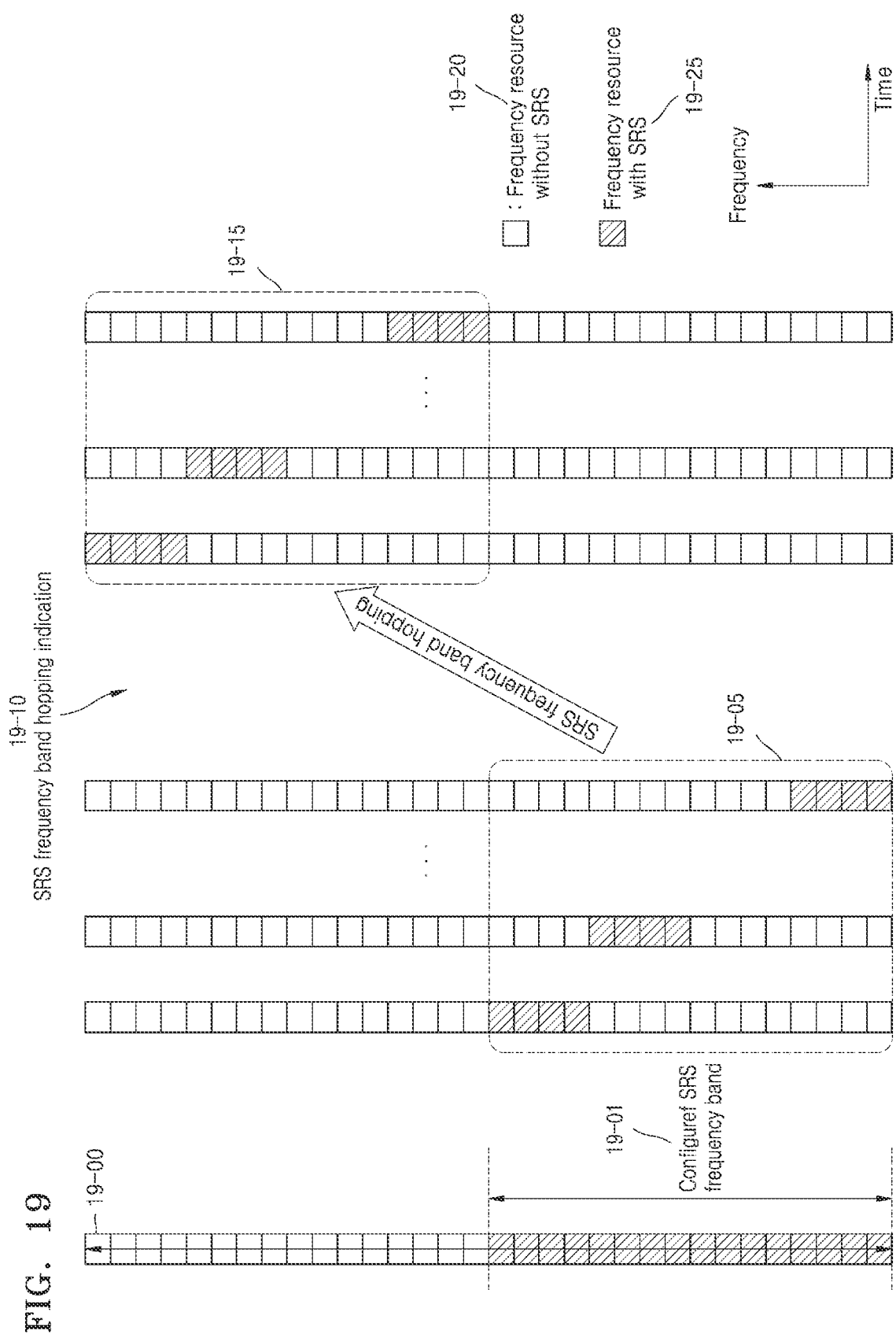
FIG. 19 is a diagram illustrating a mode 2 SRS partial frequency sounding method according to an embodiment of the present disclosure.

[Method 2]: FIG. 19 is a diagram illustrating a mode 2 SRS partial frequency sounding method according to an embodiment of the present disclosure. Referring to FIG. 19, a BS may configure an SRS frequency band 19-01 in a portion of a UL band (19-00). In this case, SRS transmission including frequency hopping patterns may be performed with reference to FIG. 12. Thereafter, the BS may perform extrapolation for a band other than the configured SRS frequency band 19-01 or 19-05, and obtain DL CSI about a band on which an SRS is not transmitted, according to a result of the extrapolation, or configure or indicate, for or to a terminal, spatial relation information about PUCCH or PUSCH transmission. Meanwhile, when it is determined that extrapolation is not available due to a sudden change in a channel state as the terminal moves or a channel blockage occurs, the BS may indicate SRS frequency band hopping (19-10). This is a different operation from the related-art SRS frequency hopping, and when the terminal receives the indication of the BS, the terminal moves the SRS frequency band to an indicated new frequency band (19-15) and newly starts frequency hopping in the frequency band. To this end, the BS may configure, for the terminal, the position or length of the starting PRB of the new frequency band 19-15 as a higher layer, or may indicate one in a list of positions and length values of the starting PRBs configured as a higher layer, through L1 signaling.

[Method 3]: The mode 1 and mode 2 partial frequency sounding methods may be appropriately combined with each other or selected according to a channel condition of a terminal, and then used.

Figure 20:
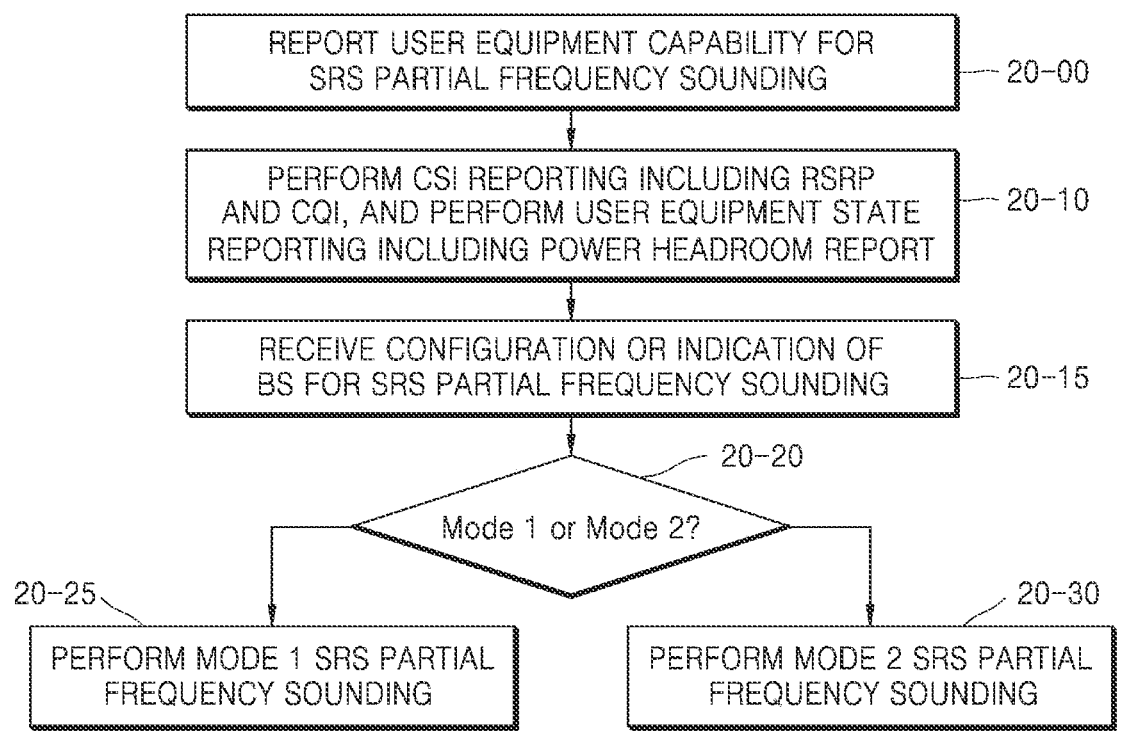
FIG. 20 is a diagram illustrating a flowchart of SRS partial frequency sounding operations according to an embodiment of the present disclosure.

FIG. 20 is a diagram illustrating a flowchart of SRS partial frequency sounding operations according to an embodiment of the present disclosure. Referring to FIG. 20, a terminal may report, to a BS, UE capability for SRS partial frequency sounding (20-00). The UE capability report for SRS partial frequency sounding may be signaling indicating whether the terminal is able to perform mode 1 or mode 2 partial frequency sounding or a combination thereof. In addition, the UE capability report for SRS partial frequency sounding may include information about an SRS transmission unit (frequency granularity) supported by the terminal in mode 1 partial frequency sounding, or may include information about the number of SRS frequency band hopping supported by the terminal and available frequency bands in mode 2 partial frequency sounding.

In this case, information included in the UE capability report for partial frequency sounding may be agreed to have different values for LTE and NR bands (per band), different values for frequency ranges, such as frequency range 1 (FR1) of 6 GHz or less, frequency range 2 (FR2 of 6 GHz or greater, and the like (per FR), different values for cell groups, such as an MCG and an SCG, for dual connectivity (per cell group), or different values for CCs. This is to consider that the terminal arranges SRS antenna ports in consideration of different frequency characteristics of respective frequency bands.

Thereafter, the terminal may report a UE state including CSI, such as RSRP or CQI, and a power headroom report, to the BS according to a configuration and an indication of the BS, and the BS may obtain information for determining whether to perform SRS partial frequency sounding and the mode of the SRS partial frequency sounding, from the report (20-10). In addition, the terminal may receive, from the BS, a configuration or an indication of the BS for SRS partial frequency sounding (20-15). The configuration or indication for SRS partial frequency sounding may include information required for using SRS partial frequency sounding, for example, information required for using mode 1 and 2 SRS partial frequency sounding. When it is determined to use SRS partial frequency sounding and the mode is determined, the terminal may perform SRS partial frequency sounding based on the information received in 20-15.

Thereafter, the BS may determine whether to perform SRS partial frequency sounding based on the information included in the report of the terminal. When the BS determines to use SRS partial frequency sounding, the BS may determine which mode of SRS partial frequency sounding to use (20-20). The terminal may receive, from the BS, higher layer signaling, L1 signaling, or a combination of signaling of several layers, which includes information about whether to use SRS partial frequency sounding and mode information (e.g., information about the mode determined to be used by the BS), and may perform mode 1 SRS partial frequency sounding (20-25) or mode 2 SRS partial frequency sounding (20-30), based on the received higher layer signaling, L1 signaling, or a combination of signaling of several layers.

The above-described embodiments and methods are not exclusive, and a combination thereof may be used according to circumstances. For example, the partial antenna sounding of the first embodiment and the partial frequency sounding of the second embodiment may be simultaneously applied in given time frequency resources to contribute to reducing a larger amount of SRS transmission burden than when they are individually applied. Not all possible combinations thereof are listed herein in order not to obscure the gist of the present disclosure.

Figure 21:
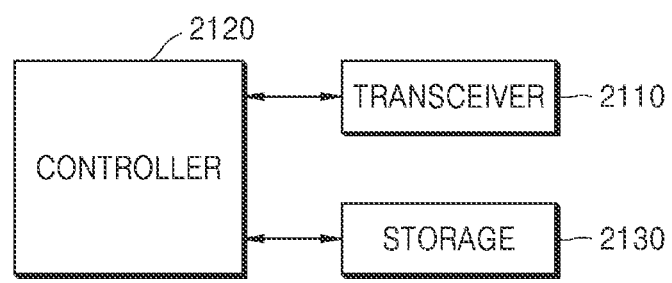
FIG. 21 is a block diagram of a terminal according to an embodiment of the present disclosure.

FIG. 21 is a block diagram of a terminal according to an embodiment of the present disclosure.

Referring to FIG. 21, a terminal 2100 may include a transceiver 2110, a controller 2120, and a storage 2130. The transceiver 2110, the controller 2120, and the storage 2130 of the terminal 2100 may operate according to the method of transmitting and receiving an RS corresponding to the above-described embodiments. However, the components of the terminal 2100 according to an embodiment are not limited to the above-described examples. According to another embodiment, the terminal 2100 may include more or fewer components than the above-described components. In addition, in a particular case, the transceiver 2110, the controller 2120, and the storage 2130 may be implemented as a single chip.

According to another embodiment, the transceiver 2110 may include a transmitter and a receiver. The transceiver 2110 may transmit and receive signals to and from a BS. The signal may include control information and data. To this end, the transceiver 2110 may include an RF transmitter for up-converting and amplifying a frequency of a signal being transmitted, and an RF receiver for low-noise-amplifying a received signal and down-converting a frequency of the received signal. Also, the transceiver 2110 may receive a signal through a radio channel and output the signal to the controller 2120, and may transmit a signal output from the controller 2120 through a radio channel.

The controller 2120 may control a series of operations to allow the terminal 2100 to operate according to the above-described embodiments of the present disclosure. For example, the controller 2120 may perform the method of transmitting and receiving an RS according to an embodiment of the present disclosure. To this end, the controller 2120 may include at least one processor. For example, the controller 2120 may include a communication processor (CP) for performing control for communication and an application processor (AP) for controlling a higher layer such as an application program.

The storage 2130 may store control information or data included in a signal obtain by the terminal 2100, and may have a region for storing data required for control by the controller 2120 and data generated when the controller 2120 performs control.

Figure 22:
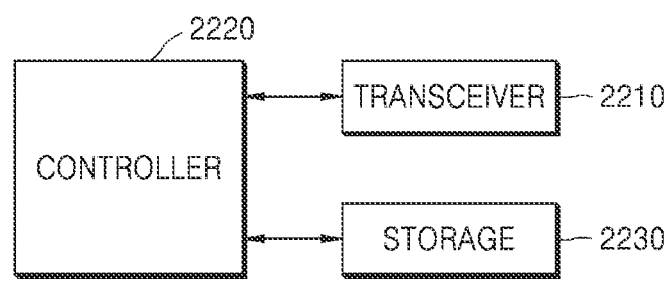
FIG. 22 is a block diagram of a base station according to an embodiment of the present disclosure.

FIG. 22 is a block diagram of a BS according to an embodiment.

Referring to FIG. 22, a BS 2200 may include a transceiver 2210, a controller 2220, and a storage 2230. The transceiver 2210, the controller 2220, and the storage 2230 of the BS 2200 may operate according to the method of transmitting and receiving an RS corresponding to the above-described embodiments. However, the components of the BS 2200 according to an embodiment are not limited to the above-described examples. According to another embodiment, the BS 2200 may include more or fewer components than the above-described components. In addition, in a particular case, the transceiver 2210, the controller 2220, and the storage 2230 may be implemented as a single chip. According to another embodiment, the transceiver 2210 may include a transmitter and a receiver. The transceiver 2210 may transmit and receive signals to and from a terminal. The signal may include control information and data. To this end, the transceiver 2210 may include an RF transmitter for up-converting and amplifying a frequency of a signal being transmitted, and an RF receiver for low-noise-amplifying a received signal and down-converting a frequency of the received signal. Also, the transceiver 2210 may receive a signal through a radio channel and output the signal to the controller 2220, and may transmit a signal output from the controller 2220 through a radio channel.

The controller 2220 may control a series of operations to allow the BS 2200 to operate according to the above-described embodiments of the present disclosure. For example, the controller 2220 may perform the method of transmitting and receiving an RS according to an embodiment of the present disclosure. To this end, the controller 2220 may include at least one processor. For example, the controller 2220 may include a CP for performing control for communication and an AP for controlling a higher layer such as an application program.

The storage 2230 may store control information and data determined by the BS 2200 or control information and data received from a terminal, and may have a region for storing data required for control by the controller 2220 and data generated when the controller 2220 performs control.

Meanwhile, the embodiments of the present disclosure disclosed in the present specification and the drawings are only particular examples for clearly describing the technical aspects of the present disclosure and helping understanding of the present disclosure, and are not intended to limit the scope of the present disclosure. That is, it would be obvious to one of skill in the art that other modifications based on the technical spirit of the present disclosure may be implemented. In addition, the above-described embodiments may be combined with one another and operated as necessary.

The invention claimed is:

1. A method, performed by a terminal, of performing channel estimation in a wireless communication system, the method comprising:
   transmitting, to a base station, capability information of the terminal regarding sounding reference signal (SRS) transmission, wherein the capability information includes information indicating whether the SRS transmission on some resources of an SRS frequency band is supported by the terminal;
   receiving, from the base station, configuration information including information for configuring at least part of an uplink band as the SRS frequency band for the SRS transmission, wherein the configuration information indicates whether to transmit an SRS on the some resources of the SRS frequency band or the SRS frequency band; and
   in case that the configuration information indicates to transmit the SRS on the some resources of the SRS frequency band, transmitting, to the base station, the SRS on the some resources of the SRS frequency band based on frequency hopping patterns,
   wherein the SRS is transmitted in units of one or two resource blocks at a single SRS occasion, and
   wherein, in frequency domain, SRS transmissions in adjacent frequency hopping patterns have interval equal to an integer multiple of the units, and
   wherein channel state information of the SRS frequency band is determined based on the transmitted SRS.

2. The method of claim 1, further comprising transmitting, to the base station, state information regarding SRS transmission,
   wherein the state information of the terminal includes at least one of channel state information (CSI) or a power headroom report.

3. The method of claim 1, wherein the information for configuring as the SRS frequency band includes information for configuring a partial band of the SRS frequency band as a band of interest, and
   the transmitting of the SRS to the base station includes transmitting the SRS to the base station in the band of interest.

4. The method of claim 1, further comprising:
   receiving, from the base station, an SRS frequency band hopping indication;
   moving from the SRS frequency band to a new SRS frequency band based on the SRS frequency band hopping indication; and
   performing frequency hopping in the new SRS frequency band.

5. A method, performed by a base station, of performing channel estimation in a wireless communication system, the method comprising:
   receiving, from a terminal, capability information of the terminal regarding sounding reference signal (SRS) transmission, wherein the capability information includes information indicating whether the SRS transmission on some resources of an SRS frequency band is supported by the terminal;
   transmitting configuration information including information for configuring at least part of an uplink band as the SRS frequency band for SRS transmission, based on the capability information of the terminal, wherein the configuration information indicates whether to transmit an SRS in the some resources of the SRS frequency band or the SRS frequency band;
   in case that the configuration information indicates to transmit the SRS on the some resources of the SRS frequency band, receiving, from the terminal, the SRS on the some resources of the SRS frequency band; and
   determining channel state information of the SRS frequency band based on the received SRS,
   wherein the SRS is transmitted from the terminal in units of one or two resource blocks at a single SRS occasion, and
   wherein, in frequency domain, SRS transmissions in adjacent frequency hopping patterns have interval equal to an integer multiple of the units.

6. A terminal for channel estimation in a wireless communication system, the terminal comprising:
   a transceiver; and
   at least one processor configured to:
      transmit, to a base station, capability information of the terminal regarding sounding reference signal (SRS), wherein the capability information includes information indicating whether the SRS transmission on some resources of an SRS frequency band is supported by the terminal,
      receive, from the base station, configuration information including information for configuring at least part of an uplink band as the SRS frequency band for the SRS transmission, wherein the configuration information indicates whether to transmit an SRS on the some resources of the SRS frequency band or the SRS frequency band, and in case that the configuration information indicates to transmit the SRS on the some resources of the SRS frequency band, transmit, to the base station, the SRS on the some resources of the SRS frequency band based on frequency hopping patterns, wherein the SRS is transmitted in units of one or two resource blocks at a single SRS occasion, and wherein, in frequency domain, SRS transmissions in adjacent frequency hopping patterns have interval equal to an integer multiple of the units, wherein channel state information of the SRS frequency band is determined based on the transmitted SRS, wherein channel state information of the SRS frequency band is determined based on the transmitted SRS.

7. The terminal of claim 6, wherein the at least one processor is further configured to transmit, to the base station, state information regarding SRS transmission, and wherein the state information of the terminal includes at least one of channel state information (CSI) or a power headroom report.

8. The terminal of claim 6, wherein the at least one processor is further configured to transmit the SRS to the base station in a band of interest, and the information for configuring as the SRS frequency band includes information for configuring a partial band of the SRS frequency band as the band of interest.

9. The terminal of claim 6, wherein the at least one processor is further configured to receive, from the base station, an SRS frequency band hopping indication, move from the SRS frequency band to a new SRS frequency band based on the SRS frequency band hopping indication, and perform frequency hopping in the new SRS frequency band.

10. A base station for channel estimation in a wireless communication system, the base station comprising:

a transceiver; and at least one processor configured to:

receive, from a terminal, capability information of the terminal regarding sounding reference signal (SRS) transmission, wherein the capability information includes information indicating whether the SRS transmission on some resources of an SRS frequency band is supported by the terminal, transmit configuration information including information for configuring at least part of an uplink band as the SRS frequency band for the SRS transmission, based on the capability information of the terminal, wherein the configuration information indicates whether to transmit an SRS in the some resources of the SRS frequency band or the SRS frequency band, in case that the configuration information indicates to transmit the SRS on the some resources of the SRS frequency band, receive, from the terminal, the SRS on the some resources of the SRS frequency band based on frequency hopping patterns, and determine channel state information of the SRS frequency band based on the received SRS, wherein the SRS is transmitted from the terminal in units of one or two resource blocks at a single SRS occasion, and wherein, in frequency domain, SRS transmissions in adjacent frequency hopping patterns have interval equal to an integer multiple of the units.

* * * * *